(12) United States Patent
Ward, Jr.

(10) Patent No.: US 9,985,848 B1
(45) Date of Patent: May 29, 2018

(54) NOTIFICATION BASED PRICING OF EXCESS CLOUD CAPACITY

(75) Inventor: David John Ward, Jr., Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 463 days.

(21) Appl. No.: 13/431,360

(22) Filed: Mar. 27, 2012

(51) Int. Cl.
*H04L 12/24* (2006.01)
*G06Q 10/06* (2012.01)

(52) U.S. Cl.
CPC ......... *H04L 41/5045* (2013.01); *G06Q 10/06* (2013.01)

(58) Field of Classification Search
CPC . H04L 12/14; H04L 12/2417; H04L 43/0888; H04L 41/5045; G06Q 30/04; G06Q 30/0623; G06Q 30/0277; G06Q 10/06; H05K 999/00; G06F 2209/503
See application file for complete search history.

(56) References Cited

U.S. PATENT DOCUMENTS

| | | |
|---|---|---|
| 5,692,174 A | 11/1997 | Bireley et al. |
| 6,421,728 B1 | 7/2002 | Mohammed et al. |
| 6,493,685 B1 | 12/2002 | Ensel et al. |
| 7,412,538 B1 | 8/2008 | Eytchison et al. |
| 7,637,426 B1 | 12/2009 | Green |
| 7,743,001 B1 | 6/2010 | Vermeulen et al. |
| 7,768,920 B2 | 8/2010 | Goshen et al. |
| 7,870,044 B2 | 1/2011 | Robertson |
| 8,024,225 B1 | 9/2011 | Sirota et al. |
| 8,055,493 B2 | 11/2011 | Rolia et al. |
| 8,595,191 B2 | 11/2013 | Prahlad et al. |

(Continued)

OTHER PUBLICATIONS

Amazon Web Services—Amazon EC2 and Amazon CloudWatch. Retrieved online from <<http://web.archive.org/web/20110324003547/http://aws.amazon.com/ec2/>>Mar. 24, 2011 pp. 1-26; <<http://web.archive.org/web/20110228142631/http://aws.amazon.com/ec2/pricing/>>Feb. 28, 2011 pp. 1-13. <<http://web.archive.org/web/20110224040048/http://aws.amazon.com/ec2/spot-instances/>>Feb. 24, 2011 pp. 1-5; <<http://web.archive.org/web/20110224192725/http://aws.amazon.com/cloudwatch/>>Feb. 24, 2011 pp. 1-5.*

(Continued)

*Primary Examiner* — Hajime Rojas
(74) *Attorney, Agent, or Firm* — Robert C. Kowert; Meyertons, Hood, Kivlin, Kowert & Goetzel, P.C.

(57) ABSTRACT

Methods and apparatus for notification-based pricing of excess cloud capacity are disclosed. A system includes a resource manager and a plurality of resource instances, each of which has an interruptibility setting. In response to a first acquisition request, the resource manager allocates a first instance with a first interruptibility setting to a first client, allowing the resource manager to revoke the first client's access to the first instance without a notification. In response to an approval of a second acquisition request, the resource manager allocates a second instance with a second interruptibility setting to a second client, allowing the client to retain access to the instance for a delay interval after the second client receives an access revocation notification. Respective billing amounts for the clients' use of the instances are determined based on the interruptibility settings used.

25 Claims, 29 Drawing Sheets

(56) References Cited

U.S. PATENT DOCUMENTS

| | | | |
|---|---|---|---|
| 8,615,584 | B2 | 12/2013 | Dawson et al. |
| 2003/0028642 | A1 | 2/2003 | Agarwal et al. |
| 2003/0088482 | A1 | 5/2003 | Blumberg |
| 2003/0126196 | A1 | 7/2003 | Lagimonier et al. |
| 2003/0229529 | A1 | 12/2003 | Mui et al. |
| 2004/0030740 | A1 | 2/2004 | Stelting |
| 2004/0243430 | A1* | 12/2004 | Horstemeyer .................. 705/1 |
| 2006/0159014 | A1 | 7/2006 | Breiter et al. |
| 2007/0219837 | A1 | 9/2007 | Lu et al. |
| 2008/0080396 | A1 | 4/2008 | Meijer et al. |
| 2008/0103848 | A1 | 5/2008 | Santos et al. |
| 2008/0167928 | A1 | 7/2008 | Cao et al. |
| 2008/0243666 | A1 | 10/2008 | Rowan |
| 2009/0049114 | A1 | 2/2009 | Faraj |
| 2009/0182598 | A1 | 7/2009 | An et al. |
| 2009/0276771 | A1 | 11/2009 | Nickolov et al. |
| 2009/0281952 | A1 | 11/2009 | Toffey et al. |
| 2009/0300635 | A1 | 12/2009 | Ferris |
| 2010/0010657 | A1 | 1/2010 | Do et al. |
| 2010/0050172 | A1 | 2/2010 | Ferris |
| 2010/0070397 | A1 | 3/2010 | Hahn-Carlson et al. |
| 2010/0131624 | A1 | 5/2010 | Ferris |
| 2010/0131649 | A1 | 5/2010 | Ferris |
| 2010/0217865 | A1 | 8/2010 | Ferris |
| 2010/0241479 | A1 | 9/2010 | Chaushev |
| 2010/0306379 | A1 | 12/2010 | Ferris |
| 2011/0119104 | A1 | 5/2011 | Levine et al. |
| 2011/0131335 | A1 | 6/2011 | Spaltro et al. |
| 2011/0137805 | A1 | 6/2011 | Brookbanks et al. |
| 2011/0138050 | A1 | 6/2011 | Dawson et al. |
| 2011/0138051 | A1 | 6/2011 | Dawson et al. |
| 2011/0145094 | A1 | 6/2011 | Dawson et al. |
| 2011/0145392 | A1 | 6/2011 | Dawson et al. |
| 2011/0154353 | A1 | 6/2011 | Theroux et al. |
| 2011/0161964 | A1 | 6/2011 | Piazza et al. |
| 2011/0173038 | A1 | 7/2011 | Moon et al. |
| 2011/0173626 | A1 | 7/2011 | Chi et al. |
| 2011/0179132 | A1 | 7/2011 | Mayo et al. |
| 2011/0202657 | A1 | 8/2011 | Chang |
| 2011/0213691 | A1 | 9/2011 | Ferris et al. |
| 2011/0213712 | A1 | 9/2011 | Hadar et al. |
| 2011/0238458 | A1 | 9/2011 | Purcell et al. |
| 2011/0295986 | A1 | 12/2011 | Ferris et al. |
| 2011/0295998 | A1 | 12/2011 | Ferris |
| 2011/0296025 | A1 | 12/2011 | Lieblich et al. |
| 2012/0016721 | A1 | 1/2012 | Weinman |
| 2012/0131161 | A1 | 5/2012 | Ferris et al. |
| 2012/0159506 | A1 | 6/2012 | Barham et al. |
| 2012/0173725 | A1 | 7/2012 | Verma |
| 2013/0111027 | A1 | 5/2013 | Milojicic et al. |
| 2013/0173418 | A1 | 7/2013 | Goad et al. |
| 2013/0212279 | A1 | 8/2013 | Dutta et al. |
| 2013/0232252 | A1 | 9/2013 | Huang et al. |
| 2013/0238785 | A1 | 9/2013 | Hawk et al. |
| 2013/0246208 | A1 | 9/2013 | Jain et al. |

OTHER PUBLICATIONS

Amazon Web Services—AWS Developer Forums—"Discussion Forums > Category: Amazon Web Services > Forum: Amazon Elastic Compute Cloud > Thread: Existing connections dropped rudely when instance taken out of ELB" Retrived online from: <<https://forums.aws.amazon.com/thread.jspa?threadID=61278>> comments dated Feb. 25, 2011-Mar. 21, 2011 pp. 1-4.*

"Amazon EC2 Spot Instance," Amazon Web Services LLC, Downloaded Mar. 26, 2012, 11 pages.

"Amazon EC2 Instance Types," Amazon Web Services LLC, Downloaded Mar. 26, 2012, 5 pages.

"Amazon EC2 Reserved Instances," Amazon Web Services LLC, Downloaded Mar. 26, 2012, 6 pages.

"Amazon EC2 Instance Purchasing Options," Amazon Web Services LLC, Downloaded Mar. 26, 2012, 2 pages.

"Amazon EC2 Pricing," Amazon Web Services LLC, Downloaded Mar. 26, 2012, 8 pages.

U.S. Appl. No. 13/535,720, filed Jun. 28, 2012, Matthew D. Klein, et al.

U.S. Appl. No. 13/535,715, filed Jun. 28, 2012, Matthew D. Klein, et al.

U.S. Appl. No. 13/535,707, filed Jun. 28, 2012, Matthew D. Klein, et al.

U.S. Appl. No. 13/535,725, filed Jun. 28, 2012, Matthew D. Klein, et al.

AWS Documentation, "Using Cluster Instances," downloaded from docs.amazonwebservices.com/AWSEC2/latest/UserGuide/using_cluster_computing.html on May 16, 2012, pp. 1-6.

Amazon Web Services: AWS Products & Solutions, "High Performance Computing (HPC) on AWS," downloaded from aws.amazon.com/hpc-applications/ on May 16, 2012, pp. 1-3.

Timo Schneider (personal website), "An Oblivious Routing Congestion Simulator," downloaded from perlplexity.org/Research/ORCS/ on May 16, 2012, pp. 1-8.

U.S. Appl. No. 13/431,379, filed Mar. 27, 2012, David John Ward, Jr.

U.S. Appl. No. 13/431,388, filed Mar. 27, 2012, David John Ward, Jr., et al.

U.S. Appl. No. 13/429,957, filed Mar. 26, 2012, David John Ward, Jr., et al.

U.S. Appl. No. 13/431,355, filed Mar. 27, 2012, David John Ward, Jr.

U.S. Appl. No. 13/429,985, filed Mar. 26, 2012, David John Ward, Jr., et al.

U.S. Appl. No. 13/431,348, filed Mar. 27, 2012, David John Ward, Jr.

U.S. Appl. No. 13/430,003, filed Mar. 26, 2012, David John Ward, Jr., et al.

U.S. Appl. No. 13/431,393, filed Mar. 27, 2012, David John Ward, Jr.

U.S. Appl. No. 13/475,399, filed May 18, 2012, David John Ward, Jr.

U.S. Appl. No. 13/475,359, filed May 18, 2012, David John Ward, Jr.

U.S. Appl. No. 13/461,605, filed May 1, 2012, David John Ward, Jr., et al.

U.S. Appl. No. 13/476,828, filed May 21, 2012, David John Ward, Jr., et al.

U.S. Appl. No. 13/475,461, filed May 18, 2012, David John Ward, Jr., et al.

U.S. Appl. No. 13/331,750, filed Dec. 20, 2011, Amazon Technologies, Inc., all pages.

Agarwal, Sharad, et al. "Volley: Automated Data Placement for Geo-Distributed Cloud Services." 2010, pp. 1-16.

* cited by examiner

Optimizations Preferences Page https://<website>.com/optPreferences

Thanks for opting in to the pricing optimizer!

To help us make the best recommendations, please ← 503
provide as many preferences as you can below.

| | | |
|---|---|---|
| Target budget for next 3 billing cycles | I can't specify the budget; just minimize my cost (Default) | ← 509 |
| Instance count availability target | 1 (default) | ← 510 |
| Preferred availability zone | AZ-U.S. East Coast-003 (Default) | ← 511 ← 507 |
| Preferred instance types (Reserved/On-demand) | Any (default) | ← 513 |
| Preferred interruptibility level | Do not interrupt (default) | ← 515 |
| Preferred instance size | Any (default) | ← 517 |
| Can you tell us about any anticipated changes in demand? | No (default) | ← 519 |
| How often would you like to receive recommendations? | Weekly (default) | ← 521 |
| How would you like to receive recommendations? | Send me an email and a link (default) | ← 523 |

Submit! ← 521

Interruptible Instance Page https://<website>.com/interruptibleInstances

Dear John Doe, Welcome to the interruptible instance home page! ←—1703

Pricing history for different types of interruptible instances is shown below.

| Instance Types | Large |
|---|---|
| Availability Zones | AZ – U. S. East Coast-001 |

←—1705

[Graph: Price/hour vs Time showing 60-minute delay, 30-minute delay, 5-minute delay, No delay] 1711

Please select the number of instances you would like, and their interruptibility settings, below:

| Availability Zone | AZ – U. S. East Coast-001 |
|---|---|
| Instance Type | Large |
| Number of instances | 1 |
| Interruptibility setting | 5-minute delay |
| Price | $X.xx |

Application Package Submission Page https://<website>.com/submitAppPackage

Thanks for selecting the soaker pool for your application!

To help us make the best choices, please provide as much application information as you can below. ← 2803

[Click to view the Soaker pool FAQ]

← 2807

| | | |
|---|---|---|
| Application executable type | Java, JDK 1.6 (Default) | |
| Application input mode | Included XML property file (default) | |
| Application output mode | Text file (default) | ← 2809 |
| Minimum processor power | None (default) | |
| Minimum main memory size | 1GB (default) | |
| Command(s) to save state | Included shell script (default) | |
| Parallelism requirements | None (default) | |
| Would you like a quote for complete execution of this application? | No (default) | |
| Bidding mode | Per Processor PPP-equivalent CPU-minute (default) | |
| Your bid (required) | | |

[Submit!] ← 2821

*Figure 28*

NOTIFICATION BASED PRICING OF EXCESS CLOUD CAPACITY

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers. However, as the scale and scope of typical data centers has increased, the tasks of provisioning, administering, and managing the physical computing resources have become increasingly complicated.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems. As another example, virtualization technologies may allow data storage hardware to be shared among multiple users by providing each user with a virtualized data store which may be distributed across multiple data storage devices, with each such virtualized data store acting as a distinct logical data store that provides users with the illusion that they are the sole operators and administrators of the data storage resource.

In many environments, operators of provider networks that implement different types of virtualized computing, storage, and/or other network-accessible functionality allow customers to reserve or purchase access to resources in any of several different resource acquisition modes. For example, a customer may reserve a virtual compute resource instance for a relatively long duration, such as one year or three years, or a customer may purchase resources for shorter terms on an ad-hoc basis as needed. For some types of resource reservations, at least a portion of the price paid by the customer may fluctuate over time in response to changing demand and supply of the resources within the provider network. The provider network operator may have to try to ensure that a number of potentially competing demands are met, e.g., that all guaranteed commitments to clients (such as long-term reservations that have already been paid for) are honored, that the dynamically-varying component of resource pricing does not get so high that customer satisfaction suffers, that the provider's data center investment is justified by a reasonable level of resource utilization and revenue, and so on. In business environments where clients may choose from among multiple providers for network-based computing options, provider network operators may wish to maintain high levels of customer satisfaction and customer retention, e.g., by making resource acquisition easy and economical, and by reducing the complexity of client resource budget management as much as possible.

BRIEF DESCRIPTION OF THE DRAWINGS

FIG. 5 illustrates a portion of an example web-based interface that may be used by a client to specify optimization preferences, according to some embodiments.

FIG. 17 illustrates a portion of an example web-based interface that may be implemented for supporting multiple instance interruptibility levels, according to some embodiments.

FIG. 28 illustrates a portion of an example web-based interface that may be implemented to allow clients to provide application specifications to be used to schedule the client applications on execution platforms, according to some embodiments.

Figure 1:
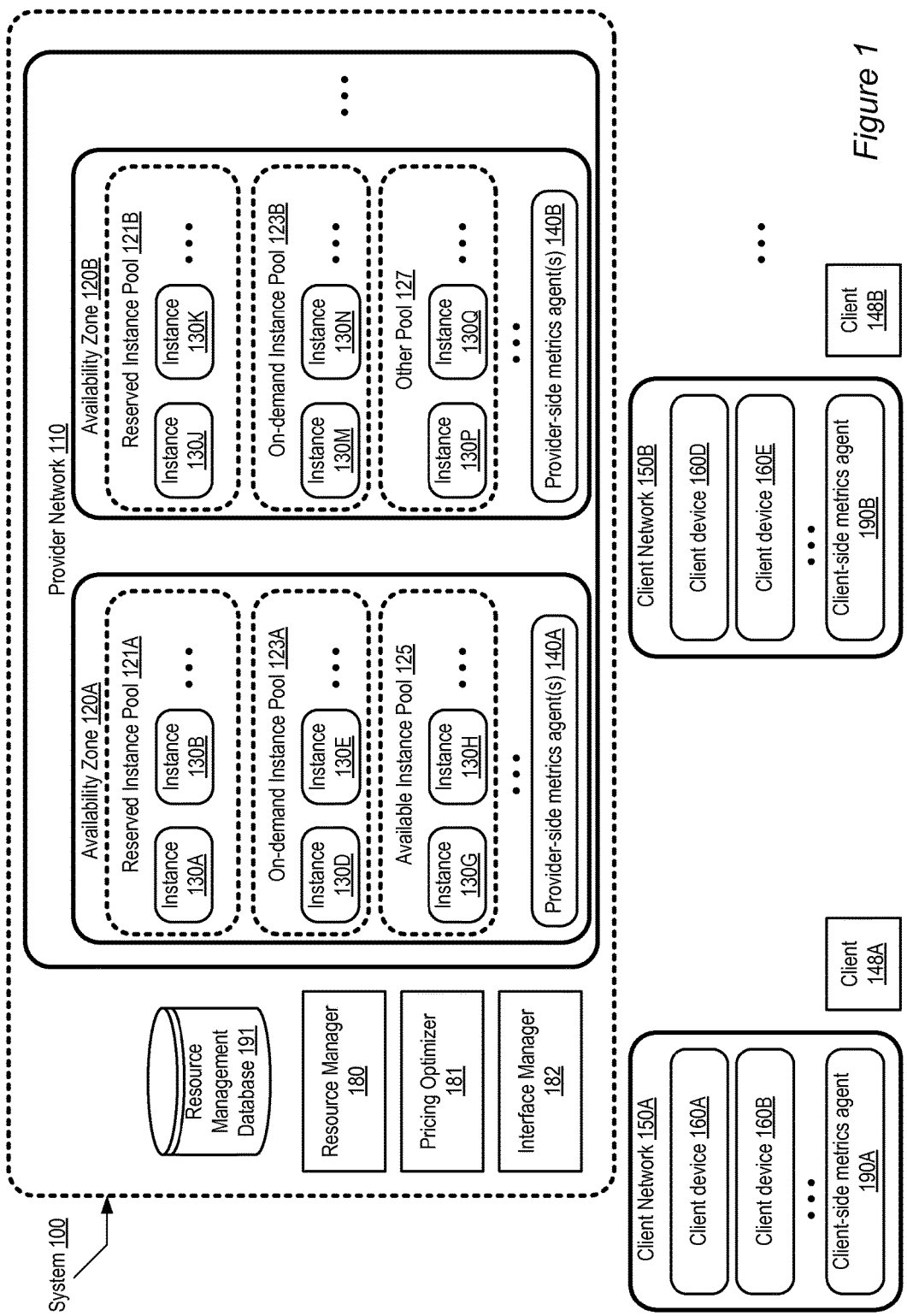
FIG. 1 illustrates an example system environment, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Various embodiments of methods and apparatus for managing dynamic pricing, reservation and allocation of network-accessible resources are described. Networks set up by an entity such as a company or a public sector organization to provide one or more services (such as various types of cloud-based computing or storage) accessible via the Internet and/or other networks to a distributed set of clients may be termed provider networks in this document. Such a provider network may include numerous data centers hosting various resource pools, such as collections of physical and/or virtualized computer servers, storage devices, networking equipment and the like, needed to implement and distribute the infrastructure and services offered by the provider. The resources may in some embodiments be offered to clients in units called "instances," such as virtual or physical compute instances or storage instances. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the resources of the provider network in different embodiments, including general purpose or special purpose computer servers, storage devices, network devices and the like. In some embodiments a client or user may be provided direct access to a resource instance, e.g., by giving a user an administrator login and password. In other embodiments the provider network operator may allow clients to specify execution requirements for specified client applications, and schedule execution of the applications on behalf of the client on execution platforms (such as application server instances, Java™ virtual machines (JVMs), general purpose or special-purpose operating systems, platforms that support various interpreted or compiled programming languages such as Ruby, Perl, Python, C, C++ and the like, or high-performance computing platforms) suitable for the applications, without for example requiring the client to access an instance or an execution platform directly. A given execution platform may utilize one or more resource instances in some implementations; in other implementations multiple execution platforms may be mapped to a single resource instance.

Operators of such provider networks may in some instances implement a flexible set of resource reservation, control and access interfaces for their clients. For example, a resource manager of the provider network may implement a programmatic resource reservation interface (e.g., via a web site or a set of web pages) that allows clients to learn about, select, purchase access to, and/or reserve resource instances. It is noted that at least in some of the various embodiments discussed below, where an entity such as a resource manager or a pricing optimizer is described as implementing one or more programmatic interfaces such as a web page or an API, an interface manager subcomponent of that entity may be responsible for the interface-related functionality. In many embodiments equivalent interface-related functionality may be implemented by a separate or standalone interface manager, external to the resource manager and the pricing optimizer. Such an interface may include capabilities to allow browsing of a resource catalog, provide details and specifications of the different types or sizes of resources supported, the different reservation types or modes supported, pricing models, and so on. The provider network may support several different purchasing modes (which may also be referred to herein as reservation modes) in one embodiment: for example, long-term reservations, on-demand resource allocation, or spot-price-based resource allocation. Using the long-term reservation mode, a client may make a low, one-time, upfront payment for a resource instance, reserve it for a specified duration such as a one or three year term, and pay a low hourly rate for the instance; the client would be assured of having the reserved instance available for the term of the reservation. Using on-demand mode, a client could pay for capacity by the hour (or some appropriate time unit), without any long-term commitments or upfront payments. In the spot-price mode, a client could specify the maximum price per unit time that it is willing to pay for a particular type of resource, and if the client's maximum price exceeded a dynamic spot price determined at least in part by supply and demand, that type of resource would be provided to the client. In some embodiments, dynamically resizable pools of resource instances may be set aside for the different reservation types or modes—e.g., long-term reserved instances may be allocated from one pool, on-demand instances from another, and so on. During periods when the supply of the requested resource type exceeded the demand, the spot price may become significantly lower than the price for on-demand mode. In some implementations, if the spot price increases beyond the maximum bid specified by a client, a resource allocation may be interrupted—i.e., a resource instance that was previously allocated to the client may be reclaimed by the resource manager and may be allocated to some other client that is willing to pay a higher price. Other purchasing modes or combinations of modes may be implemented by the resource manager in some embodiments.

The resource needs and resource budgets of a given client may vary over time, often in ways that may not be predictable very far in advance. At the same time, the pricing for various types of resources of the provider network may also vary dynamically. The tasks of meeting budgeting targets and/or making the most effective use of a given resource budget may therefore become fairly complicated. In order to make it easier for clients to address these goals, in some embodiments a provider network operator may provide clients with access to a pricing optimizer tool. In one such embodiment, a pricing optimizer (aspects of whose functionality may be exposed to clients via programmatic interfaces such as web pages or a web site) may be operable to obtain resource usage records of a client from one or more usage data sources, and determine a recommended course of action for the client with respect to future resource instance reservations and/or acquisitions based on the usage records and/or other pieces of information. For example, in making the recommendation, the pricing optimizer may take into account data about the client's resource usage during earlier time periods (e.g., during the last month or the last three months) as indicated by the usage records, the pricing policies and/or current prices of different types of resources in the various resource pools, and one or more optimization goals of the client. Several different types of client optimization goals may be taken into account in various embodiments, including for example client budget limits, and/or goals for a target number of available resource instances that the client wishes to acquire. Using these various types of information, the pricing optimizer may determine a recommended number and/or types of resource instances that the client should access over some future term, and provide a notification of the recommendation to the client.

In some embodiments the provider network may be organized into a plurality of geographical regions, and each region may include one or more availability zones. An availability zone (which may also be referred to as an availability container herein) in turn may comprise one or more distinct locations or data centers, engineered in such a way that the resources in a given availability zone are insulated from failures in other availability zones. That is, a failure in one availability zone may not be expected to result in a failure in any other availability zone; thus, the availability profile of a resource instance is intended to be independent of the availability profile of a resource instance in a different availability zone. Clients may be able to protect their applications from failures at a single location by launching multiple application instances in respective availability zones. At the same time, in some implementations, inexpensive and low latency network connectivity may be provided between resource instances that reside within the same geographical region (and network transmissions between resources of the same availability zone may be even faster). The pricing optimizer may in one embodiment also provide recommendations for the target availability zone or zones in which a client's instances should be located. For example, the client's resource usage records may include Internet Protocol (IP) address information that allows the pricing optimizer to determine the sources and destinations of at least some of the client's network traffic, which may be useful in identifying the appropriate availability zones.

Various types of usage data sources from which the pricing optimizer obtains usage data to develop its recommendations may be employed in different embodiments. In some embodiments, where for example a client already uses some set of resource instances of the provider network, provider-side metrics agents deployed at various entities (such as resource instances, network devices and the like) within the provider network may serve as usage data sources for the pricing optimizer. The types of usage information collected for a given resource or instance may include, for example, uptime (i.e., the amount of time a resource instance was active or booted up), CPU utilization, memory utilization, I/O rates, I/O device utilization, network traffic rates, network device utilization, the operating system in use, the hypervisor in use, various details of the software stack in use such as application server type and version, and so on, depending on the type of resource. In other embodiments, at least a portion of the usage records may be collected from client premises or client networks outside the provider network. For example, in one such embodiment, an entity of the provider network may allow prospective (or current) clients to download installable client-side metrics agents, which may then be deployed to collect usage statistics from various devices (such as servers, storage devices, or network devices) within the client's networks. The collected usage data may then be transmitted back for analysis by the pricing optimizer, which may then be able to generate recommendations for the types and number of resource instances the client should acquire, e.g., to allow the client to utilize the provider network's resources instead of at least some portion of the client-side equipment.

In some embodiments an interface manager (which, as noted earlier, may be incorporated within the pricing optimizer and/or a resource manager, or may be external to both the pricing optimizer and resource manager) may implement a programmatic interface, which may for example be exposed as one or more web pages, allowing clients to indicate optimization goals that the pricing optimizer should use when developing recommendations. Using such an interface, a client may in one implementation indicate a resource usage budget limit (e.g., the equivalent of "I can spend at most $10,000 for resource instances over the period Jul. 1, 2012-Sep. 30, 2012"), and the pricing optimizer may attempt to determine recommendations that meet the budget limit. In another scenario, a client may indicate an instance availability count goal (e.g., the equivalent of "For my applications to run effectively I must have at least 100 instances of performance rating X") in some embodiments. In environments where different interruptibility settings are supported, e.g., where access to some resource instances may be revoked based on threshold conditions being reached, the pricing optimizer may also receive indications of the interruptibility preferences of a client, and use those preferences in making its recommendations. Various combinations of different types of client optimization goals may be used in different embodiments. In one implementation the recommendations may include performance capacity ratings for some or all of the resource instances that the client is being advised to acquire.

In some embodiments a programmatic interface implemented for the client may allow the client to specify various "what-if" scenarios (such as anticipated or speculative resource usage metrics), and the pricing optimizer may provide recommendations based on the what-if scenarios. In one embodiment a client may be allowed to use a programmatic interface to opt-in to receive notifications if the pricing optimizer is able to find a way for the client to save a specified amount (e.g., the client may in effect inform the pricing optimizer "Please notify me if you can find a way for me to save $10,000 while continuing to run my applications"), and the optimizer may notify the client accordingly if the desired savings can be implemented. In another embodiment programmatic interfaces (such as an application programming interface or API) may be implemented to allow third parties, such as network service companies or other intermediaries, to utilize the functionality of the pricing optimizer—e.g., to provide usage data and/or pricing/budgeting goals to the optimizer and receive corresponding recommendations. Third parties may use such facilities to help guide their own clients, and/or to build their own resource management interfaces to extend the core functions supported by the pricing optimizer. Various other types of services and functions may be provided by the pricing optimizer in different embodiments—e.g., the pricing optimizer may suggest instance downgrades (e.g., informing a client that they may request a less powerful resource instance than the one they are currently paying for) based on the client's resource usage statistics, or suggest a reservation resale (e.g., recommend to a client that a long-term reservation should be listed on a reservation resale marketplace), and so on. In one embodiment, the pricing optimizer may be used to provide recommendations for reservations or allocations of execution units (such as CPU-minutes CPU-hours, floating point operations (FLOPs), and the like) instead of, or in addition to, reservations or allocations of entire resource instances.

According to one embodiment, a client may opt in to allow a resource manager to automatically implement one or more recommendations made by the pricing optimizer—for example, instead of or in addition to being notified regarding the recommendations. In one such embodiment, the client may specify a set of resources, such as a set of reserved instances, for which the client has approved automated recommendation-based actions. (The set of resources may be empty to begin with, i.e., in some cases the client may utilize the resource manager to obtain all of its resource instances.) Subsequent to an indication of the opt-in by the client for such automated actions, when the resource manager receives a relevant recommendation generated by the pricing optimizer, at least a portion of the recommendation may be put into effect, e.g., without the client having to take any additional action. For example, if the recommendation suggests that a particular resource reservation (e.g., a slot for a reserved instance) held by the client should be listed for resale on a reservations reselling marketplace, the resource manager may list the resource instance or reservation on the marketplace. If and when the listed resource instance is resold (e.g., when a different client reserves the listed instance), the instance may be removed from the marketplace listing and/or from the set of resources reserved for the client. In some cases, other events may cause a change in the status of the listed resource instance: e.g., if the instance has been listed for a while and has not yet been resold, or if the pricing optimizer generates a new recommendation suggesting that it is advisable to delist the instance from the marketplace (based on pricing changes or increased resource demand from the client). If the recommendation generated by the pricing optimizer suggests that it is advisable to procure another instance for the client (e.g., either as a cheaper substitute for a reservation that is being resold, or simply because the client's resource demand is growing), the resource manager may identify an appropriate instance and reserve it or allocate it for the client's use. The newly reserved or procured instance may be selected from an availability zone or region suggested in the recommendation.

The resource manager responsible for automating reservation modifications and/or other actions in accordance with recommendations generated by the pricing optimizer may be responsible for several other related functions in some embodiments. For example, the resource manager may implement one or more programmatic interfaces (such as web pages, APIs or command-line interfaces) allowing clients to opt-in for the automated implementation of the optimizer's recommendations, as well as one or more of the programmatic interfaces similar to those described above implementing aspects of the pricing optimizer functionality. A programmatic interface allowing clients to specify budget constraints, availability zone preferences, and the like, to be used by the pricing optimizer in generating recommendations may be implemented by the resource manager in one embodiment. In some implementations the resource manager may provide an interface that allows a client to specify a schedule for automated reservation optimization attempts—e.g., the client may indicate that recommendations should be generated and/or implemented on its behalf only during a timing window between midnight and 6 am, or at, most once a week or once a month. The client may also indicate a scheduling preference that allows the resource manager and the pricing optimizer to control when recommendations are generated and/or implemented in some implementations; i.e., a scheduling preference that provides full flexibility for the timing of recommendation generation and implementation. In some embodiments, the full flexibility option may represent the default behavior of the system, such that restrictions on the timing of the actions of the optimizer and the resource manager may only be imposed in response to specific demands from the client. Scheduling preferences may be communicated to the pricing optimizer by the resource manager, and the recommendations may be generated in accordance with the preferences.

As noted above, in some embodiments resource instances and/or instance pools may have associated interruptibility settings—e.g., indicating whether an ongoing reservation or allocation period can be terminated before the client that currently owns the reservation releases the instance or completes the tasks for which the reservation or allocation was made. In one such embodiment, each resource instance may have an interruptibility property modifiable by the resource manager, and the resource manager may be responsible for modifying the interruptibility properties of various instances and determining appropriate prices for the different supported interruptibility settings in accordance with supply and demand. In one scenario, a set of currently idle resource instances may be assigned to an "available pool" of instances. Within the available pool, a subset of the instances may at a given time be configured as fully-interruptible instances, while the remaining instances of the available pool may be configured to have any of one or more enhanced interruptibility settings. That is, one or more sub-pools of the available pool may be maintained to cater to requests for instances with enhanced interruptibility requirements. The resource manager may allocate a fully-interruptible instance to a client, e.g., based on a bid provided by the client in an instance acquisition request, on the condition that the client's access to the fully-interruptible instance may be revoked by the resource manager at any point without notifying the client. However, the interruptibility setting of the instance may be upgraded in some embodiments, e.g., in response to an interruptibility upgrade request from the client. For example, the set of applications being run on the instance may have several phases with different interruptibility needs. During some phases it may be acceptable to run the application for a low price while running the risk of being interrupted or stopped, while in other phases the client may be willing to pay a higher price in return for enhanced interruptibility settings. In one embodiment, the interruptibility setting of a currently fully interruptible instance may be enhanced to non-interruptible by the resource manager in response to an upgrade request; e.g., the client may be given the ability to retain the instance for a specified time, or until the client relinquishes access.

In another embodiment, the resource manager may implement one or more variants of interruptibility settings that fall between the fully-interruptible setting and the non-interruptible setting. For example, the resource manager may allow a client to retain access to a resource instance for a delay interval (e.g., five minutes) after the client receives an access revocation notification from the resource manager. A client may, in such an embodiment, request that the interruptibility setting of one or more instances be modified to interruptible-with-notification from fully-interruptible. The resource manager may accept (or deny) the request based on factors such as the current supply of fully-interruptible or enhanced-interruptibility instances, the price the client is willing to pay for the upgrade, the projected number of instance reservation requests, the projected rate of requests for on-demand instances, and so on. In some embodiments the resource manager may expose the different interruptibility settings supported, and the current pricing for different interruptibility levels, to potential clients, and allow the clients to specify desired interruptibility settings in their instance acquisition requests.

The number of resource instances assigned to the available pool and its enhanced-interruptibility sub-pool(s) may vary over time in some embodiments. Similarly, the prices associated with the different interruptibility settings may vary dynamically as well, based on supply and demand. The billing amounts charged to a given client for use of a given instance may be a function of the various interruptibility settings for the instance during the time that the instance was allocated to the client, and the respective durations for which each of the interruptibility settings applied during the allocation period. The current price for a given interruptibility setting may be governed in part by the current supply of instances with that interruptibility setting. In one implementation, for example, the current price of a fully-interruptible instance may be dependent on the size of the available pool, while the current price for an enhanced-interruptibility instance may be dependent on the current size of the enhanced-interruptibility pool. Instances may be moved in and out of the various pools and sub-pools, and the corresponding prices may be adjusted dynamically, based on a number of different factors such as current and anticipated demand (e.g., based on an analysis of usage trends for reserved instances, on-demand instances, and/or upgrade requests), the price clients are willing to bid for fully-interruptible instances and enhanced-interruptibility instances, the number of outstanding unfulfilled reservation slots (i.e., the number of instances that have been reserved but are currently not activated by their reservers), and so on. Interruptibility settings may be downgraded in response to client requests in some embodiments.

The resource manager may revoke access to an interruptible instance (with or without a revocation notification to the client currently accessing the instance, and with or without a delay notification, depending on the interruptibility setting) for a variety of reasons. For example, access may be revoked if a fulfillment request for an existing reservation is received from another client, or if a higher bid for the same type of instance is received from a different client. Instances may be added to the available pool or one of the enhanced-interruptibility sub-pools for a number of reasons as well—e.g., if a client holding a reservation decides to resell the reservation, or if a reservation expires, or if the demand for on-demand instances falls. In some embodiments where interruptions with notifications indicating delay intervals are supported, the delay interval for a given resource instance may itself be variable based on the amount the client is willing to bid—e.g., for a higher bid, a longer delay may be allowed than the delay for a lower bid. In another implementation the delay may vary with the currently advertised price for enhanced-interruptibility instances—e.g., if demand for interruptible-with-notification instances falls, the delay period may be allowed to increase while keeping the price fixed, or the price may be allowed to fall while keeping the delay fixed.

In some embodiments, excess compute and/or storage capacity may be sold at granularities other than entire resource instances. For example, to support a marketplace for spare computation cycles (in contrast to spare resource instances), in one embodiment clients may be allowed to provide executable applications to the resource manager, and the resource manager may schedule the applications on various execution platforms, such as JVMs or application server instances, without for example necessarily allocating entire resource instances to clients, or requiring the clients to control or operate resource instances directly. The executable platforms may be mapped to resource instances in various ways in some such embodiments—e.g., one or more execution platforms may be instantiated on a single resource instance, or a single execution platform may run on portions or all of multiple resource instances. Prices for allocation, reservation, and use of the execution platforms may vary dynamically based on supply and demand. In one embodiment of such a system comprising a plurality of execution platforms, a resource manager may store a collection of one or more client-provided application packages, e.g., in an application repository, wherein each application package includes an executable object of an application and has an associated pricing constraint to be used to schedule execution of the executable object. The resource manager may select a particular execution platform on which to schedule the execution of the executable object of a particular application package based at least in part on a current price associated with the execution platform. If a price-based interruption event occurs, such as the arrival of a higher bid or a more attractive pricing constraint for the type of execution platform being used, the resource manager may save a representation of a state of the application, and stop the execution of the executable object. The execution of an application may also be stopped on a particular platform for other reasons, such as an additional platform becoming available (potentially for a lower price).

Various types of pricing constraints may be specified for the applications in different embodiments supporting execution platforms. For example, for execution platforms where the CPUs are expected to be key determinants of application performance, clients may specify bids for execution units such as CPU-seconds, CPU-minutes, CPU-hours, floating point operations (FLOPs), integer operations, or CPU cycles (for one or more different CPU types supported by the resource manager). For other types of execution platforms and/or other types of applications, which may be disk I/O intensive or network intensive, execution units may include such metrics as total gigabytes of data read/written to a storage device, total number of I/O operations performed, or total gigabytes of data transferred over a network. Bids and/or prices may be expressible for combinations of units in some embodiments, e.g., CPU-seconds with a disk I/O transfer limit. In one embodiment, a client may submit an application package to the resource manager and ask for a quote to complete the execution of the application. The resource manager may in such a case analyze the application package, the current and expected availability of appropriate execution platforms and corresponding prices, and respond with a quote for the application. The client may then respond to the quote with a bid, which the resource manager may accept or reject. In some embodiments the resource manager may be capable of providing quotes for completing the remainder of the execution of an application that has already been executing for a while. An application whose execution has been stopped or suspended as a result of a price-based interruption event may be rescheduled for further execution, either at a different execution platform or the same execution platform that was used previously, as the prices and/or availability of execution platforms change. In environments where different execution platforms run on different hardware and software stacks, the current price of executing an application on a given execution platform may vary based on the performance capabilities of the underlying hardware and/or software. In some embodiments a resource manager may be capable of scheduling individual threads of a multi-threaded or parallelized application on different execution platforms.

The intelligence of the pricing optimizer may be utilized by the resource manager to support several of the functions described above in some embodiments. For example, the pricing optimizer may be helpful in analyzing resource usage trends and deciding when and how to resize the different instance pools (e.g., the available pool and the enhanced-interruptibility sub-pools). Similarly, the pricing optimizer may be used to select the most appropriate execution platform for a particular application package, to decide how many available resource instances should be used for execution platforms (as opposed to being used for enhanced-interruptibility sub-pools, for example). Pricing computations may also be performed with the optimizer's help in some implementations. Further details of the operations of the pricing optimizer and the resource manager in various embodiments are provided below in conjunction with the descriptions of FIGS. 1-29.

Example System Environment

FIG. 1 illustrates an example system environment, according to at least some embodiments. The system 100 includes a provider network 110 comprising a plurality of resource instances 130, such as instances 130A, 130B, 130D, 130E, 130G and 130H in one availability zone 120A, and instances 130J, 130K, 130M, 130N, 130P, 130Q in a different availability zone 120B. The various resource instances 130 in the different availability zones 120 may be reserved and/or allocated for use by clients (or potential clients) such as client 148A and 148B. In the illustrated embodiment, system 100 includes a resource manager 180, a pricing optimizer 181, and an interface manager 182. As noted earlier, in some embodiments the functionality of the interface manager 182 may be implemented by a subcomponent of the resource manager 180 and/or a subcomponent of the pricing optimizer 181. The interface manager 182 may in some embodiments implement one or more programmatic interfaces allowing clients 148 to search for, browse, reserve and acquire instances 130 to obtain various types of services, e.g., to run and/or access various applications. In the illustrated embodiment, at a given point in time, some or all of the instances 130 may be assigned to instance pools (based in part on instance categorization approaches similar to those illustrated in FIGS. 2a and 2b), such as reserved instance pools 121A or 121B, on-demand instance pools 123A or 123B, available instance pool 125, or other pools such as 127. In some embodiments a given pool such as the available pool 125 may itself contain its own sub-pools, e.g., based on the modes of instance reservation and allocation supported. Each pool (or sub-pool) may have an associated pricing policy for its instances, as well as other properties such as interruptibility settings for the instances that happen to be assigned to the pool or sub-pool. Additional details regarding the organization of the different types of pools, various pricing policies and interruptibility policies supported in different embodiments, and the logic that may be used to move instances from one pool or sub-pool to another, will be provided below. It is noted that the pools may represent logical collections or aggregations, so that, for example, the presence of two instances in the same pool or sub-pool may not necessarily imply anything about the physical location of the hardware used for the two instances. Although the instances 130 illustrated in FIG. 1 are shown as belonging to availability zones 120, in other embodiments the provider network 110 may be organized differently: e.g., in some embodiments availability zones may not be implemented. Availability zones 120 may be grouped into geographic regions (not shown in FIG. 1) in some embodiments. Instance pools may be implemented within availability zones in some implementations (e.g., each availability zone may have its own reserved instance pool), while in other implementations an instance pool or sub-pool may span multiple availability zones.

The pricing optimizer 181, which may exist as a separate entity in some embodiments and may be incorporated as an element of the resource manager 180 in other embodiments, may be configurable to obtain information from a variety of data sources to generate recommendations on the instances that a client 148 should acquire or reserve. For example, in the embodiment illustrated in FIG. 1, the pricing optimizer 181 may obtain resource usage records or statistics from one or more provider-side metrics agents, such as agents 140A and 140B, which may provide information regarding the usage of various types of instances 130 by a client 148 over some selected period of time. The pricing optimizer 181 may use its knowledge of the trends of past or current resource usage by a given client 148 to make projections about future usage of different types of resources by the client 148. In some embodiments, resource usage metrics may also or instead be obtained from client-side devices external to the provider network 110. For example, in one implementation the pricing optimizer 181 or the resource manager 180 may provide a downloadable or otherwise installable client-side metrics agent such as 190A to a client such as 148A, and the client 148A may install and activate the agent or agents in the client's data center or client-managed premises. The client-side metrics agent 190 may gather resource usage information from various client devices 160 (e.g., 160A and 160B in client network 150A of client 148A, or 160D and 160E in client network 150B of client 148B), and transmit the usage information to the pricing optimizer 181. The pricing optimizer 181 may use the client-side usage metrics to help generate recommendations for the kinds of instances 130 that the client should consider for use. In some cases, the pricing optimizer 181 may obtain usage records from both provider-side metrics agents 140 and client-side metrics agents 190.

In addition to usage records, pricing optimizer 181 may also use a number of other pieces of information to make its recommendations in some embodiments. For example, in one embodiment the interface manager subcomponents of pricing optimizer 181 (and/or the resource manager 180) may implement one or more programmatic interfaces, examples of which will be shown below, to allow clients 148 to specify one or more preferences and/or optimization goals to serve as additional input for the process of determining recommendations. In addition, the recommendations made by the pricing optimizer 181 may be dependent on various types of pricing information in some embodiments—for example, past pricing trends for different types and sizes of resource instances, pricing constraints specified by clients 148, anticipated future pricing trends extrapolated or estimated by the pricing optimizer, and so on. Some or all of the types of information used by the pricing optimizer 181 to make its recommendations, and the types of information maintained by the resource manager for resource reservations, allocations and pricing, may be stored in a persistent store such as a resource management database 191 in some embodiments.

Resource Instances Categories and Associated Pricing Models

Figure 2A:
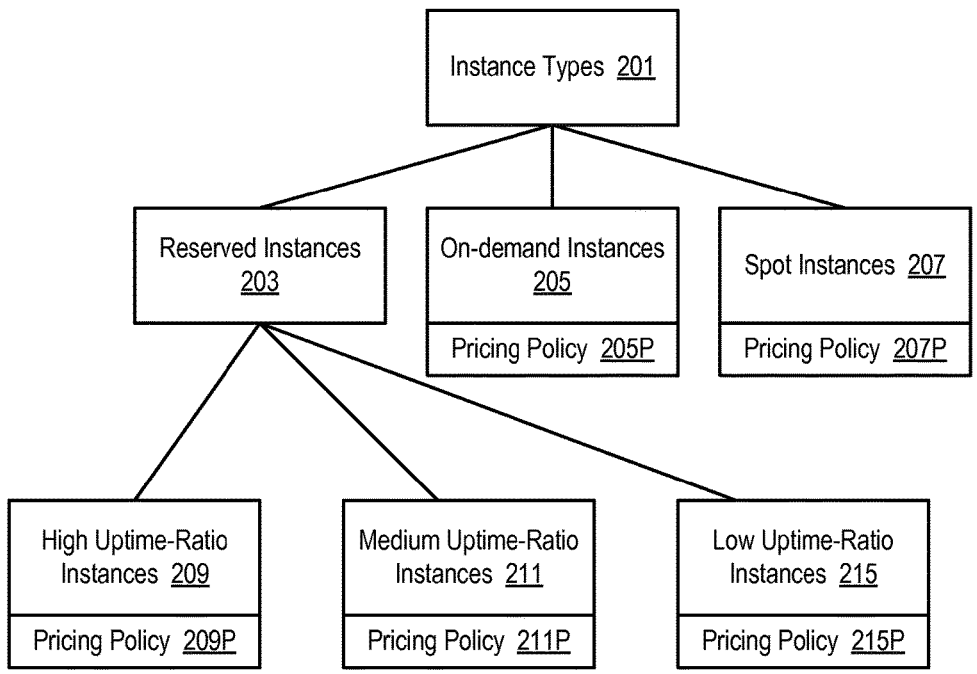
FIGS. 2*a* and 2*b* illustrate example resource instance classification approaches, according to at least some embodiments.
Figure 2B:
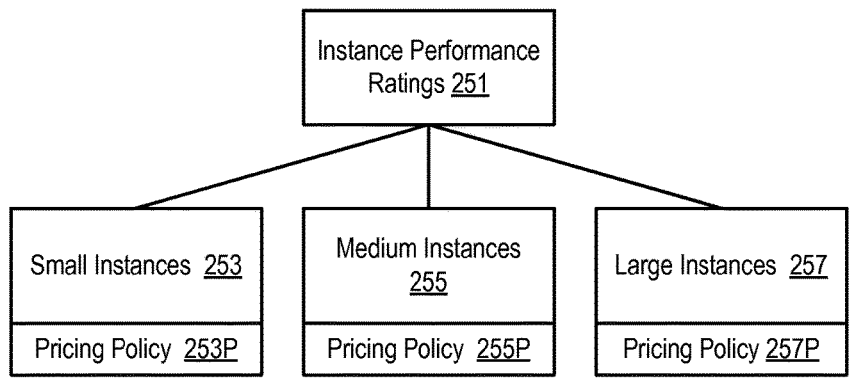

The resource instances 130 of a provider network may be grouped into classes or categories based on several different dimensions in some embodiments, and the pricing policies associated with different classes may differ. FIGS. 2a and 2b illustrate example resource instance classification approaches, according to at least some embodiments. FIG. 2a illustrates an approach in which instances are classified based in part on the timing or duration of instance allocations—i.e., on when instances are obtained by clients and when they are released by the clients. Three high-level types 201 of resource instances are shown: reserved instances 203, on-demand instances 205, and spot-instances 207, each with respective pricing policies 203P, 205P and 207P. In one embodiment, a client 148 may reserve an instance for fairly long periods, such as a one-year term or a three-year term in accordance with the pricing policy 203P, by paying a low, one-time, upfront payment for the instance, and then paying a low hourly rate for actual use of the instance at any desired times during the term of the reservation. Thus, the client 148 may, by making the long-term reservation, be assured that its reserved instance 203 will be available whenever it is needed.

If a client 148 does not wish to make a long-term reservation, the client may instead opt to use on-demand instances 205 (or spot instances 207). The pricing policy 205P for on-demand instances 205 may allow the client 148 to pay for resource capacity by the hour with no long-term commitment or upfront payments. The client 148 may decrease or increase the resource capacity used, based on application needs, and may only have to pay the hourly rate for the instances used. In some cases the per-hour pricing for on-demand instances may be higher than the hourly rate for reserved instances, because the relatively long durations of reservations may provides a more stable revenue stream to the operator of the provider network than the potentially more dynamic revenue stream provided by on-demand instances. Spot instances 207 may provide a third type of resource purchasing and allocation model. The spot pricing policy 307P may allow a client 148 to specify the maximum hourly price that the client is willing to pay, and the resource manager 180 may set a spot price for a given set of resource instances 130 dynamically based on the prices clients are willing to pay and on the number of instances available to support the spot model. If a client 148's bid meets or exceeds the current spot price, an instance may be allocated to the client. If the spot price rises beyond the bid of the client using a spot instance 207, access to the instance by the client may be revoked (e.g., the instance may be shut down).

The prices of reserved instances 203, on-demand instances 205, and spot instances 207 may also vary based on the availability zones 120 or geographic regions in which the instances are located. The operator of provider network 110 may have had to pay different costs for setting up data centers in different physical locations, and may have to pay varying location-dependent ongoing costs for infrastructure and maintenance services such as network connectivity, cooling and so on, which may result in different pricing policies for different availability zones and/or regions. Fluctuations in supply and demand may also result in time-varying prices for the different types of instances. Of course, the price for a given long-term reservation may typically remain unchanged once a client completes the reservation.

In some embodiments, reserved instances 203 may be further classified based on expected uptime ratios. The uptime ratio of a particular reserved instance 130 may be defined as the ratio of the amount of time the instance is activated, to the total amount of time for which the instance is reserved. Uptime ratios may also be referred to as utilizations in some implementations. If a client 148 expects to use a reserved instance for a relatively small fraction of the time for which the instance is reserved (e.g., 30%-35% of a year-long reservation), the client may decide to reserve the instance as a Low Uptime Ratio instance 215, and pay a discounted hourly usage fee in accordance with the associated pricing policy 215P. If the client 148 expects to have a steady-state workload that requires an instance to be up most of the time, the client may reserve a High Uptime Ratio instance 211 and potentially pay an even lower hourly usage fee, although in some embodiments the hourly fee may be charged for the entire duration of the reservation, regardless of the actual number of hours of use, in accordance with pricing policy 211P. An option for Medium Uptime Ratio instances 213, with a corresponding pricing policy 213P, may be supported in some embodiments as well, where the upfront costs and the per-hour costs fall between the corresponding High Uptime Ratio and Low Uptime Ratio costs.

Instance pricing may also vary based on other factors. For example, in the case of compute instances, the performance capacities of different CPUs and other components of compute servers such as memory size may come into play. FIG. 2b shows an example classification of compute instances based on instance performance ratings 251. Large instances 253 may have more computing capacity than medium instances 255, which in turn may have more computing capacity than small instances 257. Accordingly, different pricing policies 253P, 255P and 257P may be implemented for the different sizes of instances. In some embodiments, software features such as operating systems, hypervisors, middleware stacks and the like may also be taken into account in determining the pricing policies associated with various instances. For both compute instances and storage instances, storage device characteristics such as total storage capacity, supported I/O rates and the like may be used to develop pricing policies in some implementations. Pricing policies may also be determined by networking capabilities and networking usage (e.g., number of megabytes of data transferred, and/or the distances over which network traffic is transmitted). Other classification dimensions and techniques, including extensions of the basic hierarchies shown in FIGS. 2a and 2b, may be implemented in other embodiments. The various pricing policies, including static and dynamic components of pricing, as well as location-dependent and location-independent components, may be used by pricing optimizer 181 to make its recommendations, as described below in further detail. Some or all of the pricing information may be stored in resource management database 191, and the pricing optimizer 181 may retrieve the information from the database as needed. In some embodiments the resource instances of a provider network may be organized as pools based on, for example, which instances are currently being used as on-demand instances (e.g., pools 123A and 123B of FIG. 1), which instances are reserved (e.g., pools 121A and 121B), which are currently idle or available (e.g., pool 125A), and so on.

Pricing Optimizer Information Sources

Figure 3:
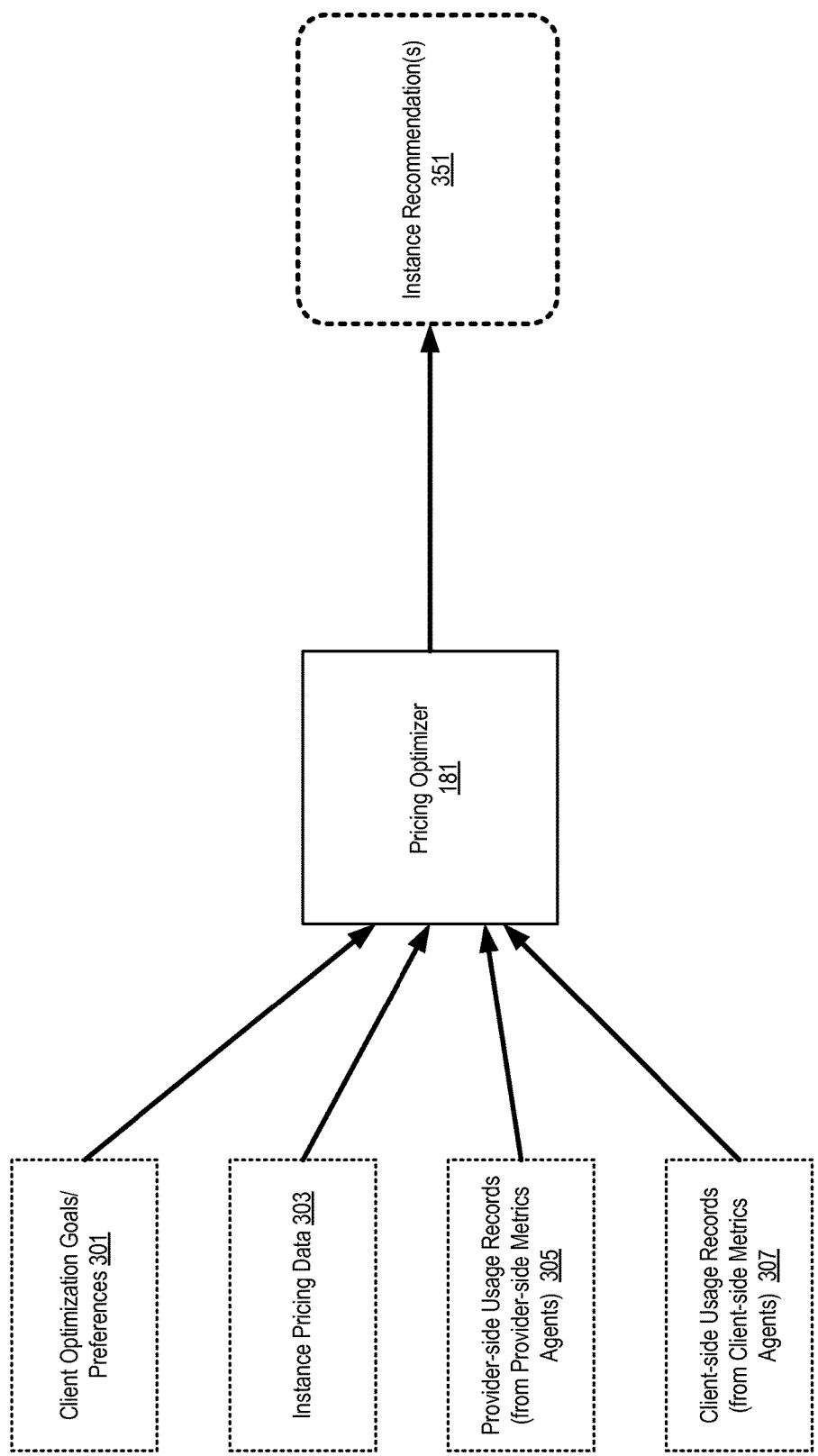
FIG. 3 illustrates an example of a set of sources from which data may be obtained by a pricing optimizer to generate recommendations, according to one embodiment.

FIG. 3 illustrates an example of a set of sources from which data may be gathered by pricing optimizer 181 to generate recommendations, according to one embodiment. As shown, the pricing optimizer may obtain client optimization goals and/or preferences 301, a variety of instance pricing data 303 for different types of resource instances, provider-side resource usage metrics 305, and/or client-side resource usage metrics 307, and use any appropriate combination of these input sources to determine instance recommendations 351 for a client 148.

In some embodiments, the pricing optimizer 181 and/or the resource manager 180 may implement one or more programmatic interfaces allowing clients to specify their optimization goals or preferences. For example, one or more web pages may be provided, using which clients 148 may enter or select their preferences for overall optimization goals (e.g., the logical equivalent of "Give me any suggestions you have for reducing my bills") and/or indicate more specific preferences (such as the equivalent of "I prefer to use large instances as often as possible" or "I prefer to use instances in availability zones X and Y if possible"). In some embodiments if a client 148 does not indicate a specific optimization goal but does indicate that it is willing to get recommendations, the pricing optimizer may use default optimization goals such as the logical equivalent of "Based on trends derived from last quarter's resource usage, identify the most economical instance types and quantities to use for the next quarter". Clients 148 may indicate preferences for any combination of various types of instance characteristics such as instance size, reserved vs. on-demand vs. spot, interruptibility settings, availability zones, operating systems, software stacks, and so on in some embodiments. In some embodiments the client 148 may specify budget details—e.g., "I have a resource instance budget limit of $50,000 for the period Jan. 1-Mar. 31, 2012" and request that the budget limits be used in generating the recommendations. In one embodiment a client 148 may be allowed to indicate whether they wish to participate in an automated savings notification program, e.g., whether the client would like to learn of a recommendation that suggests a way to save a specified amount in billing charges. In such an embodiment, the client 148 may for example indicate to the pricing optimizer 181 that the client 148 only wishes to receive recommendations that could save the client at least $5,000 (or some chosen amount) over a specified period of time. Clients 148 may also indicate other types of preferences, such as the types of resource usage and/or billing data the client is willing to provide for pricing optimization purposes, the intervals at which the resource usage data is collected, the methods (such as web-based notifications, social media-based notifications, email notifications or the like) the pricing optimizer should use to notify the client regarding recommendations, in some implementations.

The pricing optimizer 181 may obtain past and current pricing data 303 for various types of resource instances, as well as the billing amounts that were charged to the specific client or clients 148 for whom a recommendation is being developed. Historical pricing data could for example be obtained from the resource management database 191, and/or from a separate billing database, in some embodiments. The pricing optimizer 181 may use historical pricing and billing data gathered for various time periods to estimate future billing amounts (assuming the same trends continue) for a given client 148 in one embodiment, and may provide such anticipated trends, as well as historical billing and usage data to the clients via a programmatic interface. For example, based on past usage and billing, the pricing optimizer may be able to inform a client that the client's costs are likely to rise by X percent over the next Y months, which might make the idea of receiving recommendations that could lower bills more attractive to the client.

In some embodiments, one or more provider-side metrics agents 140 may serve as sources of resource usage data for a given client 148. Such agents may be instantiated at various points in the provider network 110, and may be used for multiple purposes—e.g., for monitoring the provider network's resources over time to ensure that the resources are functioning and performing in desired operation ranges, to help generate billing information that may be based on usage, as well as to provide inputs to the pricing optimizer 181. Various kinds of usage data may be gathered for a given client 148, such as the types and sizes of instances reserved and used, the uptimes of the instances, the operating system and other software elements in use, IP addresses, CPU utilizations, memory utilizations, I/O rates, I/O device utilizations, network transfer rates and network device utilizations, and so on. Performance and uptime related usage metrics may help the pricing optimizer decide the specific instance types to recommend for the client—e.g., whether large vs. medium vs. small instances should be recommended, and/or whether, for reserved instances, high-uptime ratio vs. medium uptime-ratio vs. low-uptime ratio instance should be recommended.

Clients 148, or potential clients of the provider network 110 who wish to learn about savings that might accrue if they decide to use the resource instances of the provider network 110, may in some embodiments allow resource usage data to be gathered from client premises, client networks, and/or client data centers. In one embodiment an installable client-side metrics agent 190 may be made available to the client or prospective client. After the client-side metrics agent 190 is installed and activated, it may gather and transmit usage data to the pricing optimizer 181, e.g., in accordance with the preferences specified by the client or prospective client. In some implementations, the gathered information may first be provided to the client 148 for approval, before it is transmitted to the pricing optimizer, so that the client is assured that sensitive data is not transmitted to the pricing optimizer. Client-side metrics agents 190 may gather information such as client device resource specifications (e.g., server vendors and models, CPU models and speeds, memory sizes etc.), in addition to the types of data gathered by provider-side metrics agents 140. In some embodiments the types of hardware and/or software stacks being used at client premises or data centers may differ from the types of hardware being used for resource instances 130 of the provider network 110. For example, the client may use a different server vendor that provides servers using a different CPU type or processor architecture than the provider network does. In such cases, the pricing optimizer 181 may also be required to map or translate resource usage data gathered from the client's hardware/software combination to units that are useful in determining the equivalent number and type of resources of the provider network's hardware/software combinations. For example, the client might use hardware vendor A's servers, each of which uses N CPUs of type K, while the provider network uses hardware vendor B's servers, each of which uses P CPUs of type L. CPU utilization and other data gathered from the client's servers in such an example may need to be transformed or modified (e.g. using ratios of results of industry standard performance benchmarks that have been run on both types of CPUs) to determine equivalent metrics at the provider network's instances 130.

Using the various sources of information shown in FIG. 3, the pricing optimizer may generate recommendations 351 for various instance operations (such as future long-term reservations, suggested reselling of existing reservations, future use of on-demand instances or spot instances, and so on) that the client 148 should perform to obtain the best value for the client's budget. In one implementation, for example, a client may have reserved one or more large instances (i.e., instances with a high performance capability rating). Based on factors such as the actual resource usage by the client and the uptimes of the reserved large instances, which may show that the client does not typically use much of the reserved compute capability of the large instances, the pricing optimizer 181 may suggest in the recommendation that smaller instances should be used instead of large instances, thereby potentially reducing the client's billing costs while still accomplishing the computation goals of the client. In implementations where the resale of existing reservations is supported, the pricing optimizer 181 may in this example recommend that the large reserved instance slots be resold, and that slots for smaller reserved instances be obtained instead. The recommendations 351 may be transmitted to the client 148 in accordance with the client's notification preferences—e.g., using a web notification, social media, email, and/or a combination of notification options.

Example Web-Based Interfaces for Pricing Optimizer Interactions

Figure 4:
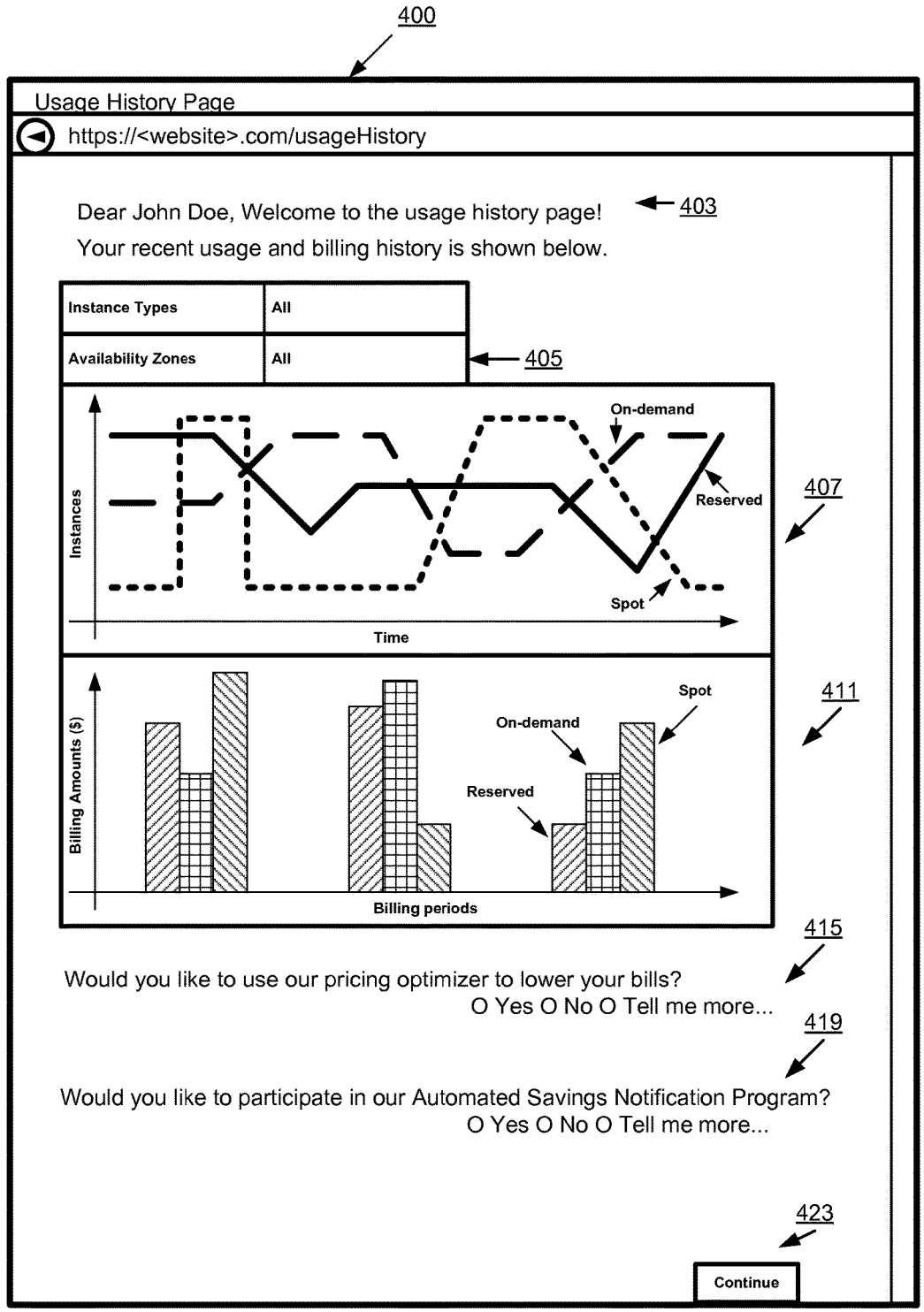
FIG. 4 illustrates a portion of an example web-based interface that may be used to display past usage and billing information to a client, according to some embodiments.

FIG. 4 illustrates a portion of an example web-based interface that may be used to display past usage and billing information of a client's resource instances, according to some embodiments. As shown, the interface may comprise a web page 400 including a number of different regions. The web page 400 may include a welcome message area 403 and one or more filtering options 405 allowing a client to select the instance types (e.g., reserved instances vs. on-demand instances vs. spot instances), availability zones, and any other appropriate search filtering parameters. Drop-down options may be provided for the filtering choices in some implementations, so that a given client 148 viewing page 400 may select from the relevant subset of choices that apply specifically to that client.

A graphical display region 407 may show, for example, the number of instances of different types that were used by the client (in accordance with the filtering options specified) during a particular period of time. In the illustrated graph, three lines are shown in region 407, one line each respectively representing usage of reserved instances, on-demand instances, and spot-instances. In some implementations a second graphical region 411 nay show corresponding billing amounts for the different types of instances 130, over one or more billing periods that may correspond to the time range shown in the usage graph. Various other techniques to represent usage and/or billing amounts (e.g., pie charts, superimposed maps, and the like) may be utilized in different implementations of the usage history interface.

In one embodiment, a web page similar to web page 400 may allow the client 148 to indicate whether the client wishes to utilize the services of a pricing optimizer 181. For example, in FIG. 4, the client may select from the answers "Yes", "No" and "Tell me more . . . " to respond to the question "Would you like to use our pricing optimizer to lower your bills" in region 415. If the client selects the "Tell me more . . . " option, details regarding the functionality of the pricing optimizer 181 may be displayed. Similarly, a client may be allowed to indicate whether the client wishes to participate in an automated savings notification program in some implementations. If the client elects to participate in an automated savings notification program, the client may specify a minimum saving amount that the pricing optimizer should use to determine whether a notification of recommended actions is to be sent to the client. As shown, the client may select from among the answers "Yes", "No" and "Tell me more . . . " to respond to the question regarding automated savings notifications in region 419 of web page 400. If the client selects "Yes" to either question, a different page may be displayed allowing more details to be shown regarding the services the client wishes to use. The button labeled "Continue" may be used by the client to progress to the next part of the interface after the answers to the opt-in questions of regions 415 and 419 are answered. Various portions of the web page 400 may be arranged differently, and may be displayed as parts of several different pages, in different implementations. In some embodiments usage information may be aggregated for multiple clients and displayed together (e.g., if a large corporation wishes to view usage history for multiple individual users of provider network 110).

FIG. 5 illustrates a portion of an example web-based interface that may be used by a client to specify preferences to pricing optimizer 181, according to some embodiments. The web page 500 shown in FIG. 5 may be displayed after a client 148 makes an initial decision to opt in for the services provided by pricing optimizer 181 (e.g., by selecting the "Yes" option in region 415 of FIG. 4). In the illustrated example web page 500, region 503 may include a message to the client asking the client to provide as many preference details as they wish to provide.

Region 507 of web page 500 may include a number of form fields that the client 148 may fill out. One field 509 may, for example, allow the client to specify a target budget that the pricing optimizer may use as an optimization constraint. A default selection value indicating that the client does not wish to specify an exact budget, but does wish to minimize its bill, is shown in the target budget value field 509 in FIG. 5. In some embodiments, instead of or in addition to a budget-related target, a client may specify an instance count availability target, e.g., a particular client may wish to ensure that at least N large compute instances be reserved. An instance count availability target field 510 may be provided for clients to specify such instance availability-related targets in such embodiments. The client may use a field 511 to specify preferences for availability zones in some implementations. In some embodiments, if the client does not specify availability zones or other location-related preferences, the pricing optimizer may utilize IP address information obtained from the provider-side and/or client-side usage metrics agents to determine the most appropriate availability zones or locations to suggest in its recommendations. For example, each instance 130 of the provider network may have one or more IP addresses whose availability zone and/or geographical region may be deduced or obtained by the pricing optimizer. Similarly, physical locations for client-side IP addresses may be looked up or provided by the client, thus allowing the pricing optimizer to choose the most appropriate availability zones/regions for the recommended resource instances, e.g., based on proximity to the client resources.

Client preferences for instance types (e.g., reserved vs. on-demand) may be specified via a field 513 of region 507 in some embodiments. Interruptibility setting preferences (e.g., do-not-interrupt vs. fully-interruptible) may be specified using a field 515, and instance size or performance rating preferences may be specified via a field 517. The client's interruptibility preferences may be usable by the pricing optimizer to select the specific instance pool for one or more recommended instances in some implementations (especially in embodiments where multiple interruptibility settings are supported, as described below in greater detail). In some implementations a client may be able to provide the pricing optimizer with information about an expected change in demand—e.g., if the client is aware that an aggressive advertisement strategy may result in a greater load on the instances that the client uses for its e-commerce website within a month, such information may be provided to the pricing optimizer using a field similar to field 519 shown in FIG. 5. Field 519 or similar fields may also be usable by the client to specify various "what-if" scenarios, e.g., to find the kinds of recommendations the pricing optimizer might develop based on various workload scenarios (such as a 100% increase in compute demand) that may or may not actually arise. The client may also provide preferences regarding the mechanism(s) to be used to provide recommendations (e.g., via e-mail, social media notifications, and so on) using a field 523, and the preferred frequency or schedule with which the recommendations are to be provided via a field 521. Various other client optimization preferences may be provided in different implementations. Default values for some or all of the preferences may be used by the pricing optimizer if the client does not provide specific preferences in some embodiments.

Figure 6:
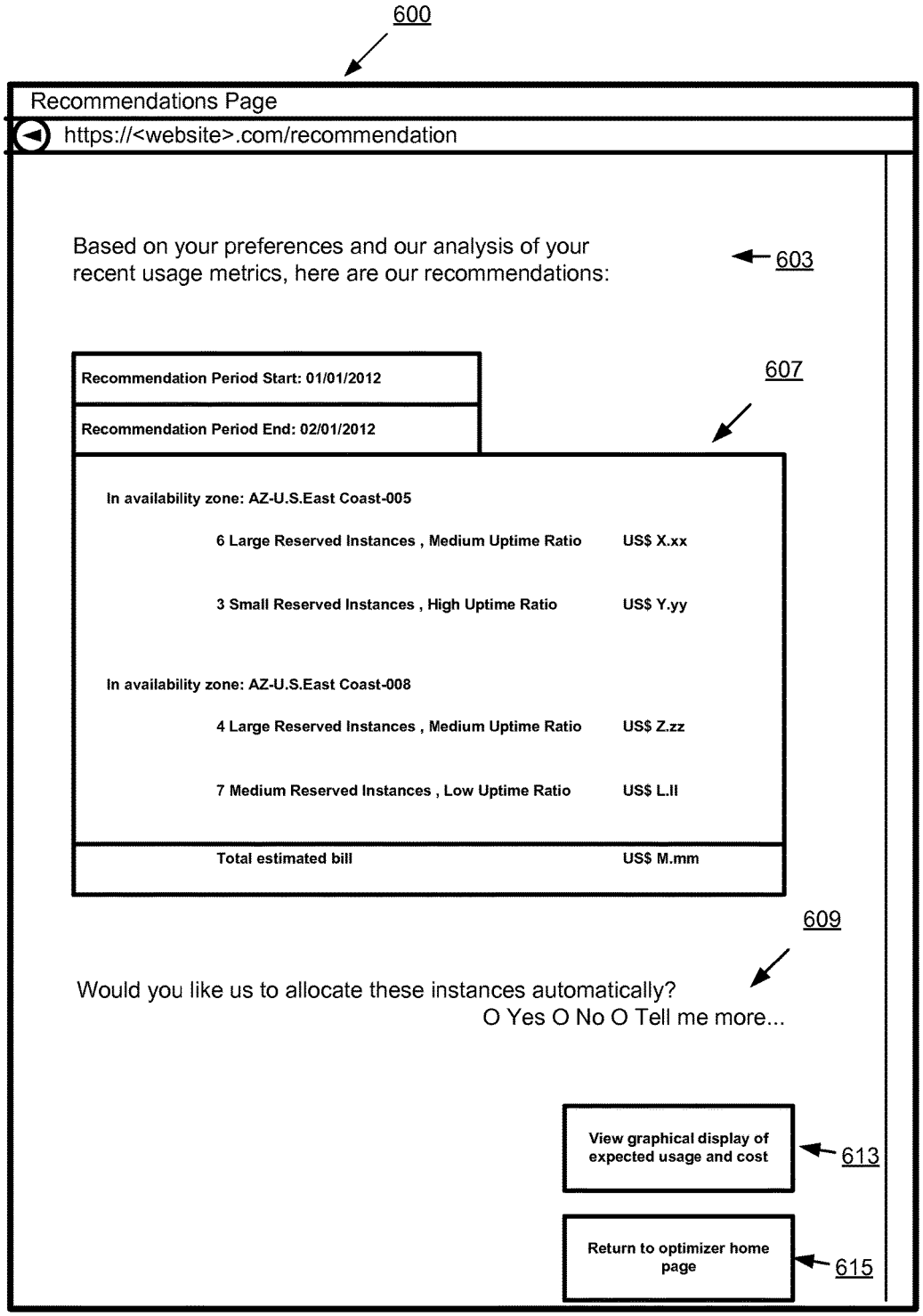
FIG. 6 illustrates a portion of an example web-based interface that may be used to provide one or more instance recommendations, according to some embodiments.

FIG. 6 illustrates a portion of an example web-based interface that may be used to provide one or more instance recommendations, according to some embodiments. After receiving an indication that a particular client 148 wishes to utilize its services, and after obtaining the client's optimization goals and preferences as well as the inputs needed from other source shown in FIG. 3, the pricing optimizer may perform various computations needed to arrive at some recommended set of actions for the client to take. The results of these computations, which may be based on one or more heuristics or algorithms implemented by the pricing optimizer 181, may be displayed to the client via a web page similar to web page 600 in some implementations.

As shown, web page 600 may comprise a message region 603 in which the pricing optimizer informs the client 148 that a recommendation has been generated. A region 607 may comprise various details of a recommendation. For example region 607 may include an indication of a time period covered by the recommendation (e.g., a start time and a stop time, such that the actions in the recommendation should be made effective during the period between the start and stop time). In implementations where availability containers such as availability zones are used, the recommendations may be grouped by availability zones. For each availability zone in such an implementation, the number, size, type, uptime ratio and various other details for the instances 130 that the client 148 should obtain may be indicated. In some embodiments, as noted above, the pricing optimizer may determine target availability zones for various recommended instances based on the analysis of IP addresses used by the clients, as indicated in usage records collected for the client. The IP addresses might indicate geographical locations where the client has used equipment in the past, which may in turn be helpful in selecting the data centers and corresponding availability zones appropriate for the client.

In the illustrated example, the price of each line item (i.e., each set of like instances) may also be displayed, as well as the total bill associated with the reservation. In some embodiments, the pricing optimizer may allow the client to specify whether the client wishes to have the recommendation implemented automatically, e.g. without obtaining additional consent from the client for one or more recommended actions. In the example shown in FIG. 6, the client may opt-in for such an automated recommendation implementation by selecting the "Yes" option in response to the question "Would you like us to allocate these instance automatically?" in region 609. In some implementations the interface may allow the client 148 to request a viewing of a graphical display of the recommendation (e.g., via button 613 of FIG. 6). A button 615 may allow the user to return to the pricing optimizer's home page.

Figure 7:
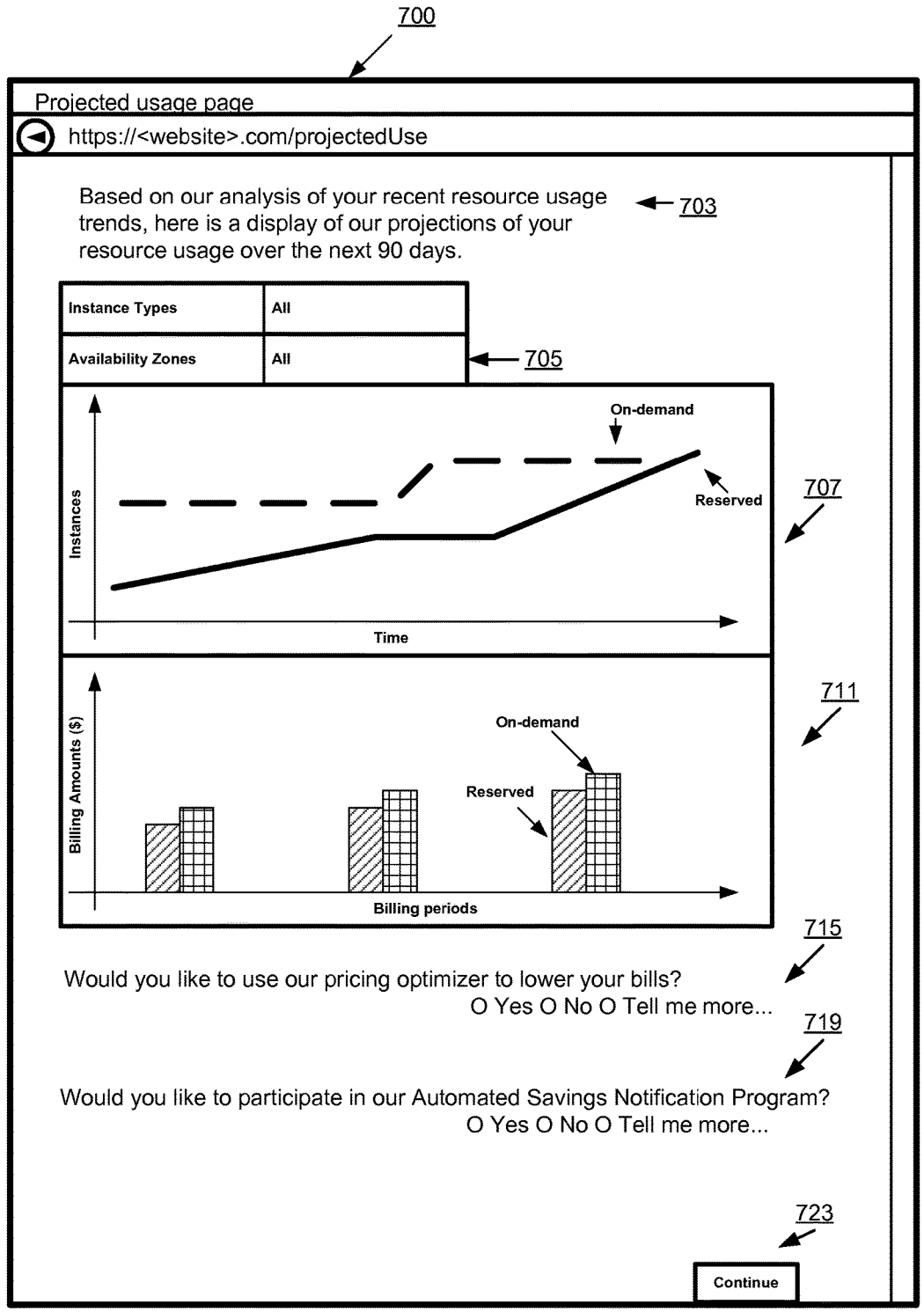
FIG. 7 illustrates a portion of an example web-based interface that may be used to display projections of future resource usage, according to some embodiments.

FIG. 7 illustrates a portion of an example web-based interface that may be used to display projections of future resource usage, according to some embodiments. In the illustrated web page 700, the pricing optimizer displays anticipated future usage and billing for a particular client 148, e.g., based on analysis of the client's earlier usage records. (The illustrated example shows projections based on the trends observed in the client's usage history, prior to implementing any suggested recommendations. Similar graphical displays of the results of recommendations may also be shown in some embodiments, e.g., as a result of a client clicking on button similar to button 613 of FIG. 6).

As shown, the web page 700 includes a message area 703 indicating to the client that the page shows projected usage based on analysis of some period of past usage. The types of instances 130 and availability zones 120 for which the projections are shown may be selected using filtering options 705 in some implementations. One display area 707 may show a graphical representation of the expected use of various types of instances over some future period, and a second display area 711 may show the corresponding expected billing amounts in some implementations. The client 148 may be allowed to indicate whether they wish to use the services of the pricing optimizer, e.g., by responding affirmatively to the question shown in region 715. In some implementations the client may be given the opportunity, e.g., via response to the question shown in region 719, to opt for an automated savings notification program similar to the one discussed earlier in conjunction with the description of FIG. 4. Button 723 may allow the client to proceed to the next step in the interaction. Variations of the types of web pages shown in FIG. 4-FIG. 7 may be implemented in different embodiments. Some of the elements shown within a single web page may be separated into two or more interactions, or elements shown in multiple web pages may be combined into one web page. Interfaces other than web pages, such as installable thin clients, APIs, or command-line tools may be used in other embodiments.

Methods to Implement Pricing Optimizer Functionality

Figure 8:
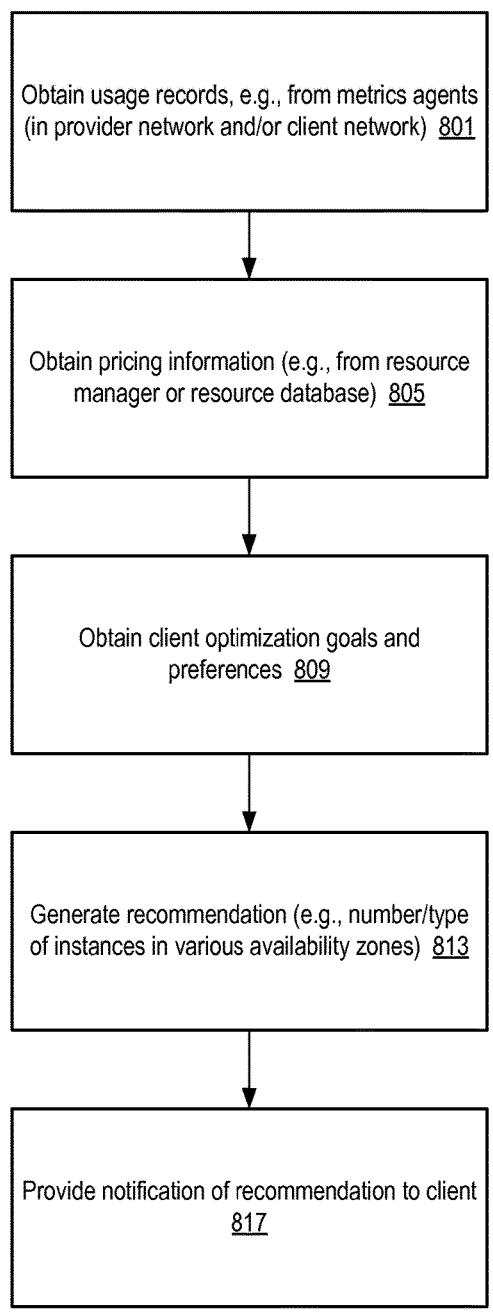
FIG. 8 is a flow diagram illustrating aspects of the functionality of a pricing optimizer, according to at least some embodiments.

FIG. 8 is a flow diagram illustrating aspects of the functionality of a pricing optimizer, according to at least some embodiments. As shown in element 801, resource usage records of a client or prospective clients may be obtained from one or more usage data sources, for example from provider-side metrics agents 140 and/or client-side metrics agents 190. Various kinds of usage information, such as the number and types of resources used, the specific hardware/software stacks used, the uptimes (periods during which the resources were activated), CPU utilizations, I/O rates and device utilizations, network transfer rates and device utilizations, IP addresses, and the like, may be gathered either from within the provider network, or from the client network, or both. In some embodiments the usage data may be transmitted directly from various metrics agents to the pricing optimizer, while in other cases the usage data records may be stored in a repository such as the resource management database 191, and may be retrieved as needed by the pricing optimizer. In some implementations monitoring tools that may be included within installed software components on various resource instances, such as operating system-provided performance monitors or tools, may be used to gather at least a portion of the usage data.

As shown in element 805, pricing information on various types of instances may be obtained, for example from the resource manager 180 and/or a price history database that may in come implementations be included in the resource management database 191. The pricing information may be gathered for some recent time period, such as the previous month or the previous three months; the length of the period may be configurable in response to client preferences in some implementation. By combining portions of the pricing information with resource usage information, the actual amounts billed to a given client may be computed in some implementations. In other implementations the client's billing history may be obtained. In embodiments where billing records and usage records are both obtained, billing and usage data may be cross-checked for mutual consistency.

The client's optimization goals and preferences may be obtained as well in some embodiments, as shown in element 809. In some implementations the goals and/or preferences may be obtained via a programmatic interface, examples of which are illustrated in FIGS. 4 and 5. Default goals such as a general desire to reduce costs may be used if specific goals and/or preferences are not provided by the client. Taking the usage data, the pricing data, and the goals/preferences into account, one or more recommendations regarding future instance use may be generated, as shown in element 813 of FIG. 8, and a notification of the recommended action(s) may be provided to the client (element 817). Recommendations may include any combination of a wide variety of suggested actions, such as actions to acquire or reserve instances, to resell existing reservation slots, to substitute one reservation for another in a different availability zone, to use different sizes of instances, to use spot instances instead of longer-term allocations, and so on.

Figure 9:
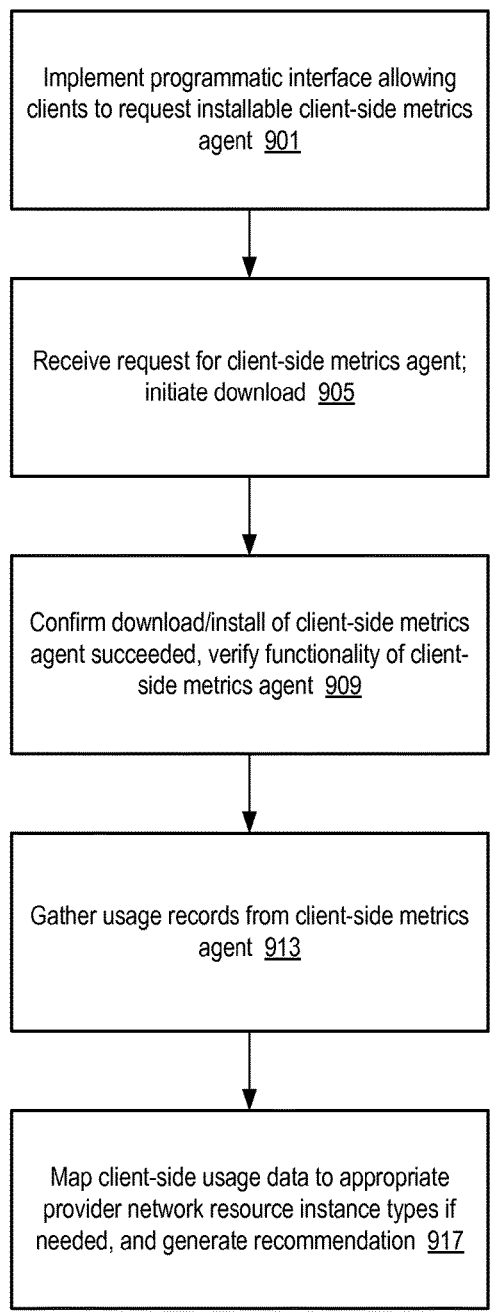
FIG. 9 is a flow diagram illustrating a subset of the functions of a pricing optimizer related to the use of a client-side metrics agent, according to at least some embodiments.

In some embodiments clients may be given the opportunity to install client-side metrics agents 190 at client devices and/or in client networks to help provide input to pricing optimizers 181. FIG. 9 is a flow diagram illustrating a subset of the functions of a pricing optimizer 181 relating to the use of a client-side metrics agent 190, according to at least some embodiments. As shown in element 901 of FIG. 9, a programmatic interface such as one or more web pages or web sites may be implemented, allowing clients to submit a request to obtain a client-side metrics agent to gather data that may be usable by a pricing optimizer to generate recommendations. When such a request is received (element 905), a download of the client-side metrics agent software may be initiated in some implementations. In other implementations the software for a client-side metrics agent may be transmitted using other means, such as a DVD or a CD which may be provided to the client. The software may for example include one or more executable programs or scripts that enable the monitoring of resource usage and the transmission of the gathered data back to the pricing optimizer 181 or to some intermediary (e.g., a resource manager 180 or a resource management database 191) from which the pricing optimizer 181 can obtain usage records.

The success of the download and/or installation of the client-side metrics agent 190 may be verified in some embodiments (element 909) and one or more tests may be run to verify that the agent is working correctly. For example, in one implementation one or more short compute-intensive tests may be run on a client's compute server, and the CPU utilization data gathered by the client-side metrics agent 190 during the test run may be sanity checked. In some embodiments multiple copies or instances of the client-side metrics agent 190 may be installed at various devices or entities of the client's data centers, and the functionality of some subset or all of the instances or copies may be checked. After the functionality and connectivity of the client-side metrics agent is verified, collection of usage records of the client-side resources may begin (element 913).

In some environments the client-side resources may differ from the resources used for the provider network's resource instances 130. For example, compute servers used in the client's data centers may employ CPUs with a different architecture and clock speed, or the client's systems may use a different operating system. In such environments, the measurements included in the client-side usage data records may have to be translated or mapped into their approximate equivalents with respect to the provider network's resource instances (element 917). For example, using either externally published benchmark results or proprietary performance test results, the pricing optimizer 181 in one embodiment may determine that if the execution of a given workload on a client-owned CPU C1 from vendor V1 results in a CPU utilization of 50%, an equivalent workload when run on a CPU C2 used at a resource instance 130 of the provider network may result in a CPU utilization of 75%. Such mappings of client-side resource characteristics and capabilities to provider-side resource characteristics and capabilities may be helpful in generating useful recommendations.

Figure 10:
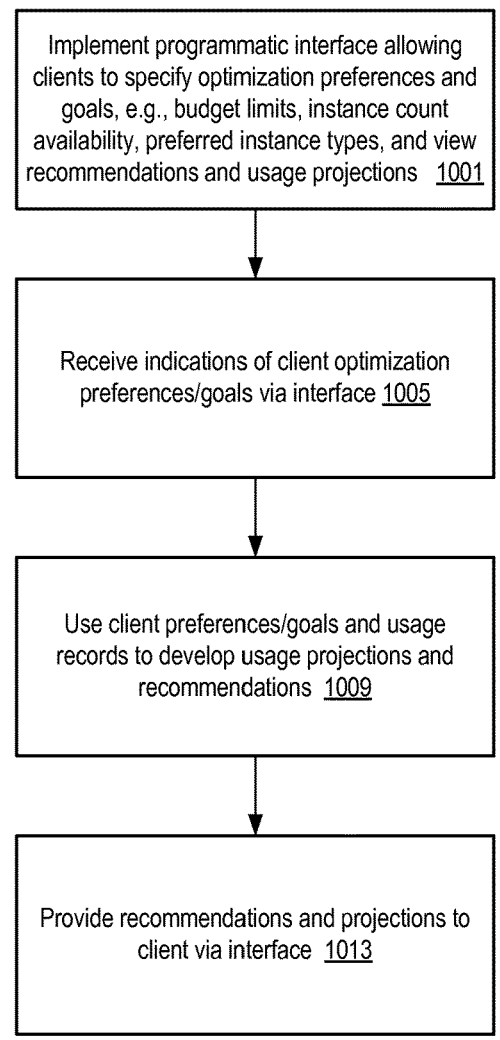
FIG. 10 is a flow diagram illustrating aspects of the functionality of a pricing optimizer that implements a programmatic interface allowing clients to indicate optimization preferences, according to at least some embodiments.

FIG. 10 is a flow diagram illustrating aspects of the functionality of a pricing optimizer 181 that implements a programmatic interface allowing clients to indicate optimization preferences, according to at least some embodiments. As shown in element 1001, a programmatic interface such as a web page, an API or a command-line interface may be implemented. Using the interface, a client or a prospective client may indicate various types of optimization goals or desired instance attributes. For example, high-level goals may include a desire to spend no more than a target budget amount for resources during a given period of time, or a desire to save a specified amount compared to a previously-incurred billing amount. More specific, lower-level goals or preferences indicated by the interface may include, for example, preferred instance sizes, availability zones, geographical regions, instance interruptibility levels, installed software programs or program versions, and so on.

The pricing optimizer 181 may receive one or more indications of a client's optimization goals and/or preferences formatted according to the interface (element 1005) and use the goals or preferences, together with resource usage records, to develop recommendations and projections of future usage and costs (element 1009). In some implementations the recommendations and/or projections may be provided to the client 148 using additional elements of the same interface (element 1013). In other implementations one or more different techniques or interfaces may be used to notify the client regarding recommendations—for example, clients may specify their goals and preferences via a web interface but may receive recommendations via e-mail.

Figure 11:
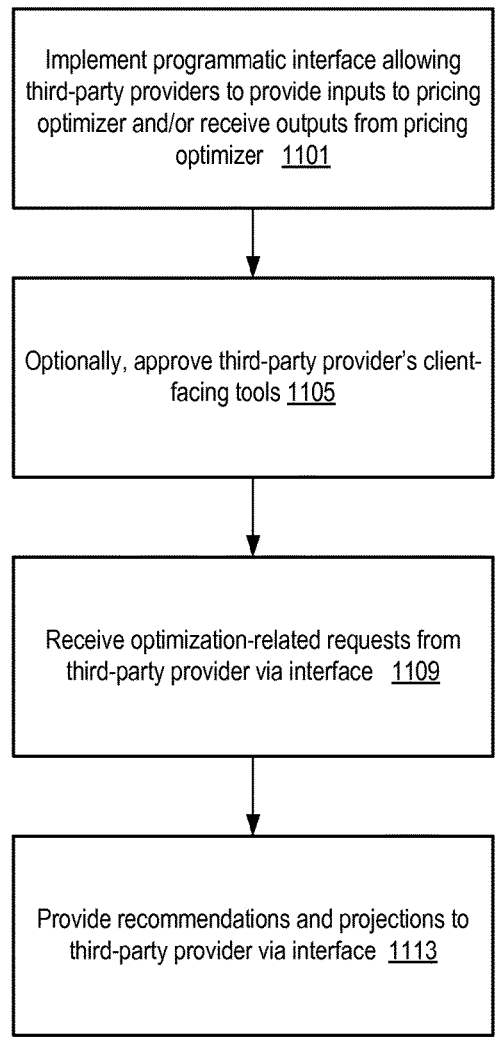
FIG. 11 is a flow diagram illustrating aspects of the functionality of a pricing optimizer 181 that implements a programmatic interface (such as an API, a command-line interface or a web-based interface) supporting third-party interations, according to at least some embodiments.

In one embodiment, portions of the services provided by the pricing optimizer 181 may be exposed to third parties (i.e., entities other than the clients 148 which directly utilize the resource instances 130 of the provider network 110). Intermediaries such as resource management software vendors or resellers of the provider network's resources may for example wish to provide guidance to their own clients on how best to manage their resource budgets. FIG. 11 is a flow diagram illustrating aspects of the functionality of a pricing optimizer 181 that implements a programmatic interface (such as an API, a command-line interface or a web-based interface) supporting third-party interactions, according to at least some embodiments. As shown in element 1101, third-party entities may be allowed to provide inputs to, and/or receive outputs from, the pricing optimizer 181 using such an interface in some embodiments. In some implementations, for example, an API may be exposed to third party providers that implements a subset or all of the capabilities exposed to clients 148 via web pages, e.g., resource usage and billing history may be made available via the API, optimization goals and preferences may be expressed via the API, and so on. In some implementations client-side metrics agents may be made available for third parties to utilize at client-side premises or third-party premises.

In some embodiments where the third party provider intends to build one or more tools or extensions based on the services provided by the pricing optimizer 181, the provider network operator may wish to retain the right to approve/disapprove the extensions or tools, so that for example the brand name of the provider network is not affected negatively by a poorly implemented tool or extension. In such an embodiment, the third-party provider's client-facing tools or extensions may require approval before being made available to its clients (element 1105). Various optimization-related requests, such as requests to provide projections of future resource use by a client (e.g., a client of the third-party provider that also uses instances 130 of the provider network 110) based on past use, or a request for recommended instance actions to reduce billing, may be received via the third-party interface in some embodiments (element 1109). Responses to the optimization-related requests may be provided in accordance with the programmatic interface (element 1113).

Automated Instance Acquisition Actions

Figure 12:
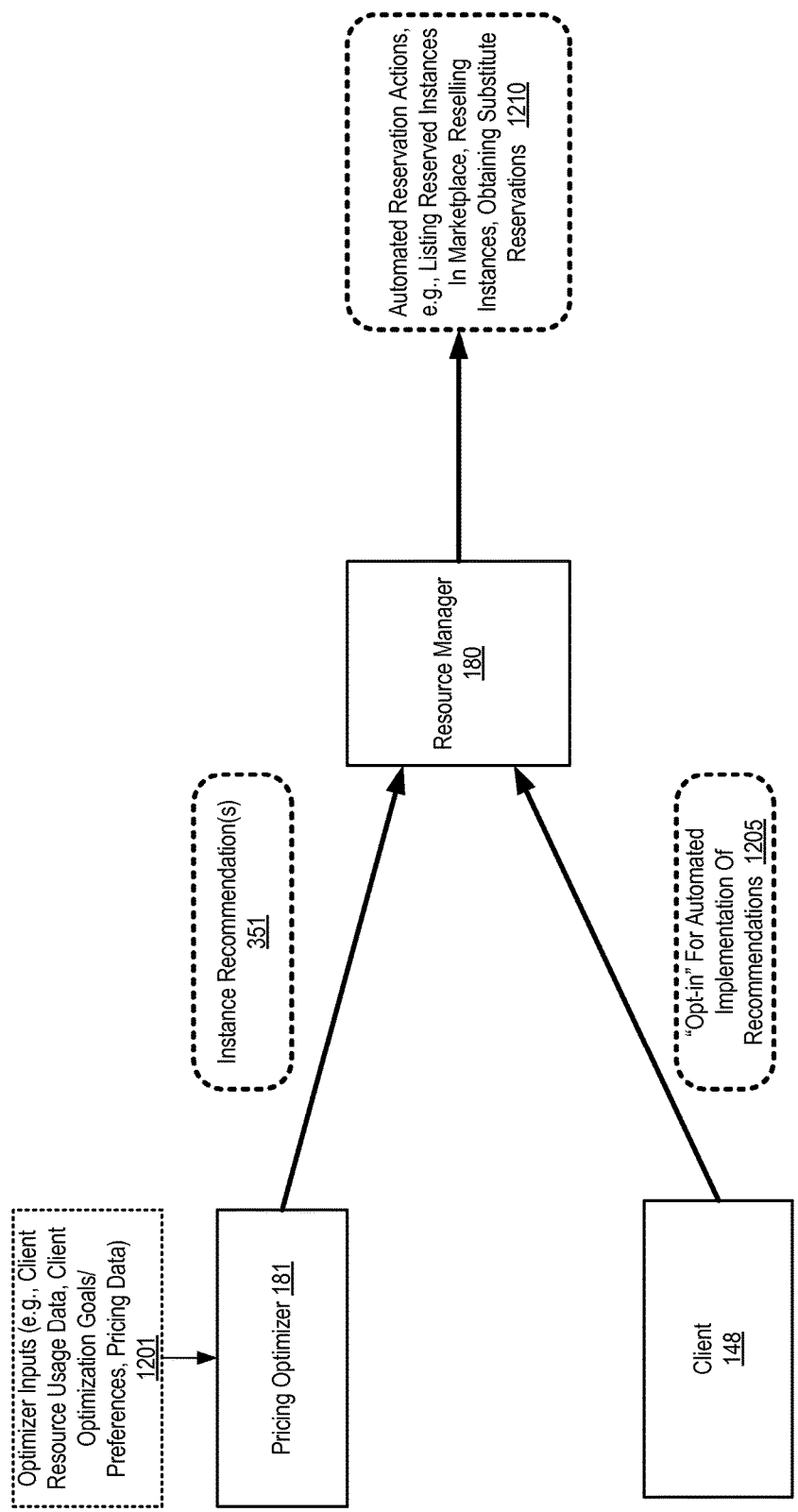
FIG. 12 illustrates example interactions that may occur between a client and a resource manager, and between a pricing optimizer and the resource manager, to implement automated implementation of instance recommendations, according to one embodiment.

In some embodiments, a client 148 may decide to opt in for a service that automatically implements recommendations generated by the pricing optimizer. FIG. 12 illustrates example interactions that may occur between a client 148 and the resource manager 180, and between the pricing optimizer 180 and the resource manager 180, to implement automated reservation optimization actions, according to one embodiment. As shown, the client may transmit an indication 1205 that the client has opted in for automated implementation of recommendations (either for a specified subset of the client's instances 130 or for the entire set of instances 130 used by or reserved for the client). The pricing optimizer 181 may be operable to provide instance action recommendations 251, generated on behalf of the client based on the kinds of inputs 1201 illustrated in FIG. 3 (such as client resource usage, optimization goals and preferences, and pricing information), directly to the resource manager 180 instead of (or in addition to) notifying the client 148.

In response to receiving an indication of one or more recommended actions, the resource manager 180 may proceed to put the recommendations into effect, without any further requests from the client. For example, in the embodiment illustrated in FIG. 12, the automated reservation actions 1210 may include a listing of an instance currently reserved for the client 148 in a reservation resale marketplace, reselling such listed instances if a buyer is found, obtaining different reservations (potentially in different availability zones) on behalf of the client, acquiring on-demand and/or spot instances, and the like. In some embodiments the resource manager may inform the client 148 when each recommended action is completed, e.g., via an e-mail or other notification, while in other embodiments the a summary of the set of automated actions taken on behalf of the client 148 may be provided at some designated intervals such as once a billing period or once a month. In some implementations the client may be able to specify scheduling preferences for when the automated action should be performed. For example, the client may indicate that automated actions may be performed at most once a week (e.g., Mondays between 1 AM and 2 AM), or that no automated actions should be performed during some specified time interval, and so on. In such implementations, the resource manager 180 may perform automated actions in accordance with the client's scheduling preferences. As noted earlier, one scheduling option or preference (which may in some cases be the default) is that the resource manager is allowed to perform the automated actions at any time of its choice. In one embodiment, the resource manager may also provide an indication to the client of the actual vs. predicted costs— e.g., if the pricing optimizer 181 suggested in the recommendation that the billing costs for a quarter could be reduced to $X, the resource manager may implement the actions and at the end of the quarter show the client how closely the predictions matched the actual costs. Of course, in addition to automated implementation of recommendations, the resource manager 180 may also perform a number of types of operations explicitly requested by the client, e.g., reserving a set of instances, obtaining on-demand and spot instances, and the like.

Figure 13:
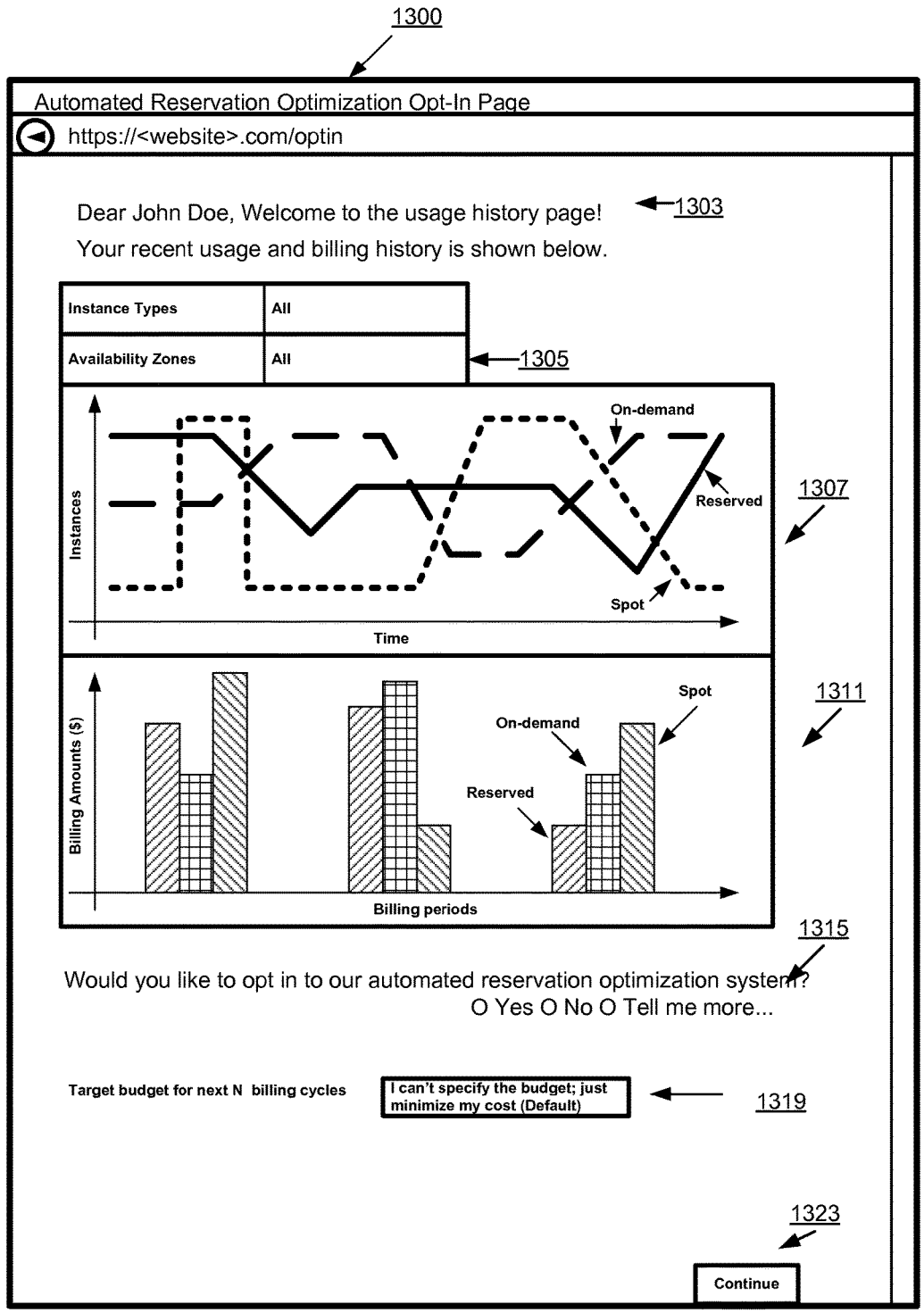
FIG. 13 illustrates a portion of an example web-based interface that may be used by a client to opt-in to a service providing automated implementation of recommendations, according to some embodiments.

FIG. 13 illustrates a portion of an example web-based interface that may be used by a client 148 to opt-in to a service providing automated reservation optimization, according to some embodiments. As shown, the interface may include a web page 1300 that includes a welcome message area 1303 and one or more graphical display regions 1307 and 1311 showing usage history and billing history of the client. The types of instance and the specific availability zones for which usage history and/or billing history is displayed may be selectable using filtering options 1305 in some implementations. In the illustrated interface, the client may indicate that it is willing to sign up for automated implementation of recommendations by selecting the "Yes" response to the question posed in region 1315. In some implementations, the client may also indicate additional optimization constraints, such as a target budget limit, a preferred schedule, and the like, using elements of the interface such as the form field 1319 (or a collection of form fields similar to some of the fields illustrated in FIG. 5). A control element such as button 1323 may be used to proceed to the next step of enrolment in the automated recommendation implementation service, where for example the client 148 may specify the frequency with which notifications regarding completed automated actions should be sent, the mechanism to be used for such notifications, and so on.

In some embodiments a client 148 may be able to specify that it wishes to utilize the automated service for some subset of the client's instances, but not all of the client's instances. In one implementation additional settings for different subsets of potential automated actions may be specified by the client: e.g., the client may be able to indicate the equivalent of "If the recommended action involves obtaining a substitute reservation at a lower price, go ahead and implement the action automatically; but if the action involves purchasing additional instances, notify me and obtain my approval before purchasing the additional instances". In some embodiments the client may be able to set a budget limit for automated actions that require no pre-approval—e.g., the client may be able to indicate the equivalent of "If the recommended action is going to make a change to my billing amount of no more than $1000, implement the action; but if the billing impact is going to be greater than that, please obtain my consent before implementing the recommendation". The level of authority granted to the resource manager 180 to make recommended actions without additional approvals by the client may thus vary in different implementations.

Methods for Automated Implementation of Reservation Recommendations

Figure 14:
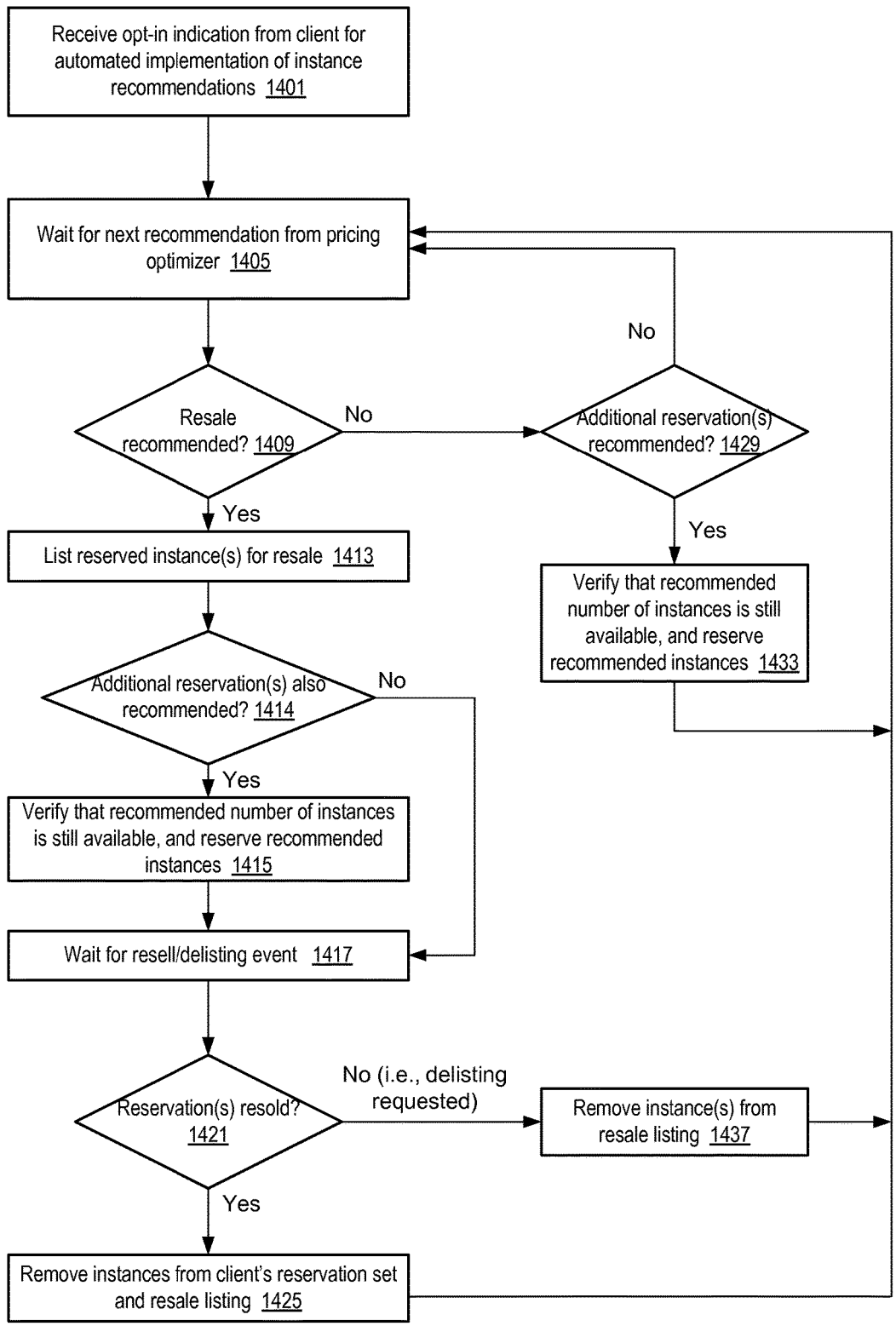
FIG. 14 is a flow diagram illustrating aspects of the operation of a resource manager supporting automated implementation of recommendations for reserved instance operations, according to at least one embodiment.

FIG. 14 is a flow diagram illustrating aspects of the operation of a resource manager 180 supporting automated implementation of recommendations for reserved instance operations, according to at least one embodiment. The resource manager 180 may receive an opt-in indication from a client 148 for automated reservation optimization (element 1401 of FIG. 14), e.g., via a programmatic interface such as a web page similar to that shown in FIG. 13, or via some other communication mechanism such as an e-mail. The fact that the client 148 has opted in may be communicated to the pricing optimizer 181, and the pricing optimizer 181 may begin collecting resource usage data, pricing data, and any other information pertinent to making recommendations for the client 148. In some embodiments the client 148 may, in addition to opting in for the automated service, provide specific optimization goals and preferences to be used in making the recommendations. In some implementations a specific set of client instances for which recommended actions are to be automated may be indicated by the client; in other implementations, by default or in response to an indication from the client, all of the client's resource instances may be considered for automated actions. In one implementation, a client 148 or a potential client 148 that does not currently have any allocated or reserved instances 130 in the provider network 110 may opt-in for the automated service, so that the entire set of resource instances acquired for the client may be acquired as result of automated recommendation actions.

The resource manager may wait for the next recommendation provided by the pricing optimizer (element 1405 of FIG. 14). The timing of recommendations may vary in different implementations, and may be dependent on preferences specified by the client 148, the complexity of the computations involved in making the recommendations, which may in turn depend on such factors as the total number and types of instances 130 that the client uses. For example, in one embodiment the pricing optimizer 181 may provide a set of recommendations every month or every week based on a client preference, while in another embodiment the timing of recommendations may depend on the amount of savings that the pricing optimizer can find—e.g., if the maximum potential savings found during a particular analysis by the pricing optimizer is less than $1000, no recommendation may be generated.

In the embodiment illustrated in FIG. 14, some of the types of recommended actions could include suggested listing of currently-reserved instances in an instance reselling marketplace, acquisition of additional or replacement reservations, and the like. If a recommendation from the pricing optimizer 181 suggests that one or more currently reserved instances should be resold (as determined in element 1409), the resource manager 180 may list the one or more instances for resale (element 1413). In some implementations the recommendation could identify the specific reserved instances or slots that should be resold, while in other implementations the number and type of reserved instances to be resold may be specified in the recommendation (e.g., the recommendation may suggest the equivalent of "Resell 2 large, medium uptime ratio instances in availability zone X") and the specific reservations that are resold may be selected by the resource manager 180. If, in addition to reselling an instance or instances the recommendation also recommends the acquisition of one or more additional reservations (as determined in element 1414), the resource manager 180 may verify that the recommended number of instances is still available, and reserve that number of instances (element 1415). Such a verification may be needed, for example, because some time may have elapsed between the generation of the recommendation and the time at which an attempt to reserve the additional instances occurs; thus, it may be possible in some cases that the desired number of reservations cannot be made. In some embodiments, if the desired number of additional instances cannot be acquired, the client may be informed. Various other error/corner cases may also have to be dealt with by the resource manager 180 in some embodiments.

Depending on the demand for instances of the type being resold, and the pricing policies associated with the listings, it may take some time before a buyer is found for the listed instances. For example, the listings on the resale marketplace may have a minimum price associated with them, and buyers may not necessarily be willing to pay the minimum price for at least some time period. The resource manager 180 may wait for a resell-related event that causes the instances to be removed from the listing (element 1417 of FIG. 4). Such an event could include, for example, an actual resale of the listed reserved instances to another client (as determined in element 1421), or in some cases the instances or reservation slots could be delisted at the request of the current owner client 148 or as a result of a new recommendation from the pricing optimizer 181. For example, if the instances remain unsold for a while, the client's resource demand may increase, or the market price for resold instances may decline sufficiently that it may no longer be beneficial to resell the instances. In response to a determination that delisting is beneficial, the resource manager 180 may therefore remove the instances or reservation slots from the resale listing (element 1437) and return the instances to the client's reserved instance set. If the instances/slots are resold, they may be delisted and removed from the client's reserved instance set (element 1425). In some implementations, the listed instances may remain in the current reservation set of the client until they are actually resold.

If the recommendation does not suggest resale of reserved instances (As determined in element 1409), it may include a suggestion for additional reserved instances, or acquisition of different (e.g., cheaper) reserved instances than the ones the client currently has. If such additional reservations are recommended (as determined in element 1429), the resource manager 180 may verify that the instances are available for reservation as discussed above with reference to element 1415, and may acquire the suggested additional reservations for the client (element 1433). In some implementations, as noted above, a single recommendation may include suggestions for reselling some reserved instances and acquiring other reservations—for example, based on the relative pricing of different sets of reserved instances in different availability zones or regions, the availability and pricing of instances listed on the reserved instance reselling marketplace, and so on. After the recommended reservation-related actions specified in one recommendation are taken, the resource manager may again wait for the next recommendation (element 1405).

Figure 15:
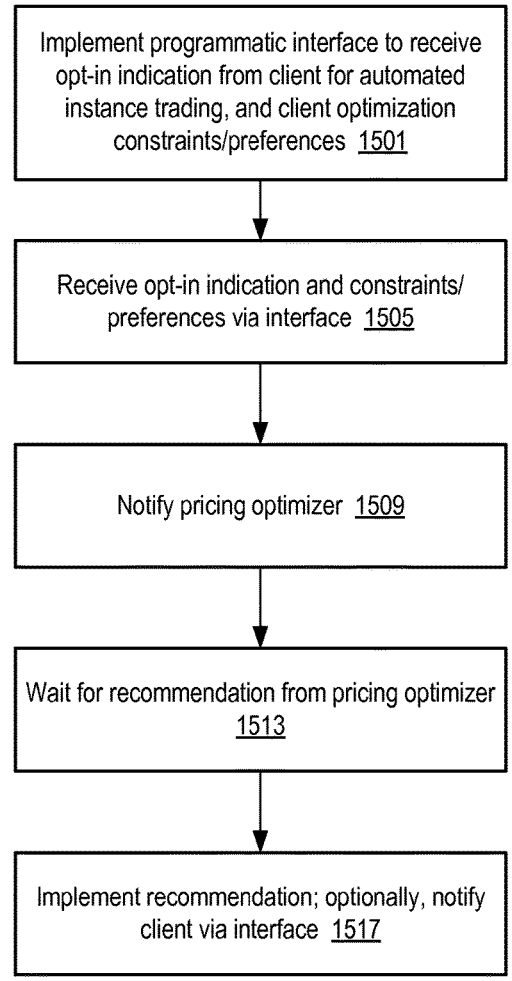
FIG. 15 is a flow diagram illustrating aspects of the operation of a resource manager configured to provide a programmatic interface to allow clients to opt-in for automated implementation of recommendations from a pricing optimizer, according to at least one embodiment.

In some embodiments, an interface manager 182 or a subcomponent of a resource manager 180 may implement one or more programmatic interfaces for interactions related to automated implementation of the pricing optimizer's recommendations. FIG. 15 is a flow diagram illustrating aspects of the operation of a resource manager 180 configured to provide a programmatic interface to allow clients 148 to opt-in for automated instance trading based on recommendations from a pricing optimizer, according to at least one embodiment. An interface such as one or more web pages (e.g., pages similar to web page 1300 of FIG. 13), APIs or command-line interfaces may be implemented to receive the opt-in indication (element 1501 of FIG. 15). In some embodiments portions of the interface may also allow clients to specify optimization goals and/or preferences. The resource manager may receive an indication of an opt-in by the client, and any other goals and preferences specified via the interface (element 1505).

The pricing optimizer 181 may then be notified that recommendations pertinent to the client should be generated (element 1509). In some cases additional communications with the client 148 may also be required—e.g., the client 148 may be advised to download or obtain client-side metrics agents 190, and/or agree to monitoring of the client's resource usage; such additional communications may also be made in accordance with the programmatic interface in some embodiments. The resource manager 180 may then wait for the next recommendation generated by the pricing optimizer (element 1513). After a recommendation is received, the resource manager 180 may implement one or more of the recommended actions (element 1517), and in some embodiments may inform the client 148 that the actions have been implemented using portions of the programmatic interface.

Support for Enhanced Interruptibility Levels

At any given point in time, many of the resource instances 130 of a provider network 110, including instances that have been reserved in advance or have already been allocated to clients 148, may be idle or inactive. Such idle instances may represent a dynamically changing pool of surplus capacity, which can potentially be monetized in a number of different ways. In one simple example, an idle instance for which a reservation currently exists may be listed in a spot-instance market, i.e., it may be offered at a reasonably low price on the condition that access to it may be revoked whenever the corresponding reservation holder requests access to the instance. Depending on the nature of the application being run, such interruptible instance allocations may be acceptable to various types of clients—e.g., clients that run computations that can be broken down into phases such that the interruption or stoppage of the application during any one phase does not affect the results of other phases, or clients that run short-transaction workloads where a failure of a small number of short transactions can be remedied simply by rerunning the transactions. Some types of client applications or workloads may consist of phases or transactions with different levels of sensitivity to interruptions—some phases of the workload may be interruptible without having to do a lot of rework, other phases or transactions may require at least some notice to save state in order for the application to be resumed without excessive overhead, while other phases may require substantial rework if they are interrupted. In some embodiments the resource manager 180 may support several different levels of resource instance interruptibility, to more effectively cater to the varying interruptibility-related needs of clients, and at the same time generate revenues for the provider network operator by utilizing resources that would otherwise be idle.

Figure 16:
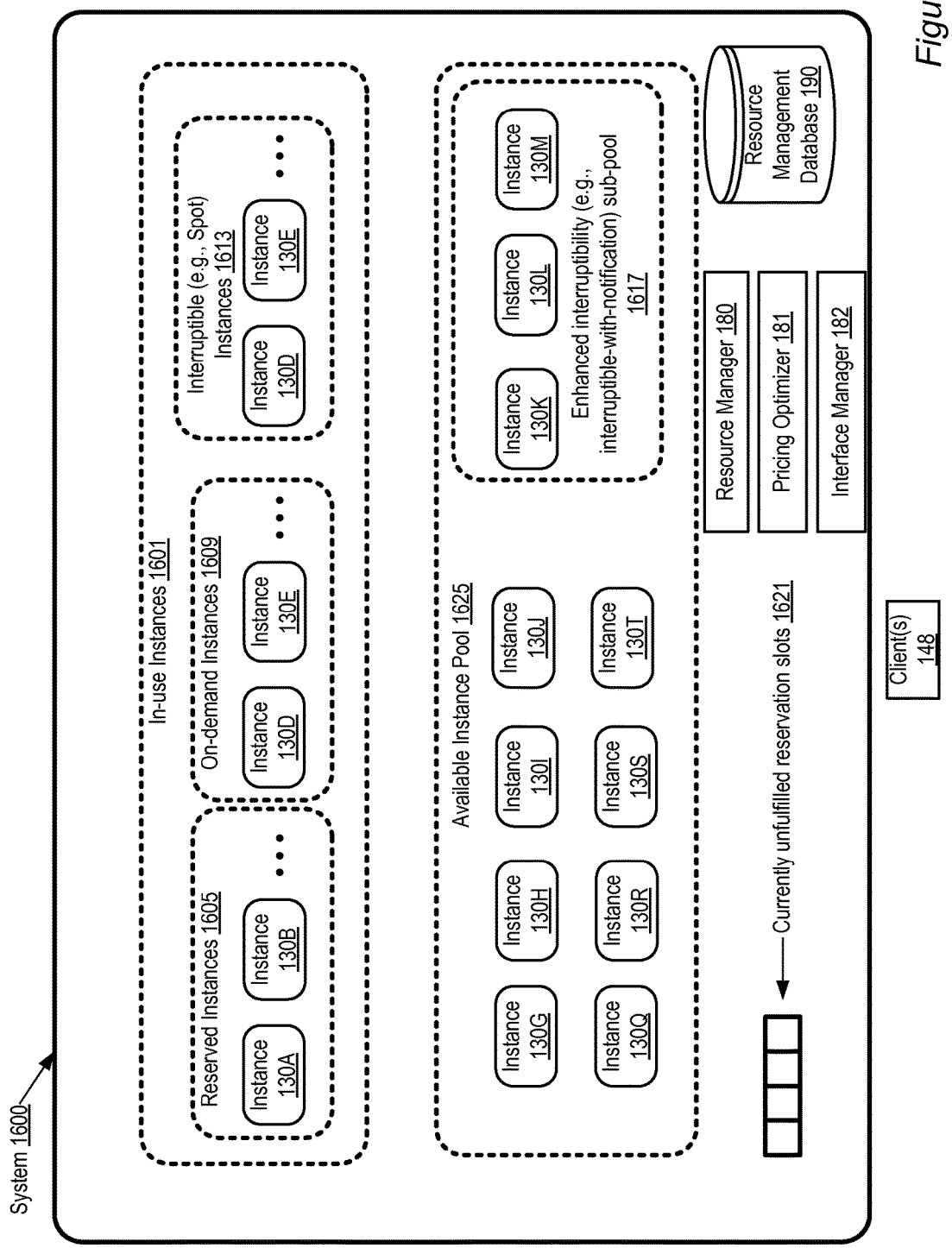
FIG. 16 illustrates an embodiment in which a resource manager may fulfill instance requests specifying any of a plurality of levels of interruptibility using a dynamically sized set of enhanced-interruptibility available instances.

FIG. 16 illustrates an embodiment in which a resource manager 180 may fulfill requirements for any of a plurality of levels of interruptibility using a dynamically sized set of enhanced-interruptibility available instances. In the illustrated embodiment, system 1600 comprises a plurality of instances 130, each of which is assigned to an instance pool. Each instance 130 may have an associated interruptibility property or setting indicating the conditions under which access to the instance may be revoked by the resource manager 180. Instances 130 that are currently active (i.e., accessible via the network, performing functions, running applications, and/or providing services to various clients 148), which may be termed in-use instances 1601, may be organized into several pools such as a reserved instances pool 1605, an on-demand instance pool 1609, and one or more interruptible instance pool(s) 1613 such as a spot instance pool. Instances that are currently not in use may be assigned to an available instance pool 1625 with a baseline or default interruptibility level. A subset of the instances of the available instance pool 1625 may be assigned to one or more enhanced-interruptibility sub-pools 1617, i.e., the current or potential interruptibility setting of these instances may differ from the baseline interruptibility setting for the available instances outside the sub-pools. Details on how instances are moved in and out of the various pools and sub-pools, e.g., in response to actual and/or anticipated supply and demand, and the different levels of enhanced interruptibility that may be supported in different embodiments are provided below.

At any given point in time, some instance reservations may exist for which the corresponding instances are not currently in use; such currently unfulfilled reservations are represented in FIG. 16 by slots 1621. System 1600 may also include a pricing optimizer 181 and a resource management database 190. The pricing optimizer 181 may be operable to perform enhanced optimization operations and/or generate recommendations that take multiple interruptibility levels into account, in addition to performing the core pricing optimizer functions described earlier. The resource management database 190 may be used to store various types of instance information, including pricing information, performance capacity information, usage records, and interruptibility settings of various resources. It is noted that although availability zones are not shown explicitly in FIG. 16, each of the instances shown may in some embodiments belong to an availability zone and/or a geographic region of a provider network; for example, all the instances 130 shown in FIG. 16 may belong to the same availability zone.

As described earlier, clients 148 may reserve resource instances for agreed-upon reservation periods such as one-year terms or three-year terms in some embodiments. When a client 148 makes such a reservation, the resource manager 180 is committed to provide access to a resource instance with the specified performance capability and other characteristics, whenever the client requests such access during the term of the reservation. However, this does not mean that the client 148 necessarily has all its reserved instances in an active state (e.g., with the instance's operating system booted, various applications running and/or accessible via the network) at any given point in time. For example, the client 148 may wish to activate some subset of its reserved instances only when the client workload reaches a threshold level, thereby potentially avoiding having to pay unnecessary usage-based billing amounts (since some types of reservations may incur both up-front reservation fees and fees based on actual hours or minutes of usage). In FIG. 16, the reserved instance pool 1605 of the in-use instances 1601 represents the set of currently active reserved instances, e.g., instances 130A and 130B, of the clients 148. The currently unfulfilled reservations of various clients are represented by slots 1621. Whenever a client 148 that owns one of the unfulfilled reservation slots requests access to an instance, a currently available instance may be provided—e.g., one instance from available instance pool 1625 may be moved to reserved instance pool 1605, and the number of unfulfilled reservation slots 1621 may be decremented accordingly.

To support the commitment made by the resource manager to provide near-immediate or immediate access in response to fulfillment requests for reservation slots, a default interruptibility level may be assigned to some subset of the instances (such as 130G, 130H, 130I, 130J) of the available instance pool that are set aside to meet the demand for reserved slots. The default interruptibility level may for example indicate that the resource manager may revoke access to the instance at any time and without providing any notice of access revocation. Such an interruptibility level may be termed "interruptible-without-notification" herein. The pricing for interruptible-without-notification instances may also vary over time, depending for example on the relative demand for various levels of interruptibility and the supply of available instances. When a client submits an acceptable instance acquisition request for an interruptible-without-notification instance (e.g., if the client's bid for the instance meets the current price for such instances), an instance of the requested type may be allocated to the client, and the instance may be assigned to an in-use interruptible instance pool 1613. The total number of interruptible-without-notification available instances to be kept either as a reserve in the available pool, or in one of the interruptible in-use instance pools 1613, may be determined by the resource manager at least in part on the number of outstanding unfulfilled reservations at any given time. For example, if there are ten currently unfulfilled reservation slots, in one implementation the resource manager may wish to ensure that there are at least ten suitable instances than can be interrupted without notification (i.e., that the sum of the number of in-use immediately interruptible instances and the number of interruptible-without-notification instances in the available pool is at least ten), to handle any sudden burst of reservation fulfillment requests. Instances may be moved in and out of the various pools and sub-pools based on projected demand for reserved instances in some embodiments.

Other factors, such as the anticipated rate of requests for on-demand instances, may also influence the number of interruptible-without-notification instances in the available pool. An on-demand instance, as described above, may not require a long-term reservation; clients may typically use on-demand instances when they do not wish to pay the upfront fees required for long-term reservations, but do want more stability in instance pricing (and/or less interruptibility) than may be typically possible for spot instances. While the operator of the provider network may not be able to guarantee that all requests for on-demand instances will necessarily be met, the operator may still wish to keep client satisfaction levels high by ensuring that a high proportion of requests for on-demand instances are fulfilled (i.e., the operator may wish to ensure that at most a very small fraction of requests for on-demand instances are turned down because insufficient resource instances are available). In the embodiment illustrated in FIG. 16, the resource manager 180 may maintain a buffer of instances in the available instance pool 1625 specifically to meet current and/or anticipated on-demand instance requests. In some embodiments, the resource manager 180 may be required to respond to an instance acquisition request for an on-demand instance within a very short response time window, which may necessitate that the instances in such a buffer have the interruptible-without-notification setting. Thus, in such embodiments, the total number of interruptible-without-notification instances (either in the available instance pool or in the in-use interruptible instance pools) may be based on the number of unfulfilled reservation slots 1621, the projected demand for reserved instances, and/or on the size of the on-demand buffer to be maintained by the resource manager 180. In some environments separate pools or sub-pools may be maintained to respond to fulfillment requests and to respond to on-demand instance requests. In one embodiment separate in-use instance pools or sub-pools may be maintained for different supported interruptibility levels.

The resource manager 180 may support one or more enhanced interruptibility settings, in addition to the baseline or default interruptible-without-notification setting, in some embodiments. As noted above, depending on the specifics of their applications, some clients 148 may be interested in acquiring instances that, while still economical compared to reserved instances or on-demand instances, have interruptibility settings that allow the clients to save the state of the applications and/or complete some critical work before the instances are interrupted or stopped. For example, in one embodiment, the resource manager 180 may support an interruptibility setting that gives a client a five-minute advance warning before access to an instance is revoked. Multiple enhanced interruptibility settings may be implemented in some embodiments, e.g., a five-minute-warning setting and a thirty-minute-warning setting. The pricing for instances with different enhanced interruptibility settings may vary over time, e.g., in response to supply and demand for the various levels of interruptibility supported. In some implementations, instead of or in addition to supporting one or more interruptibility settings with fixed, discrete warning periods (e.g., five minutes or thirty minutes), the resource manager 180 may support a variable warning period based on price. For example, the length of the warning period provided may vary at the granularity of a minute based on the price the client is willing to pay—clients willing to pay one amount may get a ten minute warning, while clients willing to pay slightly more may get eleven minute warnings, and so on. The various enhanced interruptibility settings that support advance warnings may be termed "interruptible-with-notification" settings or "interruptible-with-advance-warning" settings herein. Pricing rates for the interruptible-without-notification and interruptible-with-notification instances may be termed "interruptible instance pricing rates" and "enhanced-interruptibility instance pricing rates" respectively herein. One or more sub-pools of the available instance pool may be maintained to respond to enhanced-interruptibility instance requests; such pools may be termed "enhanced-interruptibility sub-pools" herein. In some implementations, the current enhanced-interruptibility instance pricing rate may depend on the current size of the enhanced-interruptibility sub-pool(s), while the current interruptible instance pricing rate may depend on the total size of the available instance pool 1625.

The pricing rates for instances with each of the different levels of interruptibility supported may be based at least in part on the expected rate of requests for the respective interruptibility levels in some embodiments, and/or the expected rate of interruptibility upgrade requests. The resource manager 180 may monitor request rates for the different types of instances and develop models or projections of future request rates to help in determining the various pricing rates. In some embodiments the pricing optimizer 181 may perform some of the estimations and/or projections used for pricing different interruptibility levels, e.g., based on usage records and request records gathered by metrics agents. An interface manager 182 may be responsible for implementing functionality related to various programmatic interfaces supporting interactions with the resource manager 180 and/or pricing optimizer 181 in some embodiments.

In order to meet demand for enhanced interruptibility instances, as noted above, the resource manager 180 may set aside a dynamically sized subset of the available instance pool 1625 as one or more enhanced-interruptibility sub-pools 1617. Instances may be moved in and out of the sub-pool or sub-pools, e.g., either to the in-use instances pool 1601, or to the interruptible-without-notification portion of the available instances pool 1625, based on current and/or projected supply and demand, and the relative pricing of enhanced-interruptibility instances may vary based on supply and demand as well. For example, if the rate of requests for enhanced-interruptibility instances increases, in some embodiments the price and/or number of instances in the enhanced-interruptibility sub-pools may be increased accordingly, as long as the resource manager 180 is still able to maintain the reserves needed for outstanding reservations and the buffer for expected on-demand instance request rates. An enhanced-interruptibility sub-pool may be termed a "convertible" sub-pool in some embodiments, indicating that instances in the sub-pool may have their interruptibility settings converted or upgraded from interruptible-without-notification to some other level, e.g., based on demand and price.

The resource manager 180 may thus have to balance a number of potentially competing demands when deciding how to size the various pools and sub-pools in some embodiments—e.g., the commitments made to clients that have unfulfilled reservations, the goal of responding affirmatively to the vast majority of requests for on-demand instances, and the goal of increasing revenue and utilization by providing otherwise idle resources to clients that have applications that can be interrupted with or without warning periods. In some cases the same client 148 may wish to utilize different types of pricing models and/or interruptibility settings for different subsets of the client's application set—e.g., such a client may use any combination of reserved instances, on-demand instances, interruptible-without-notification instances, as well as enhanced-interruptibility instances. If the client opts in to receive recommendations from the pricing optimizer 181, the pricing optimizer may generate recommendations that include actions to be taken with respect to the respective number of instances with different levels of interruptibility that the client should acquire or discard, as well as the kinds of recommended actions described earlier. Recommended actions for instances with different interruptibility levels may be automated for those clients that opt in for such an automation service in one embodiment.

In some embodiments, the resource manager 180 may also support upgrades and/or downgrades of the interruptibility settings of an instance allocated to a client 148. E.g., a client 148 may be willing to pay a baseline pricing rate for a given instance for a period of time during which the instance had an interruptible-without-notification setting, and may be interested in upgrading the instance to an interruptible-with-notification setting for an additional price for some period of time. Interruptibility downgrades, e.g., from an interruptible-with-thirty-minute-warning setting to an interruptible-with-five-minute-warning setting, may also be supported in some embodiments, potentially with a corresponding reduction in price. In general, in several embodiments, the billing amount charged to a client may be based at least in part on (a) the pricing rates in effect for the different levels of interruptibility of an instance while it was allocated to the client and (b) the respective durations for which the instance's interruptibility was set to each of the levels. For example, if a client 148 used an instance 130 at interruptibility level I1 for a time period T1 during which the instance pricing for level I1 was P1, and the client used that same instance at interruptibility level I2 for a time period T2 during which the instance pricing for level I2 was P2, the billing amounts charged to the client for that instance may be based at least in part on the sum of the products (T1*P1)+(T2*P2).

Example Web Interfaces for Interruptibility Related Requests

FIG. 17 illustrates a portion of an example web-based interface that may be implemented to support multiple instance interruptibility levels, according to some embodiments. In the illustrated embodiment, a web 1700 may include a message area 1703 indicating that recent pricing history for several different levels of interruptibility is being displayed. Filtering options 1705 may allow a client to select or specify the types, availability zones, and/or other characteristics of the instances for which pricing data is to be displayed. For example, the client may wish to see the pricing history for large instances within one or more availability zones that are convenient to the client. Dropdown menus may be provided in some implementations to limit the set of filtering choices that the client may make to only those options that are relevant to that particular client.

A graphical region 1711 may display the price fluctuations for the different levels of instance interruptibility that are supported. In the example, shown, four different pricing trends are displayed: "no-delay", "5-minute-delay", "30-minute-delay" and "60-minute-delay". The no-delay line may correspond to the interruptible-without-notification setting discussed above. The 5-minute, 30-minute and 60-minute delay lines may represent different warning period durations between the time that an access revocation notification transmitted by the resource manager 180 is received by a client 148 for an allocated instance, and the time that access to that instance is revoked by the resource manager 180. As noted above, the resource manager 180 may send an access revocation notification to a client with an allocated instance for a number of different reasons in various embodiments, e.g., in response to a fulfillment request for a reservation, if a higher bid than the price currently being charged for the instance is received, in response to anticipated requests for on-demand or reserved instances, and so on. In some embodiments, pricing for non-interruptible instances (e.g., on-demand instances that are obtained for a specified period during which access cannot be interrupted by the resource manager 180) may also be shown for comparison. In some implementations the web page 1700 may include one or more fields (such as fields 1714) allowing the client to submit a request to acquire one or more instances with desired interruptibility settings. A "continue" button 1723 may be used by the client to proceed to additional steps involved in acquiring the instances specified, e.g., to a request verification step.

Figure 18:
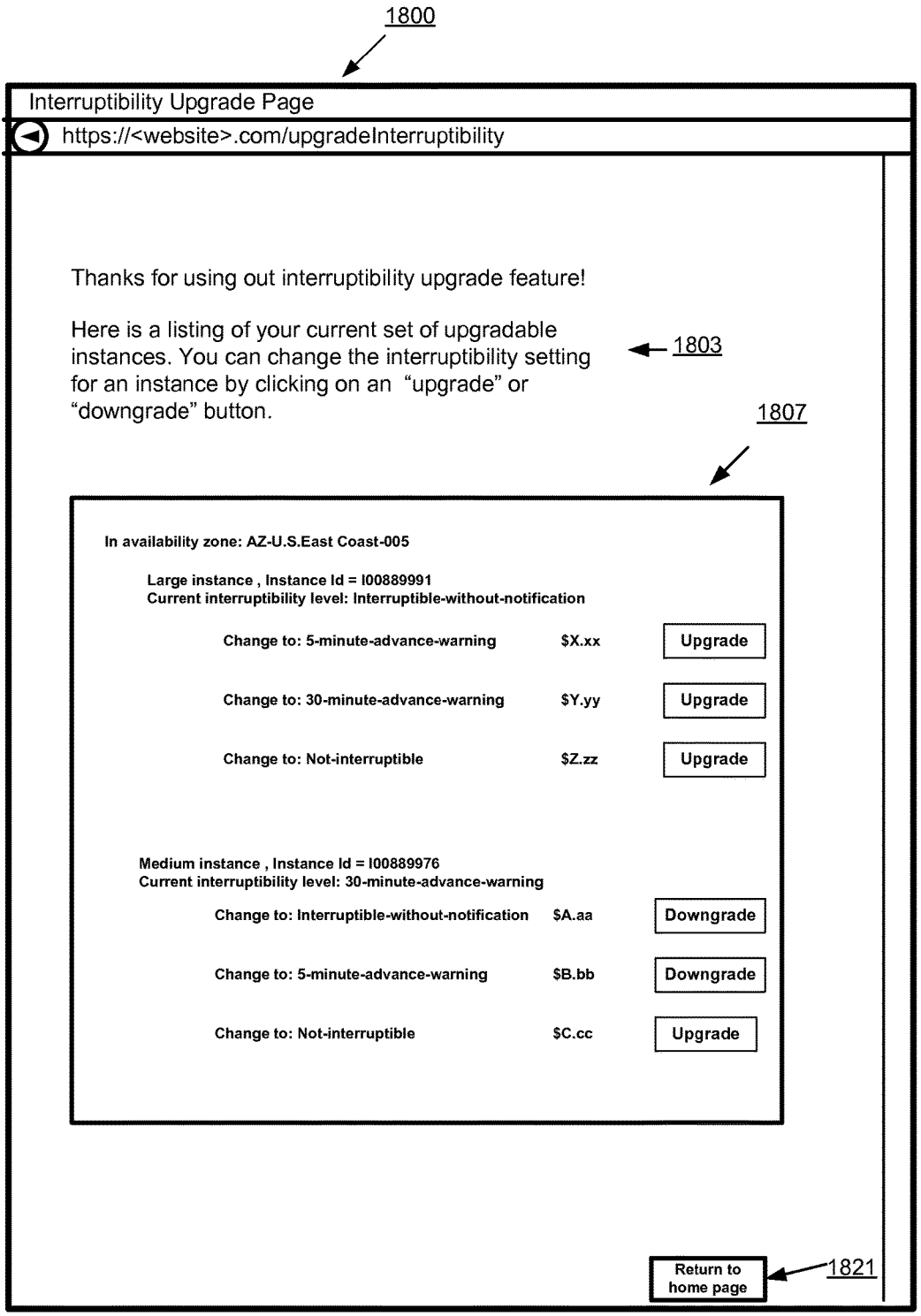
FIG. 18 illustrates a portion of an example web-based interface that may be implemented to support upgrades between instance interruptibility levels, according to some embodiments.

FIG. 18 illustrates a portion of an example web-based interface that may be implemented to support upgrades between instance interruptibility levels, according to some embodiments. As shown, a web-page 1800 may include a message region 1803 indicating that a list of instances for which interruptibility upgrades and/or downgrades are supported, and which are currently allocated to the client 148, is displayed on the page. A list region 1807 may display details of the various instances for which upgrades/downgrades are possible, such as the current interruptibility settings of the instances, and/or the costs of each of the possible interruptibility modifications. In some implementations the client may be allowed to request desired upgrades or downgrades from within the interface, e.g., via the buttons labeled "Upgrade" or "Downgrade" in FIG. 18. In the illustrated example, one of the options being provided is to change an instance's interruptibility setting to "not-interruptible", which may have the effect of converting a currently interruptible instance to the equivalent of an on-demand instance. In addition to, or instead of, web-based interfaces such as those shown in FIGS. 17 and 18, other types of programmatic interfaces for supplying interruptibility-related information, and receiving and responding to requests regarding interruptibility levels may be provided in some cases. For example, one or more APIs, installable client programs that are not web-based, and/or command-line tools may be implemented in various embodiments.

Methods for Supporting Enhanced Interruptibility Levels

Figure 19:
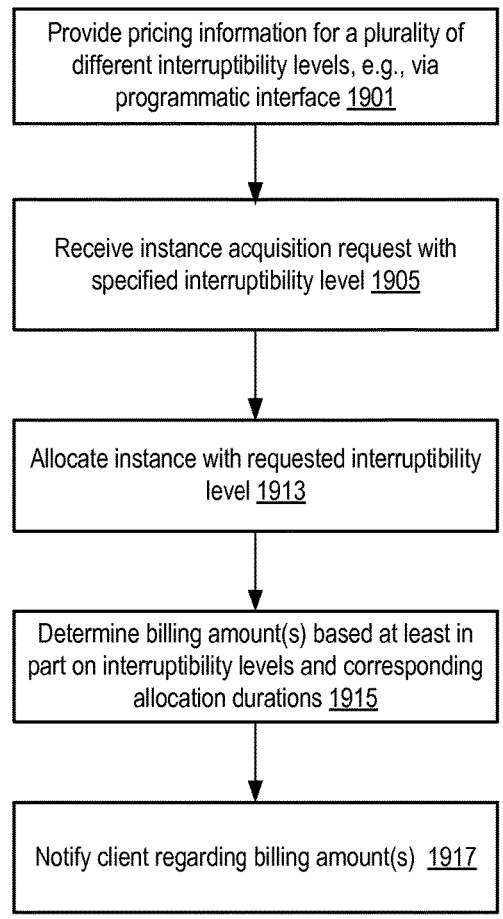
FIG. 19 is a flow diagram illustrating aspects of the operation of a resource manager configured to support multiple instance interruptibility levels, according to at least one embodiment.

FIG. 19 is a flow diagram illustrating aspects of the operation of a resource manager 180 configured to support multiple instance interruptibility levels, according to at least one embodiment. In the illustrated embodiment, the resource manager 180 may provide pricing information for each of a plurality of different instance interruptibility levels, e.g., via a programmatic interface similar to the types of web pages shown in FIG. 17. Clients 148 may include specifications of desired interruptibility settings in their instance acquisition requests. When the resource manager 180 receives a request specifying a desired interruptibility level (element 1905), an instance with the requested interruptibility setting may be allocated to the client (element 1913). In some embodiments the resource manager 180 may maintain multiple pools or sub-pools of instances to satisfy demand for respective interruptibility settings. In other embodiments, a single pool of available instances may be maintained, and the interruptibility setting of a selected available instance may be set to the desired level when the instance is allocated to a requesting client. In some implementations separate pools of in-use instances may be maintained for each supported interruptibility setting, e.g., in addition to the types of in-use pools shown in FIG. 16.

The billing rates charged to a client may be based at least in part on the pricing rates of the interruptibility settings used by the client, and the durations for which the interruptibility settings applied to the client's allocated instances. For example, one client C1 may be billed at a pricing rate P1 for using a resource instance R1 for time T1 with interruptibility setting I1. Another client C2, who may use a resource instance R2 with the same performance capabilities as R1 and for the same length of time T1, may be billed at a different pricing rate P2 if C2 requested a different interruptibility setting I2. The resource manager 180 may determine the billing amounts to be charged to the client 148 based on the applicable interruptibility settings and interruptibility setting durations, as shown in element 1915 of FIG. 19, and notify the client regarding the billing amounts (element 1917).

Figure 20:
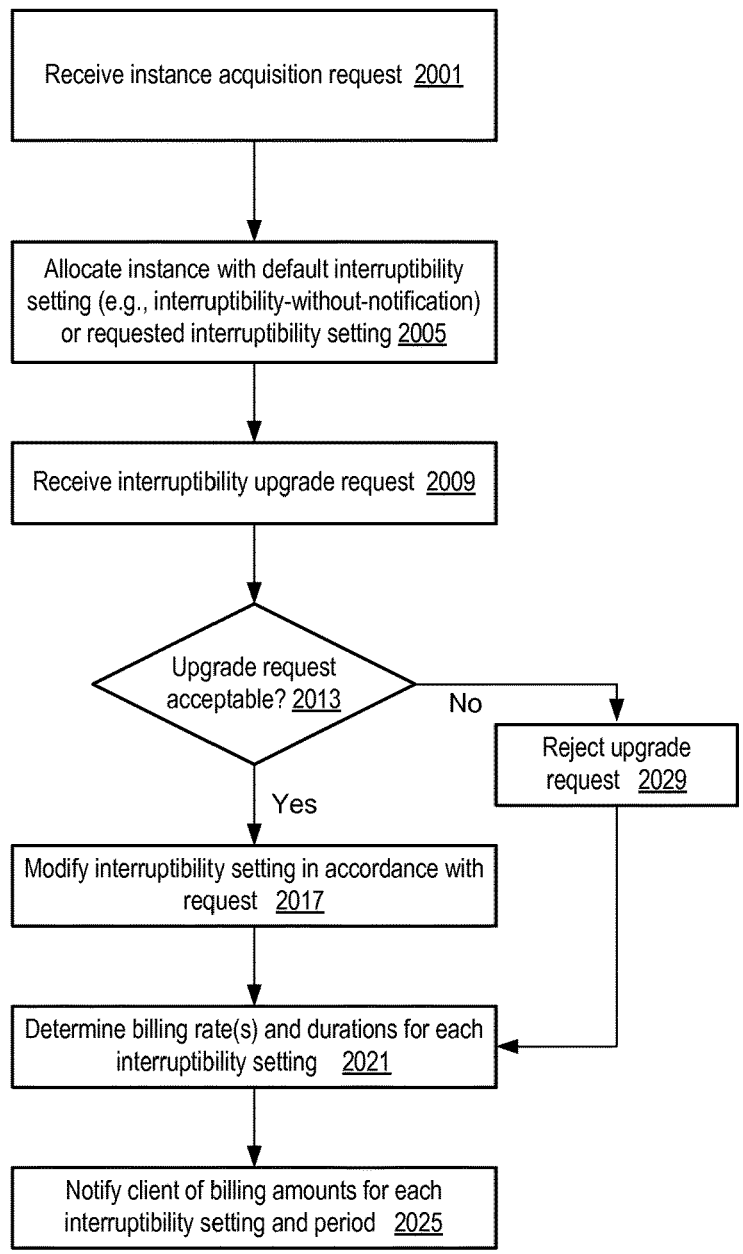
FIG. 20 is a flow diagram illustrating aspects of the operation of a resource manager configured to support upgrades between interruptibility levels, according to at least one embodiment.

FIG. 20 is a flow diagram illustrating aspects of the operation of a resource manager 180 configured to support upgrades between interruptibility levels, according to at least one embodiment. In the illustrated embodiment, when the resource manager receives an instance acquisition request from a client (element 2001), an instance with a default interruptibility setting such as the interruptiblewithout-notification setting may be allocated to the requester (element 2005), e.g., if no interruptibility setting is specified in the request. If an interruptibility setting is specified in the instance acquisition request, an instance with that setting may be allocated instead. Subsequent to the allocation, if the resource manager receives an interruptibility upgrade request (element 2009), the resource manager may determine whether to accept the upgrade request based on one or more factors such as for example the current size of an available instance pool 1625, a current size of one or more enhanced-interruptibility sub-pools 1617, the price the requesting client is willing to pay for the upgrade, and so on.

If the resource manager determines that the upgrade request is acceptable (element 2013), the interruptibility setting of the instance in question may be modified as requested (element 2017). If the upgrade request is found unacceptable, it may be rejected (element 2029). In either case, billing amount(s) based at least in part on the interruptibility setting or settings in effect during the time the resource instance was allocated to the client 148 may be determined (element 2021) and the client 148 may be notified of the various billing amounts incurred (element 2025). In some implementations where for example multiple interruptibility settings are supported, if a client 148 sends an upgrade request with a specified bid for a desired target interruptibility setting, and the resource manager 180 determines that the request is unacceptable, the resource manager 180 may attempt to find another interruptibility setting for which the bid is acceptable. If such an alternative setting is found, the client may be notified. For example, the client may bid SD for an upgrade from interruptibility level I1 to level I3. If the resource manager finds that SD is insufficient to enhance the interruptibility from level I1 to level I3, but is acceptable to enhance the interruptibility level from I1 to level I2, the resource manager 180 may inform the client that level I2 is acceptable, and may set the interruptibility level of the instance to I2 if the client agrees. In some embodiments, the client 148 may be able to request that the resource manager 180 select the best possible interruptibility level for a specified price that the client is willing to pay, and the resource manager may determine the specific interruptibility setting (or the length of the advance warning for access revocation) to be used for the client's instance.

Figure 21:
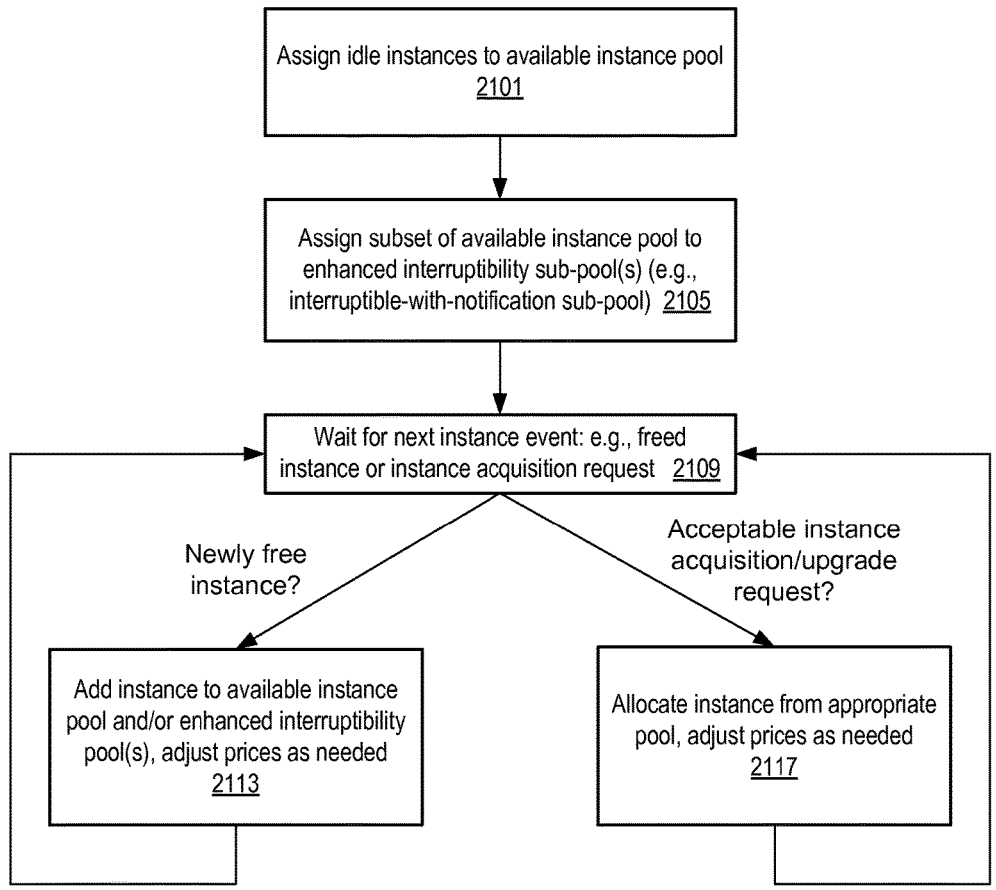
FIG. 21 is a flow diagram illustrating aspects of the operation of a resource manager configured to assign instances to an available instance pool and at least one enhanced-interruptibility sub-pool, according to at least one embodiment.

As noted earlier, the resource manager may be responsible for populating and resizing the various instance pools of a provider network in some embodiments. FIG. 21 is a flow diagram illustrating aspects of the operation of a resource manager configured to assign instances to an available instance pool and at least one enhanced-interruptibility sub-pool, according to at least one embodiment. The resource manager 180 may assign one or more currently idle instances to an available instance pool 1625, as shown in element 2101, and select a subset of those available instances for inclusion in an enhanced interruptibility sub-pool or sub-pools (element 2105). Multiple sub-pools may be maintained in some embodiments where multiple levels of enhanced interruptibility are supported. Various types of events may lead to resizing of one or more of the pools in different embodiments. For example, the resource manager may wait for the next relevant instance event (element 2109), such as an in-use instance being deactivated, released or freed, new instances being installed at a data center by the operator of the provider network, or new instance acquisition requests arriving. If the supply of available instances increases, e.g., as a result of an instance being released or more instances being brought online, the size of the available pool 1625 may be increased (element 2113). Depending on the current and/or anticipated demand and price for enhanced interruptibility instances, some or all of the newly available instances may be included within the enhanced interruptibility sub-pools 1617. If the supply of available instances decreases, e.g. as a result of an approved instance acquisition request, the sizes of the relevant pool and/or sub-pool may decrease (element 2117). In either case, the prices associated with the different interruptibility settings and upgrades may also be modified dynamically as the pool sizes change. The specific actions taken by the resource manager 180 in response to events of various types may differ from implementation to implementation. For example, in response to an increased demand for enhanced-interruptibility instances, whether the resource manager 180 increases an enhanced-interruptibility sub-pool size while keeping the enhanced-interruptibility pricing fixed, or whether the sub-pool size is kept fixed while the price is raised, or whether both the size and the price are raised, may vary based on the specific algorithms or heuristics being used by the resource manager I different implementations.

Figure 22:
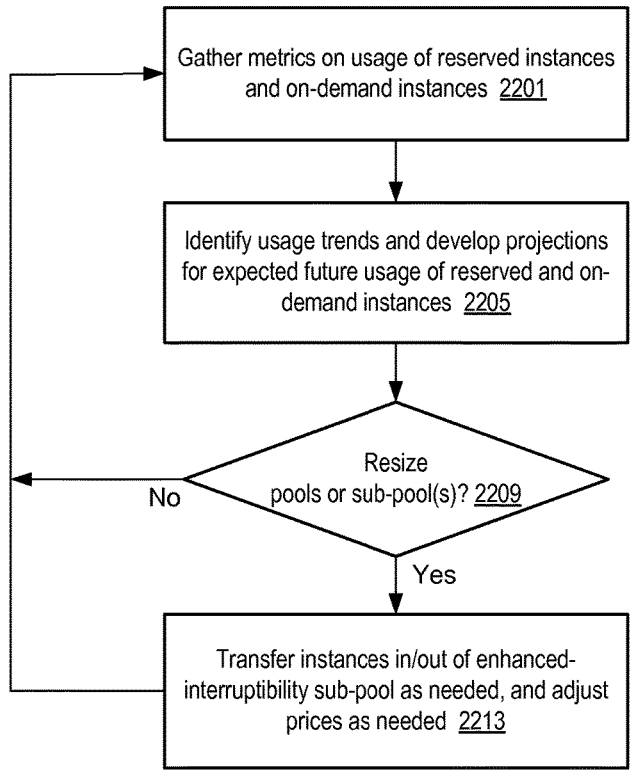
FIG. 22 is a flow diagram illustrating aspects of the operation of a resource manager configured to resize instance pools based at least on part on usage trends for on-reserved instances and on-demand instances, according to at least one embodiment.

Various instance pool sizes may also be changed as a result of other factors in addition to the types of events mentioned above (such as instances being freed or allocated) in some embodiments. FIG. 22 is a flow diagram illustrating aspects of the operation of a resource manager 180 configured to resize instance pools based at least on part on usage trends for on-reserved instances and on-demand instances, according to at least one embodiment. The resource manager 180 may gather metrics on the variations in the number of active or allocated reserved instances and/or on-demand instances over time (element 2201). Based on the metrics, the resource manager 180 may identify usage trends and develop projections for expected future usage of the different types of instances. Projections may be developed for varying future time periods in some embodiments. For example, by examining hour-by-hour usage data for on-demand instances over a period of a few months, the resource manager 180 may be able to project that the number of on-demand instance acquisition requests typically rises by X % between 6 am and 8 am on Mondays. Accordingly, the resource manager may ensure that sufficient available interruptible-without-notification instances are set aside to meet the X % increase—e.g., by reducing the number of enhanced-interruptibility instances at the appropriate times. Longer-term trends may also be identified on the basis of past usage in some embodiments—e.g., the resource manager 180 may be able to predict that the total number of reserved instances is going to rise by 30% over the next three months, and/or that the fraction of reserved instance slots that are unused at any given time is likely to rise by 20% over the next three months.

Based at least in part on such short-term and/or longer-term projections, the resource manager 180 may make a determination as to whether any of the instance pools or sub-pools, such as the enhanced-interruptibility sub-pools, need to be resized (element 2209). If the resource manager 180 determines that one or more pools or sub-pools should be resized, it may determine when such resizing should be performed, and move instances in or out of the appropriate pools accordingly (element 2213). If no changes to current pool sizes are needed, the resource manager may resume monitoring the usage of various types of resources and make new projections as needed, e.g., repeating the steps illustrated in elements 2201, 2205 and 2209. In some embodiments projections of future needs for various types of instances may be made on a predetermined schedule. In other embodiments projections may be developed in response to threshold conditions—e.g., if the number of available instances falls to less than 10% of the total instances in an availability zone, an analysis of past usage trends and corresponding future projections may be initiated. In addition to changing the sizes of various pools and sub-pools, the pricing rates associated with different interruptibility settings may also be adjusted based on trend analysis in some embodiments. For example, in one embodiment usage trends may predict a rise in demand for enhanced-interruptibility instances by a web retailing client during a forthcoming retail sales period, and the resource manager 180 may raise prices for enhanced interruptibility instances based on the prediction.

Figure 23:
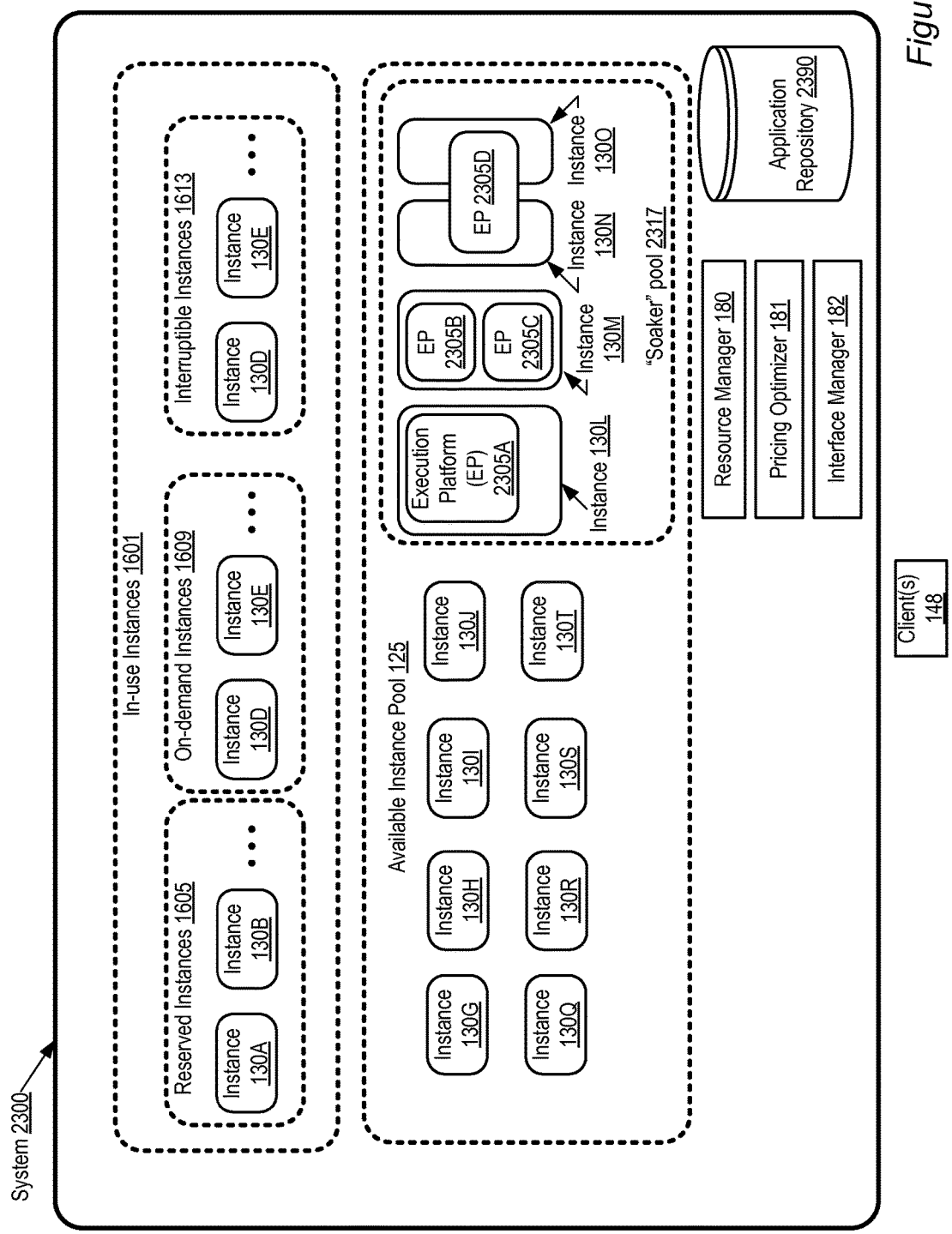
FIG. 23 illustrates a system in which a resource manager is configurable to determine a dynamically varying price per execution unit of excess resource capacity, and use the price to select client-provided applications for execution, according to at least some embodiments.

Dynamic Pricing for Flexible-Granularity Execution of Stateful Client Applications Excess resource capacity of a provider resource may be reserved and allocated in units of resource instances in many of the embodiments described above. In some embodiments and for certain kinds of client applications, it may be beneficial to manage and schedule resources at other granularities in addition to, or instead of, entire resource instances. FIG. 23 illustrates a system 2300 in which the resource manager 180 is configurable to determine a dynamically varying price per execution unit (expressed for example in units such as CPU-seconds, CPU-minutes, CPU-hours, MegaFLOPs, Megahertz, Gigahertz and the like) of excess resource capacity, and use the price to select client-provided applications for execution, according to at least some embodiments. A client 148 may provide one or more application packages to the resource manager 180, e.g., with the help of a programmatic interface such as an API or a one or more web pages implemented by interface manager 182, where each application package includes an executable object and has an associated pricing constraint to be used to schedule the execution of the executable object. For example, a client may provide an executable object that can be deployed and run on a JVM that is compliant with a specified version of the Java™ Development Kit (JDK), a platform that supports various interpreted or compiled programming languages such as Ruby, Python, Perl, C, C++ and the like, or on a high-performance computing execution platform that conforms to one or more industry standards. The client 148 may indicate, as a pricing constraint, that it is willing to pay up to specified amount for each CPU-minute that the executable is run on an execution platform with a specified performance capacity (e.g., on a JDK 1.6 JVM running on CPU X at 3 GHz or higher clock rate). The application packages provided by clients may be stored in an application repository 2390 in some embodiments. Various other details regarding the application may also be specified by the client via the application package, such as input/output needs of the application; further details of application package contents are provided below.

In the illustrated embodiment, a subset of available instances (such as instances 130L, 130M, 130N and 130O) may be assigned to a "soaker" pool 2317 at a given point in time, representing a pool of excess resource capacity that is usable for the application packages. The resource manager 180 may instantiate a number of execution platforms (EPs) 2305 on the instances 130 of the soaker pool, as needed, to satisfy the execution requests for the application packages provided by the clients. For example, an EP 2305A may be instantiated on instance 130L, two EPs 2305B and 2305C may be instantiated on instance 130M, and one EP 2305D may span multiple instances such as 130N and 130O. An execution platform may comprise any of a variety of middleware entities or software collections that may be needed for execution of client applications, such as for example JVMs, application server instances, database instances, special-purpose or general-purpose operating systems, high-performance computing platforms such as genome analysis platforms, simulation test beds, map-reduce execution environments, and the like.

A flexible mapping of execution platforms to the excess resource capacity of a provider network may be implemented in some embodiments—e.g., a single EP 2305 may be instantiated on one resource instance 130, or multiple EPs 2305 may be instantiated on one resource instance 130, or a single EP 2305 may be instantiated on multiple resource instances 130. In some embodiments where for example a resource instance 130 typically comprises a virtual compute platform that relies on a hypervisor running on some "bare-metal" hardware asset, some of the bare-metal hardware assets may be used for the soaker pool 2317 without instantiating hypervisors or other components typically used for resource instances. Pricing per execution unit (e.g., per CPU-minute) for different types of EPs may vary dynamically in some embodiments, based on factors such as the supply and demand for such EPs, the performance capabilities of the EPs, the requirements of the resource manager to maintain available instances to support unfulfilled reservation slots, and so on.

The resource manager 180 may attempt to find a "best match" execution platform for various application packages using one or more criteria. For example, in one embodiment, the resource manager 180 may select a particular EP 2305 on which to schedule execution of the executable object of an application package based at least in part on the current pricing of execution units of the EP 2305 and the pricing constraints of the application package (e.g., the maximum price the client is willing to pay). If a match is found, execution of the client's application may be started (or resumed) on the selected EP 2305.

Any of a number of events or conditions may result in the execution being suspended or stopped in some embodiments. For example, in one embodiment, in response to a price-based interruption event such as the receipt of a new application package for which the corresponding client is willing to pay a higher price than is currently being charged, a representation of the current state of the application may be saved, and the execution of the executable object may be stopped on the EP 2305. Another example price-based interruption event may comprise the determination by resource manager 180 that a different EP 2305 has become available that may be better suited for the application, e.g., because of a lower price or because the different EP 2305 supports additional functionality or capabilities than the EP currently being used. The resource manager 180 may try to schedule further execution of a stopped/suspended application on other EPs based for example on availability and pricing.

In some embodiments, a client 148 may provide an application package to the resource manager 180 and ask for a quote for completing execution of the application. The resource manager may analyze the application package in response to the quote request, and may determine and provide a quote responsive to the request, taking into account various factors such as the current and/or expected future pricing of EPs 2305 appropriate for the client's application. The client 148 may receive the quote and indicate a bid responsive to the quote, e.g., as part of pricing constraint information provided with the application package. The resource manager 180 may respond to the bid affirmatively, by scheduling execution of the client's application on a suitable EP, or, if the bid is found to be insufficient, the resource manager 180 may reject the bid at least temporarily. A client 148 may ask for bid to complete execution of an application after a portion of the application has already been executed in some embodiments. For example, if an application is run for a while and then stopped as a result of a price-based interruption event, the client may submit a quote request to the resource manager to obtain an estimate of how much it might cost to complete the remaining portion of the application execution. In some implementations, if a bid responsive to a quote is initially rejected, that same bid may later be found acceptable as a result of price changes that have occurred since the initial rejection; thus, the execution of an application may be scheduled if and when the bid becomes acceptable.

Example Application Package Contents

Figure 24:
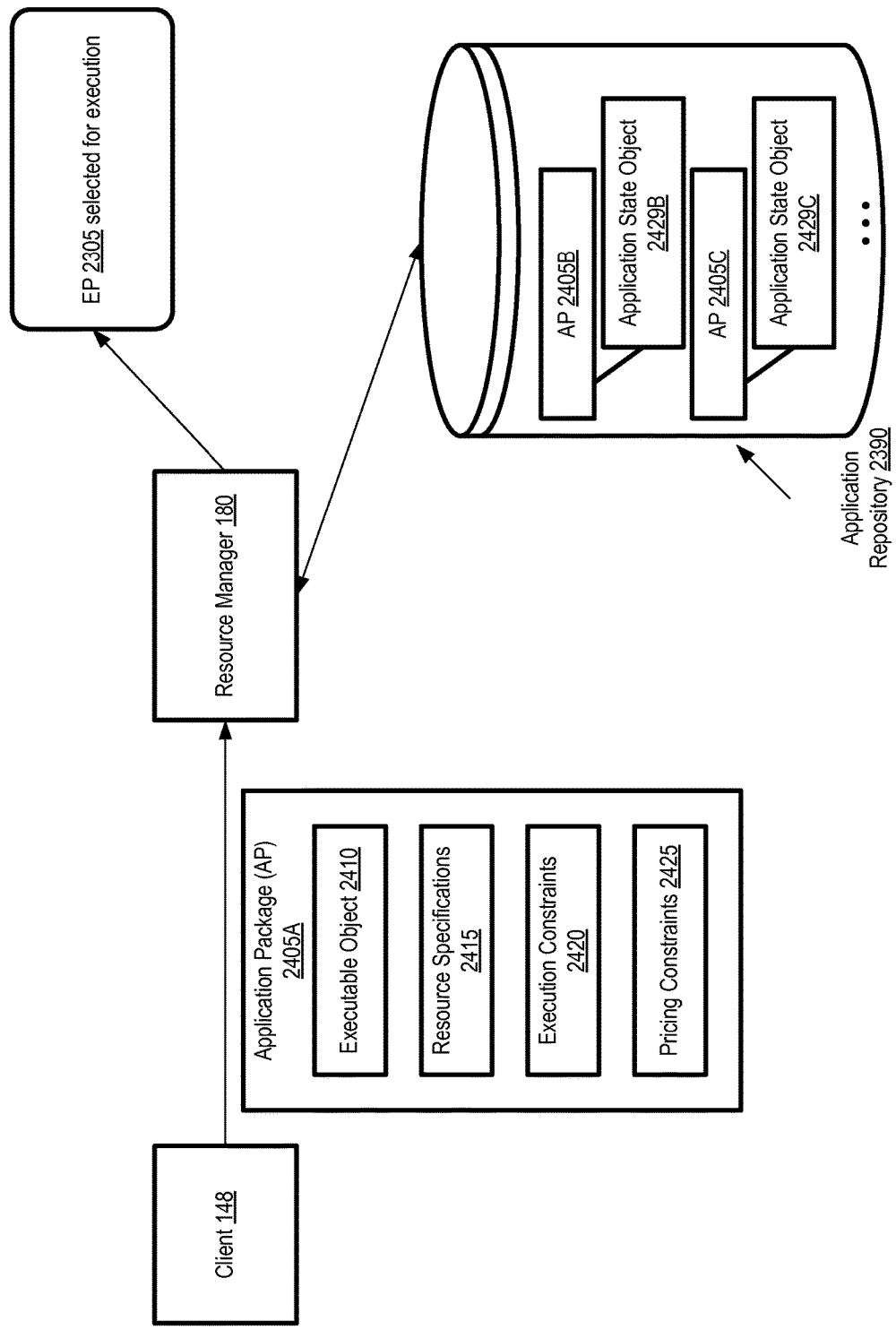
FIG. 24 illustrates example contents of an application package that may be submitted by a client to a resource manager, according to at least some embodiments.

FIG. 24 illustrates example contents of an application package that may be submitted by a client 148 to a resource manager 180, according to at least some embodiments. The application package (AP) 2405A may comprise an executable object 2410, such as a jar (Java™ archive) file, a war (web application archive) file, an ear (enterprise archive) file, an exe file, one or more scripts written in any appropriate language such as Python, Ruby, Perl, any of various variants of SQL, shell scripts, and the like. In one implementation supporting parallel or multi-threaded application types, the executable object 2410 may comprise one thread, or a few threads, of a multi-threaded or parallel application—e.g., several application packages 2405 may be created for a single multi-threaded application, such that each package 2405 specifies a subset of the complete set of threads of the application as the package's executable object 2410. In some embodiments the AP 2405A may include a set of preferred or required resource specifications 2415, such as a minimum CPU speed, CPU vendor or architecture details, minimum main memory requirements, an operating system version, application server version, database management system vendor and version, and so on. Some of the resource specifications may be labeled as mandatory, i.e., the resource manager 180 may be unable to execute the application if the mandatory requirements are not met. Non-mandatory resource specifications may serve as hints or advisories to the resource manager; e.g., the resource manager may in some implementations make a best effort to find execution platforms that meet non-mandatory specifications.

Some types of applications may have dependencies or constraints—for example, one application may rely on an external web site being available, or may perform better when an external web site is available. Another application may be configured to obtain work tasks or jobs from an external job queue, such that if the job queue is empty or unreachable the application may not be able to perform much useful work. An AP 2405A may contain indications of such execution constraints 2420 in some implementations. A client 148 may include pricing constraints 2425 in the application package itself in some embodiments—e.g., the maximum price the client is willing to pay per CPU-minute or per some other execution unit. In some implementations the client may specify pricing constraints for completing execution of the application, instead of or in addition to specifying the client's bid per execution unit. Pricing constraints associated with an application package may be specified and/or stored separately from other contents of the application package in some embodiments, e.g., an application package may not include the pricing constraints in some cases. A client 148 may in some implementations update the bid or other details of the pricing constraints 2425 as needed during the lifetime of the application—e.g., if an application is suspended or stopped because the prevailing price for using the application platform it needs has risen beyond the price bid by the client originally, the client may be allowed to raise the bid; and if the client wishes to lower costs for some reasons, the client may be allowed to lower the bid for one or more of the client's application packages.

When resource manager 180 received an application package 2405, in some embodiments it may store the package in a persistent application repository 2390. If a suitable execution platform 2305 can be found for the application submitted by the client, the execution of the application on that selected EP 2305 may be initiated. In some implementations the application package 2405 may only be stored if an EP 2305 cannot immediately be found for it, i.e., an application package 2405 may be stored in the application repository 2390 only when and if the execution of the application cannot proceed. In some embodiments, the resource manager 180 may also store a persistent application state object (ASO) 2429 (such as a serialized Java™ object file, or any other object representation of the state of an application that allows the resumption of the application when a suitable execution platform become available) for each application object 2405—e.g., ASO 2429B for application package 2405B, ASO 2429C for application package 2405C, and so on. For applications whose execution has not yet begun, the state representation object 2429 may be empty. Other information not shown in FIG. 24 may be included in application packages 2405 and/or in application repository 2390 in some embodiments, such as for example one or more representation of execution metrics (e.g., how many CPU-minutes of execution have been completed so far for the application), execution history (on which specific execution platforms the application has been executed), and the like. In some embodiments security constraints may also be associated with each application package 2405—e.g., the client 148 may encrypt portions of the application package and/or use a digital signature on portions of the application package. In such cases the resource manager 180 and the client 148 may need to transfer or exchange one or more keys to implement the security mechanism being used.

Quote-Based Pricing for Application Execution

Figure 25:
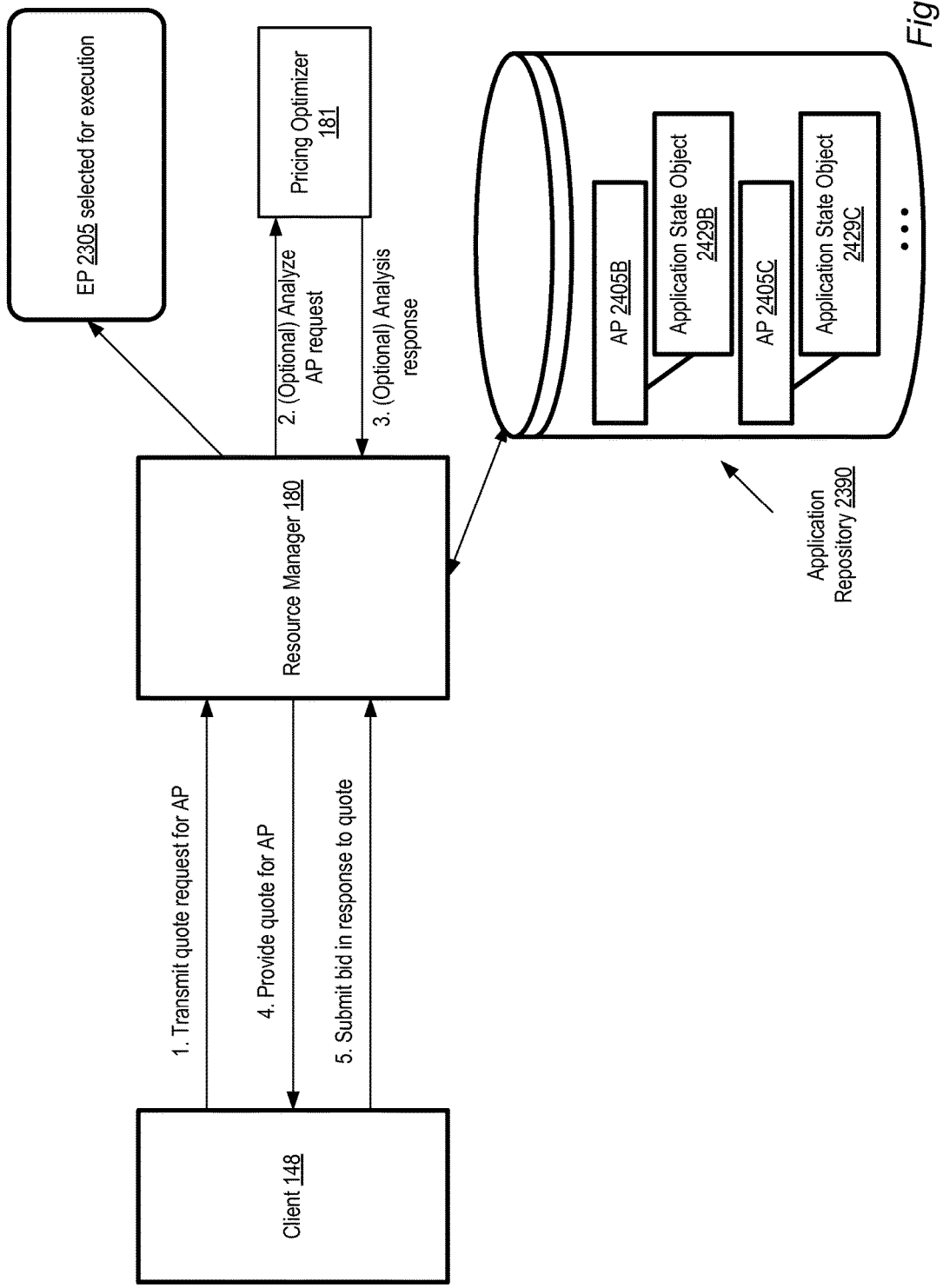
FIG. 25 illustrates example interactions between a client and a resource manager configured to provide quotes for completing execution of an application, according to at least some embodiments.

FIG. 25 illustrates example interactions between a client 148 and a resource manager 180 configured to provide quotes for completing execution of an application, according to at least some embodiments. As indicated by the arrow labeled "1", a client 148 may transmit or submit a quote request for an application package 2405 to the resource manager 180. The resource manager may in some embodiments implement a programmatic interface (e.g., via a web site or an API) for the submission of quote request and/or application packages, and the client may use the interface for the quote request. In some implementations a quote request may be included within an application package 2405, or may be transmitted together with an application package 2405

When the resource manager receives the quote request, it may analyze the contents of the corresponding AP 2405. In some embodiments, as shown by the arrow labeled "2" in FIG. 25, the resource manager 180 may send an optional request to the pricing optimizer 181 to help analyze the AP 2405. In embodiments where quote requests may be submitted for applications that have already completed a portion of their execution, the resource manager 180 and/or the pricing optimizer 181 may examine the application state object (ASO) 2429 as well as elements of the AP 2405 (such as resource specifications 2415) to help estimate the remaining resource requirements for the application. In addition to examining the AP 2405 and/or the ASO, the resource manager 180 and/or the pricing optimizer 181 may obtain pricing history for execution platforms 2305 of the type needed by the application, and may use any combination of these data sources to determine a quote for completing execution of the application. In embodiments where the pricing optimizer 181 is involved in AP analysis, the pricing optimizer 181 may send an analysis response to the resource manager 180, as indicated by the arrow labeled "3" in FIG. 25.

The quote may include a fixed price that the client would be billed for completing the execution of the application in some embodiments. In one implementation, several alternate quotes may be provided, each with an associated time period for completing the application execution—e.g., one quote for completing the application within a week, another quote for completing the application within two weeks, and so on. In another implementation, the resource manager 180 may provide several alternate quotes for completing different fractions of execution (or different numbers of total client transactions, in the case of transactional workloads)—e.g., the resource manager 180 may provide a first quote for completing 50 simulation runs, another quote for 100 simulation runs, and so on. When the quote or set of quotes is determined, either by the resource manager 180 alone or as a result of cooperation between the resource manager 180 and the pricing optimizer 181, the quote may be provided to the client 148, as indicated by the arrow labeled "4" in FIG. 25. In response to the quote or quotes, the client 148 may submit a bid, as indicated by the arrow labeled "5". If the bid is acceptable, the resource manager 180 may schedule the execution of the client's application if a suitable EP 2305 is available. If no appropriate EP is currently available, or if the bid is too low, the client's application package may be stored in application repository 2390 for later execution.

Figure 26:
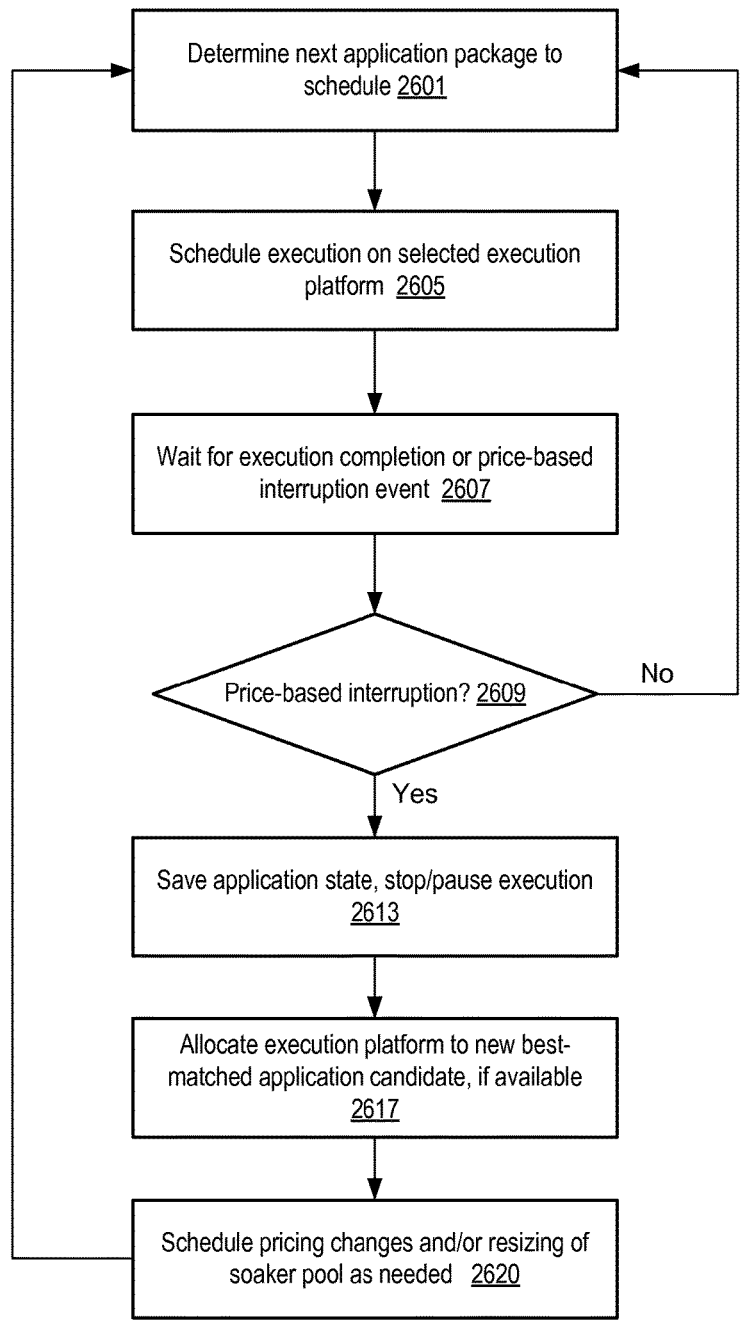
FIG. 26 is a flow diagram illustrating aspects of the operation of a resource manager configured to schedule execution of client-provided applications on execution platforms with dynamically changing pricing per unit of execution, according to at least some embodiments.

Methods for Pricing and Scheduling Client-Provided Applications on Execution Platforms FIG. 26 is a flow diagram illustrating aspects of the operation of a resource manager 180 configured to schedule execution of client-provided applications on execution platforms 2305 with dynamically changing pricing per unit of execution, according to at least some embodiments. As shown in element 2601, the resource manager 180 may determine the next application package 2405 for which it is to attempt execution scheduling. An application package 2405 that has just been submitted by a client 148 may be the next one to be scheduled, or, if there are one or more application packages 2405 in the application repository 2390 whose executables are currently not running, an application packages from the repository may be the next one to be scheduled. The resource manager 180 may in some implementations maintain a queue or list of schedulable applications, ranked based on the basis of one or more priority criteria such as the bid value associated with each application package 2405, and may pick the highest priority application package from such a queue or list for consideration as the next application package to be scheduled. In some implementations, multiple such queues or lists may be maintained, e.g., different queues may be maintained for different sizes and/or other characteristics of supported execution platforms. One queue may be maintained for EPs 2305 that comprise JVMs, another queue for Python execution platforms, and so on, for example.

The execution of the executable object 2410 of the application package 2405 being considered may be scheduled on an available execution platform 2305 that meets the requirements of the application (element 2605 of FIG. 26).

If multiple appropriate execution platforms are available, the resource manager 180 may select one from among them based on one or more selection heuristics or algorithms, for example using a load balancing technique to spread the workload among available execution platforms, or an affinity technique that attempts to schedule all of a given client's applications on the same set of execution platforms. The resource manager may then wait for the execution of the client's application to complete on the selected execution platform 2305, or for a price-based interruption event to occur that may result in the execution being suspended or stopped (element 2607).

If a price-based interruption event occurs (as determined in element 2609), e.g., if a new application package arrives with a higher bid for the type of execution platform being used currently for the client's application, the resource manager may save the application state and stop/suspend the execution of the executable 2410 (element 2613). The application state may be saved in the application repository 2390 in some implementations, e.g., in the form of a persistent application state object 2429 that contains enough information to resume the application's execution at the point it was stopped. If the execution completes (i.e., if the next event that influences the execution of the client's application is not a price-based interruption), as also determined in element 2609, the resource manager may continue on to identify the next application package to schedule. In some implementations the application package may be removed from the application repository 2390 upon completion of the application's execution.

If a price-based interruption led to the stoppage/suspension of the client's application on the selected execution platform 2305, as shown in element 2617 the resource manager 180 may allocate that execution platform 2305 to a different client-provided application (e.g., a client application for which a higher bid was received), if such an application is found. In some cases the interruption may lead to the resource manager making one or more pricing changes, e.g., raising an advertised minimum price for the use of execution platforms 2305 (element 2620). The interruption event may also result in a change to the size of the soaker pool in some cases—e.g., the interruption event may comprise the completion of the execution of some other application, or the bring-up of additional hardware at a data center, either of which may result in a more economical execution platform becoming available. In some cases, the price-based interrupt may result in the client's application being suspended for a while, while in other cases, a new target execution platform that meets the client's pricing constraints may be found immediately and the client's application may begin execution on the newly found target platform very quickly. The resource manager may resume its functionality after the price-based interrupt has been handled—e.g., it may attempt to determine the next application package to schedule (which may or may not be the application package whose executable has just been suspended in some cases, depending on the criteria being used to select the next package to schedule). It is noted that various aspects of the functionality illustrated in FIG. 26 may be performed in parallel, or in a different order than shown in FIG. 26, in some implementations. For example, the resource manager may comprise multiple threads that run in parallel to schedule client applications as quickly as possible.

Figure 27:
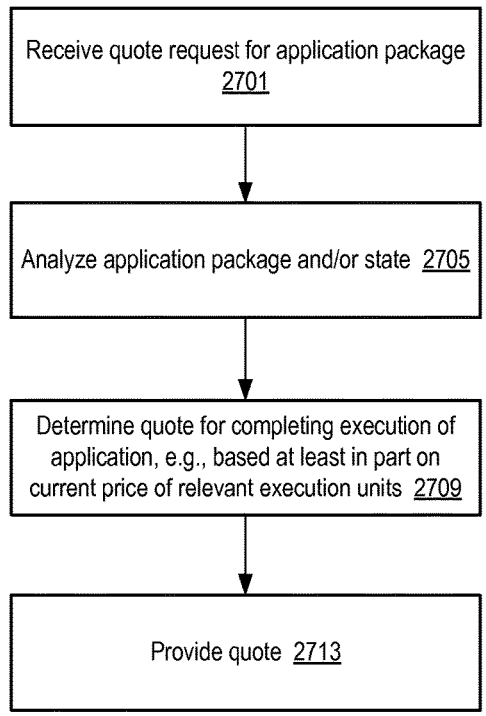
FIG. 27 is a flow diagram illustrating aspects of the operation of a resource manager configured to provide quotes for completing execution of an application, according to at least some embodiments.

FIG. 27 is a flow diagram illustrating aspects of the operation of a resource manager 180 configured to provide quotes for completing execution of an application, according to at least some embodiments. A quote request may be received (element 2701) for an application package 2405 from a client 148, either accompanying the initial submission of the application package, or at some later point during the lifecycle of the application package. In some implementations quote requests may even be submitted for a currently-running application, while in other implementations the resource manager 180 may only accept quote requests for applications that are currently not running In response to quote request, the resource manager 180 may analyze the application package and/or the current state of the application (e.g., the state representation saved in the corresponding persistent application state object 2429), as shown in element 2705 of FIG. 27. In some embodiments, as shown in FIG. 25, the pricing optimizer may also be used to analyze the application package and/or state.

Based at least in part on results of the analysis, and at least in part on the current price associated with execution units (such as CPU-minutes or CPU-hours) of the execution units usable for the application, a quote for completing the execution of the application may be determined (element 2709 of FIG. 27). The quote may then be provided to the requesting client 148 (element 2713). In some implementations multiple quotes may be provided—e.g., quotes for different total completion times, or quotes for completing different workload amounts. The client may use the quote or quotes to make a new bid for the application package, e.g., by providing or updating a bid in the pricing constraints section 2425 of the application package. The resource manager may accept or (at least temporarily) reject the bid as appropriate based on current conditions and/or pricing trends.

Example Web-Based Interface for Application Package Specifications

FIG. 28 illustrates a portion of an example web-based interface that may be implemented to allow clients 148 to provide application specifications to be used to schedule the client applications on execution platforms, according to some embodiments. As shown, web page 2800 of FIG. 28 may include a welcome message section 2803 that includes an instruction to the client to fill out as many details of the client's application as possible using the form fields available on the page. In some implementations links to additional information about the working of the soaker pool, such as details about the different types and performance capabilities of execution platforms, may also be provided, e.g., via button 2807.

A number of fields 2809 may be implemented for the client 148 to provide application details to the resource manager 180 in the illustrated embodiment. For example, the resource manager 180 may implement a drop-down menu allowing the client to select from among one or more supported executable types (e.g., Java™ executables, Ruby scripts, Python scripts, Perl scripts, and the like). In some implementations input and output modes for the application may be specified—e.g., if the executable object of the application relies on input parameters or input data, the source of such input may be specified, and the target to which any output produced by the executable may be specified. In the illustrated example, a default setting of an extensible markup language (XML) file has chosen for input, and a test file has been specified for application output. In some embodiments some of the output generated by the client's executable may be stored in a different location or container than the execution platform being used for the executable—e.g., at least some of the output could be stored on an external storage instance or storage device, e.g., an independently-managed device accessible via a network connection from the execution platform. Similarly, in some scenarios input for the executable may also be retrieved from external locations or containers. Clients may also be able to specify requirements for input/output from or to external entities using interfaces similar to those shown in FIG. 28 in some embodiments.

If the client's application requires CPUs with a minimum processing power, and/or a minimum amount of main memory, such requirements may also be specified via web page 2800 in some implementations. Commands that the resource manager 180 may use to save application state (e.g., a shell script supplied by the client) may also be indicated in fields 2809. If the application has special parallelism requirements, e.g., if multiple processors are needed, the parallelism specifications may also be provided using the interface.

In the example implementation showed in FIG. 28, pricing-related preferences may also be specified by the client via form fields section 2809. For example, the client may request a bid for the application using one of the form fields. If quotes for complete execution are not requested, the execution units (e.g., CPU-minutes or CPU-hours for the equivalent of a specified processor type and speed, labeled processor "PPP" in the example) to be used for bidding may be selectable by the client 148 via another drop-down menu or form field. In some implementations a bid, either per execution-unit or for complete execution of the application, may also be provided by the client using the web interface. In addition to or instead of the web page 2800 shown in FIG. 28, other programmatic interfaces such as APIs or command line interfaces may be implemented in some embodiments for various interactions between the clients and the resource manager related to pricing and scheduling application execution. Examples of such interactions supported by the programmatic interfaces in various embodiments may include uploading application packages, submitting bid/quote requests, receiving bid/quote responses, control requests such as stopping/starting application executables, requests for status (of applications, quotes or bids), cancellation requests (for application packages, bids, or quotes), and modification requests (for application packages, bids, or quotes).

In some embodiments clients 148 may also be provided the ability to opt in to receive recommendations for their applications from the pricing optimizer 181, similar in principle to the kinds of recommendations described earlier in conjunction with the description of FIG. 3. The pricing optimizer may for example keep track of the usage of various execution platforms 2305 by a client's applications, and may be able to provide recommendations on the kinds of execution platforms that the client should bid for. Such recommendations may be especially helpful in embodiments where the pricing of execution platforms is tied to the performance capabilities of the execution units, and clients may be unintentionally specifying inappropriate minimum performance requirements or bidding for suboptimal execution platforms. The pricing optimizer 181 may also analyze the impact or overhead of interruptions on the progress of a client's applications over time, and make recommendations based on such analysis—e.g., if the overhead is high, the optimizer may recommend a higher bid, or a transition to more traditional types of resource usage such as reserved instance use or on-demand instance use.

The resource manager 180 may in some embodiments implement multiple levels of interruptibility for execution platforms 2305, similar to the types of instance interruptibility settings discussed in conjunction with the descriptions of FIGS. 16-18. The pricing of execution platforms 2305 may be determined on the interruptibility setting requested by the client in such embodiments. One or more sub-pools of the soaker pool 2317 may be maintained to cater to different interruptibility settings. In such embodiments, the resource manager 180 may resize the sub-pools and/or the soaker pool using techniques similar to those described earlier for resizing the instance pools shown in FIG. 16.

Example Use Cases

The techniques described above for providing and implementing usage-based recommendations, supporting multiple levels of interruptibility, and scheduling and pricing execution of client-provided applications based on execution units other than instances, may be useful in a wide variety of environments. As the size and complexity of cloud-based resource provisioning grows, and more and more applications are deployed into cloud environments, the probability that resources of a particular type or in a particular data center remain underutilized, while at the same time demand for that same type of resource somewhere else is high, will also tend to grow. The ability of a resource manager to match peaks in demand with currently idle resources will be useful in maintaining high customer satisfaction, and will also help provider network operators to maximize their own return on investment.

The functionality described above may also help to convince clients that may otherwise be reluctant to use cloud computing environments to try out the services offered by provider networks with low risk. For example, a client may specify a fairly low budget limit to a pricing optimizer, and allow the pricing optimizer to suggest recommendations that are within that budget limit. If the recommendations turn out to be useful, the client may consider using the provider network for more or larger applications. If the recommendations do not impress the client, the client may decide not to use the pricing optimizer (or even the provider network as a whole), with few negative consequences. The automated implementation of recommendations made by the pricing optimizer may allow those clients that are confident of the capabilities of the pricing optimizer to substantially reduce the overhead involved in managing their cloud resource instances. The support for enhanced interruptibility levels, and for dynamic pricing and execution of client-provided application executables, may significantly expand the different types of applications that may be run economically using the provider network's resources.

Illustrative Computing Device

Figure 29:
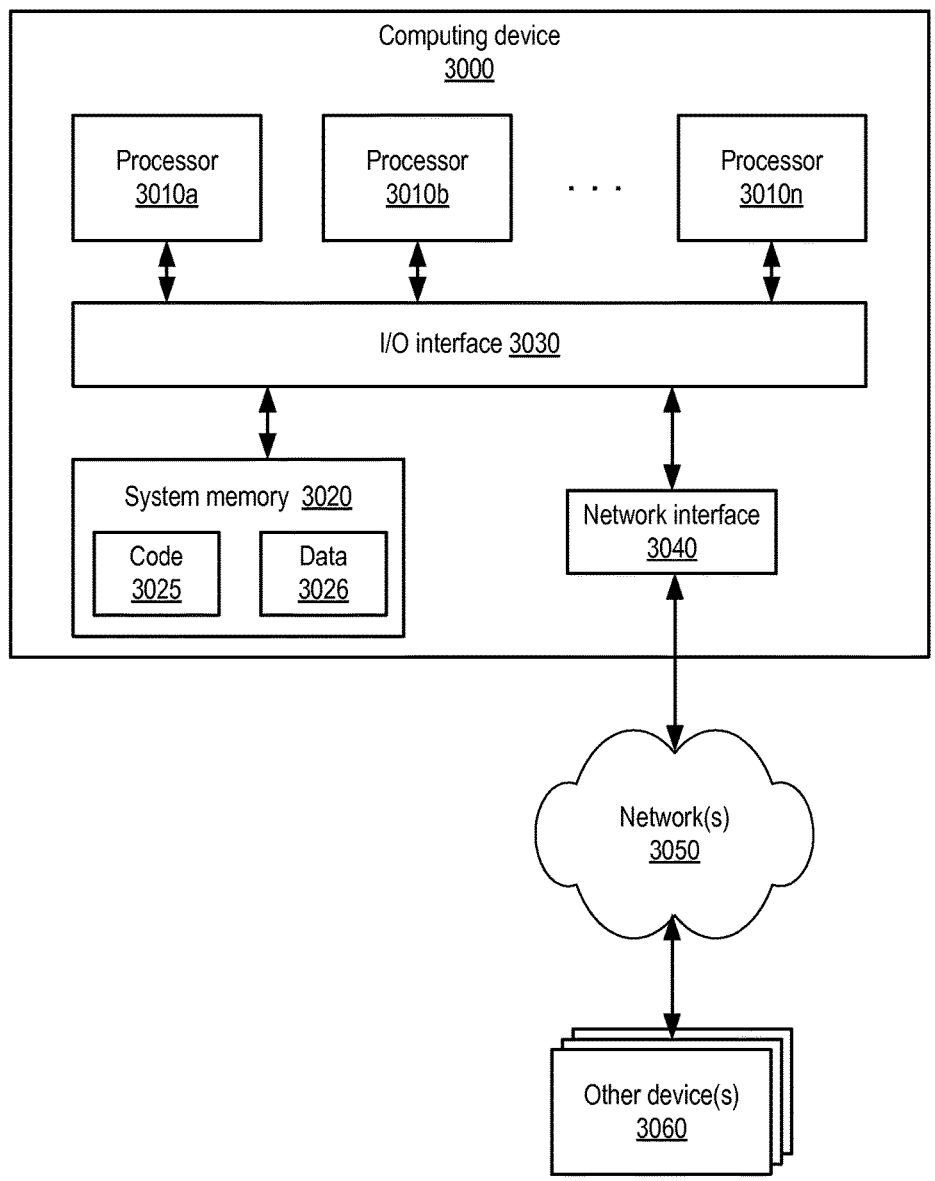
FIG. 29 is a block diagram illustrating an example computer system that may be used in some embodiments.

In at least some embodiments, a server that implements a portion or all of one or more of the technologies described herein, including the techniques to implement the functionality of pricing optimizer 181, resource manager 180, interface manager 182 and execution platforms 2305 may include a general-purpose computer system that includes or is configured to access one or more computer-accessible media. FIG. 29 illustrates such a general purpose computing device 3000. In the illustrated embodiment, computing device 3000 includes one or more processors 3010 coupled to a system memory 3020 via an input/output (I/O) interface 3030. Computing device 3000 further includes a network interface 3040 coupled to I/O interface 3030.

In various embodiments, computing device 3000 may be a uniprocessor system including one processor 3010, or a multiprocessor system including several processors 3010 (e.g., two, four, eight, or another suitable number). Processors 3010 may be any suitable processors capable of executing instructions. For example, in various embodiments, processors 3010 may be general-purpose or embedded processors implementing any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA.

System memory 3020 may be configured to store instructions and data accessible by processor(s) 3010. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code 3025 and data 3026.

In one embodiment, I/O interface 3030 may be configured to coordinate I/O traffic between processor 3010, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processor 3010.

Network interface 3040 may be configured to allow data to be exchanged between computing device 3000 and other devices 3060 attached to a network or networks 3050, such as other computer systems or devices as illustrated in FIGS. 1 through 28, for example. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-accessible medium configured to store program instructions and data as described above for FIGS. 1 through 28 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 3000 via I/O interface 3030. A non-transitory computer-accessible storage medium may also include any volatile or non-volatile media such as RAM (e.g. SDRAM, DDR SDRAM, RDRAM, SRAM, etc.), ROM, etc, that may be included in some embodiments of computing device 3000 as system memory 3020 or another type of memory. Further, a computer-accessible medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 29 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc, as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
    one or more computing devices configured to implement a plurality of resource instances of a provider network, wherein each resource instance of the plurality of resource instances has a modifiable interruptibility property; and
    one or more other computing devices configured to implement a resource manager;
    wherein the resource manager is configured to:
        receive a first instance acquisition request from a first client, wherein the first instance acquisition request indicates a first specified interruptibility level that permits the resource manager to revoke access to a first resource instance of the plurality of resource instances without an access revocation notification;
        in response to the first instance acquisition request, allocate the first resource instance to the first client, wherein the interruptibility property of the first resource instance is set to the first specified interruptibility level;
        in response to a first access revocation condition and a determination that the interruptibility property of the first resource instance corresponds to the first speci-
fied interruptibility level, revoke access of the first client to the first resource instance without the access revocation notification;
        receive a second instance acquisition request from a second client for a second resource instance of the plurality of resource instances, wherein the second instance acquisition request indicates a second specified interruptibility level that permits the resource manager to maintain access to the second resource instance for a delay interval subsequent to the resource manager sending of the access revocation notification;
        in response to an approval of the second instance acquisition request, allocate the second resource instance to the second client, wherein the interruptibility property of the second resource instance is set to the second specified interruptibility level; and
        in response to a second access revocation condition and a determination that the interruptibility property of the second resource instance corresponds to the second specified interruptibility level, maintain access of the second client to the second resource instance for the delay interval after the second client receives the access revocation notification.

2. The system as recited in claim 1, wherein the resource manager is further configured to:
    assign one or more resource instances of the plurality of resource instances to a pool of available resource instances, based at least in part on a determination that the one or more resource instances are idle;
    select the first resource instance from the pool of available resource instances for allocation to the first client;
    determine a first billing amount for use of the first resource instance by the first client based at least in part on an interruptible instance pricing rate; and
    determine the interruptible instance pricing rate based at least in part on a current size of the pool of available resource instances.

3. The system as recited in claim 2, wherein the resource manager is further configured to:
    assign one or more resource instances of the pool of available resource instances to a sub-pool of convertible resource instances, based at least in part on an expected rate of instance acquisition requests specifying the second specified interruptibility level;
    select the second resource instance from the sub-pool of convertible resource instances for allocation to the second client;
    determine a second billing amount for use of the second resource instance by the second client based at least in part on an interruptible-with-notification instance pricing rate; and
    determine the interruptible-with-notification instance pricing rate based at least in part on a current size of the sub-pool of convertible resource instances.

4. The system as recited in claim 3, wherein the resource manager is further configured to:
    remove a selected resource instance from the sub-pool of convertible resource instances, and retain the selected resource instance in the pool of available resource instances, based at least in part on a number of projected resource instance reservations.

5. The system as recited in claim 3, wherein said determine the first billing amount for use of the first resource instance by the first client is further based on a first duration for the first specified interruptibility level when the interruptibility property of the first resource instance is set to the first specified interruptibility level, and wherein said determine the second billing amount for use of the second resource instance by the second client is further based on a duration second duration for the second specified interruptibility level when the interruptibility property of the second resource instance is set to the second specified interruptibility level.

6. The system as recited in claim 1, wherein the resource manager is further configured to:
  determine whether to approve the second instance acquisition request based at least in part on a bid value indicated in the second instance acquisition request.

7. The system as recited in claim 1, wherein the resource manager is further configured to:
  receive an interruptibility upgrade request from the first client, wherein the interruptibility upgrade request comprises a change request to change the interruptibility property of the first resource instance from the first specified interruptibility level to the second specified interruptibility level; and
  in response to an approval of the interruptibility upgrade request, set the interruptibility property of the first resource instance to the second specified interruptibility level, allowing the first client to retain access to the first resource instance for the delay interval after the first client receives an access revocation notification.

8. A method, comprising:
performing, by one or more computing devices:
  receiving a first instance acquisition request from a first client for a first resource instance of a plurality of resource instances, wherein the first instance acquisition request indicates a first specified interruptibility level, wherein the first specified interruptibility level permits revocation of access to the first resource instance without an access revocation notification;
  in response to the first instance acquisition request from the first client, allocating the first resource instance to the first client, wherein an interruptibility property of the first resource instance is set to the first specified interruptibility level;
  in response to a first access revocation condition and a determination that the interruptibility property of the first resource instance corresponds to the first specified interruptibility level, revoking the first client's access to the first resource instance without the access revocation notification;
  receiving a second instance acquisition request from a second client for a second resource instance of the plurality of resource instances, wherein the second instance acquisition request indicates a second specified interruptibility level, wherein the second specified interruptibility level permits retaining access to the second resource instance for a delay interval subsequent to sending of the access revocation notification;
  in response to an approval of the second instance acquisition request, allocating the second resource instance to the second client, wherein an interruptibility property of the second resource instance is set to the second specified interruptibility level; and
  in response to a second access revocation condition and a determination that the interruptibility property of the second resource instance corresponds to the second specified interruptibility level, retaining access from the second client to the second resource instance for the delay interval after the second client receives the access revocation notification.

9. The method as recited in claim 8, further comprising:
assigning one or more resource instances of the plurality of resource instances to a pool of available resource instances, based at least in part on a determination that the one or more resource instances are idle; and
selecting the first resource instance from the pool of available resource instances for allocation to the first client.

10. The method as recited in claim 9, further comprising:
assigning one or more resource instances of the pool of available resource instances to a sub-pool of convertible resource instances, based at least in part on an expected rate of instance acquisition requests specifying the second specified interruptibility level, wherein the sub-pool comprises a subset of convertible resource instances from the pool of available resource instances; and
selecting the second resource instance from the sub-pool of convertible resource instances for allocation to the second client.

11. The method as recited in claim 10, further comprising:
removing a selected resource instance from the sub-pool of convertible resource instances, and retaining the selected resource instance in the pool of available resource instances, based at least in part on a number of resource instance reservations.

12. The method as recited in claim 8, further comprising:
determining whether to approve the second instance acquisition request based at least in part on a bid value indicated in the second instance acquisition request.

13. The method as recited in claim 8, further comprising:
in response to an approval of an interruptibility upgrade request from the first client, wherein the interruptibility upgrade request comprises a request from the first client, for a change of the interruptibility property of the first resource instance, and the interruptibility upgrade request is separate from a specification, from the first client, of a maximum bid price for the first resource instance, setting the interruptibility property of the first resource instance to the second specified interruptibility level, allowing the first client to retain access to the first resource instance for the delay interval after the first client receives the access revocation notification.

14. The method as recited in claim 8, further comprising:
determining the delay interval after the second client receives the access revocation notification based at least in part on a bid value indicated in the second instance acquisition request.

15. The method as recited in claim 8, further comprising:
determining the delay interval after the second client receives the access revocation notification based at least in part on an interruptible-with-notification instance pricing rate.

16. The method as recited in claim 8, further comprising:
determining a first billing amount for use of the first resource instance by the first client based on a duration first duration for the first specified interruptibility level when the interruptibility property of the first resource instance is set to the first specified interruptibility level; and
determining a second billing amount for use of the second resource instance by the second client based on a second duration for the second specified interruptibility level when the interruptibility property of the second resource instance is set to the second specified interruptibility level.

17. A non-transitory computer-accessible storage medium storing program instructions that when executed on one or more processors perform:

receiving a first instance acquisition request from a first client for a first resource instance of a plurality of resource instances, wherein the first instance acquisition request indicates a first specified interruptibility level, wherein the first specified interruptibility level permits revocation of access to the first resource instance without an access revocation notification;

in response to the first instance acquisition request from the first client, allocating the first resource instance to the first client, wherein an interruptibility property of the first resource instance is set to the first specified interruptibility level;

in response to a first access revocation condition and a determination that the interruptibility property of the first resource instance corresponds to the first specified interruptibility level, revoking the first client's access to the first resource instance without the access revocation notification;

receiving a second instance acquisition request from a second client for a second resource instance of the plurality of resource instances, wherein the second instance acquisition request indicates a second specified interruptibility level, wherein the second specified interruptibility level permits retaining access to the second resource instance for a delay interval subsequent to sending of the access revocation notification;

in response to an approval of the second instance acquisition request, allocating the second resource instance to the second client, wherein an interruptibility property of the second resource instance is set to the second specified interruptibility level; and in response to a second access revocation condition and a determination that the interruptibility property of the second resource instance corresponds to the second specified interruptibility level, retaining access from the second client to the second resource instance for the delay interval after the second client receives the access revocation notification.

18. The storage medium as recited in claim 17, wherein the instructions when executed on the one or more processors perform:

assigning one or more resource instances of the plurality of resource instances to a pool of available resource instances, based at least in part on a determination that the one or more resource instances are idle;

selecting the first resource instance from the pool of available resource instances for allocation to the first client;

determining a first billing amount for use of the first resource instance by the first client based at least in part on an interruptible instance pricing rate; and determining the interruptible instance pricing rate based at least in part on a current size of the pool of available resource instances.

19. The storage medium as recited in claim 18, wherein the instructions when executed on the one or more processors perform:

assigning one or more resource instances of the pool of available resource instances to a sub-pool of convertible resource instances, based at least in part on an expected rate of instance acquisition requests specifying the second specified interruptibility level;

selecting the second resource instance from the sub-pool of convertible resource instances for allocation to the second client;

determining a second billing amount for use of the second resource instance by the second client based at least in part on an interruptible-with-notification instance pricing rate; and determining the interruptible-with-notification instance pricing rate based at least in part on a current size of the sub-pool of convertible resource instances.

20. The storage medium as recited in claim 19, wherein the instructions when executed on the one or more processors perform:

removing a selected resource instance from the sub-pool of convertible resource instances, and retaining the selected resource instance in the pool of available resource instances, based at least in part on a number of resource instance reservations.

21. The storage medium as recited in claim 19, wherein said determining the first billing amount for use of the first resource instance by the first client is further based on a first duration for the first specified interruptibility level when the interruptibility property of the first resource instance is set to the first specified interruptibility level, and wherein said determining the second billing amount for use of the second resource instance by the second client is further based on a duration second duration for the second specified interruptibility level when the interruptibility property of the second resource instance is set to the second specified interruptibility level.

22. The storage medium as recited in claim 17, wherein the instructions when executed on the one or more processors perform:

determining whether to approve the second instance acquisition request based at least in part on a bid value indicated in the second instance acquisition request.

23. The storage medium as recited in claim 17, wherein the instructions when executed on the one or more processors perform:

in response to an approval of an interruptibility upgrade request from the first client, wherein the interruptibility upgrade request comprises a request, from the first client, for a change of the interruptibility property of the first resource instance, and the interruptibility upgrade request is separate from a specification, from the first client, of a maximum bid price for the first resource instance, setting the interruptibility property of the first resource instance to the second specified interruptibility level, allowing the first client to retain access to the first resource instance for the delay interval after the first client receives the access revocation notification.

24. The storage medium as recited in claim 17, wherein the instructions when executed on the one or more processors perform:

determining the delay interval after the second client receives the access revocation notification based at least in part on a bid value indicated in the second instance acquisition request.

25. The storage medium as recited in claim 17, wherein the instructions when executed on the one or more processors perform:

determining the delay interval after the second client receives the access revocation notification based at least in part on an interruptible-with-notification instance pricing rate.

\* \* \* \* \*